(12) United States Patent
Taniguchi

(10) Patent No.: US 6,693,963 B1
(45) Date of Patent: Feb. 17, 2004

(54) SUBBAND ENCODING AND DECODING SYSTEM FOR DATA COMPRESSION AND DECOMPRESSION

(75) Inventor: Shohei Taniguchi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 680 days.

(21) Appl. No.: 09/625,512

(22) Filed: Jul. 25, 2000

(30) Foreign Application Priority Data

Jul. 26, 1999 (JP) ............................................. 11-211264

(51) Int. Cl.$^7$ ................................................ H04N 7/12
(52) U.S. Cl. ............................. 375/240.11; 375/240.25
(58) Field of Search ........................ 375/240.01, 240.05, 375/240.11, 240.12, 240.18, 240.21, 240.29, 240.25, 240.26, 278

(56) References Cited

U.S. PATENT DOCUMENTS

| | | | |
|---|---|---|---|
| 5,581,653 A | | 12/1996 | Todd ........................... 704/229 |
| 5,933,456 A | * | 8/1999 | Oomen et al. ............... 375/295 |
| 6,052,148 A | * | 4/2000 | Morishita .............. 375/240.01 |
| 6,160,846 A | * | 12/2000 | Chiang et al. ......... 375/240.05 |

FOREIGN PATENT DOCUMENTS

| | | |
|---|---|---|
| EP | 0717392 A1 | 6/1996 |
| JP | 63-285032 | 11/1988 |
| JP | 1-501435 | 5/1989 |
| JP | 9-284137 | 10/1997 |

OTHER PUBLICATIONS

"High quality low complexity scalable wavelet audio coding" by W. Kurt Dobson et al., Acoustics, Speech and Signal Processing, 1997. ICASSP-97., 1997 IEEE International Conference on Munich, Germany Apr. 21–24, 1997, Los Alamitos, CA, USA, IEEE Comput. Soc, US, Apr. 21, 1997, pp. 327–330, XP010226201.

MPEG audio bit rate scaling on coded data domain by Y. Nakajima et al., Acoustics, Speech and Signal Processing, 1998. Proceedings of the 1998 IEEE International Conference on Seattle, WA, USA May 12–15, 1998, New York, NY, USA, IEEE US, May 12, 1998, pp. 3669–3672, XP010279585.

\* cited by examiner

*Primary Examiner*—Chris Kelley
*Assistant Examiner*—Allen Wong
(74) *Attorney, Agent, or Firm*—McDermott, Will & Emery

(57) ABSTRACT

A subband encoding and a decoding system are provided. The subband encoding system measures signal levels of subband signals to determine scale factors to obtain scale factor information and produces bit allocation information based on the scale factor information, scale factor flag information indicating the fact that the scale factor information has changed from that one frame earlier, and updated scale factor information indicating the scale factor information which has changed from that one frame earlier. The subband encoding system re-quantizes the subband signals using the scale factor information and the bit allocation information to provide re-quantized output signals and constructs as an encoded output signal a frame made up of the re-quantized signals, the updated scale factor information, and the scale factor flag information. The number of subbands of the subband signals to be re-quantized is determined by an upper limit frequency of an audible band. This results in a decrease in operation load of the subband encoding and decoding systems.

56 Claims, 38 Drawing Sheets

SUBBAND ENCODING AND DECODING SYSTEM FOR DATA COMPRESSION AND DECOMPRESSION

BACKGROUND OF THE INVENTION

1. Technical Field of the Invention

The present invention relates generally to a subband encoding and a decoding system used in data compression and decompression which are capable of working at a decreased operation load.

2. Background Art

As typical subband encoding, the MPEG1 audio is known in the art. FIG. 46 shows a conventional MPEG1 audio layer 1 encoding system. The bandwidth of digital signals 1101 sampled at a sampling frequency fs inputted to the encoding system is divided by a band splitter 101 into k subbands whose overall band is equivalent to the bandwidth of the Nyquist frequency (fs/2) of the inputted digital signals 1101. The band splitter 101 outputs k subband signals 1102 to the encoding circuit 104. Note that k is an integer. In the MPEG1 audio, the bandwidth of an input signal is divided into 32 regular subbands, but may alternatively be divided into a predetermined number of irregular subbands depending upon the design of filters.

In the MPEG1 audio layer, the subband signal in each subband is down-sampled to produce a baseband signal using a frequency modulation technique. Simultaneously, w of the input digital signals 1101 sampled at intervals of the reciprocal of the sampling frequency (1/fs) are time-frequency converted in the time-frequency converter 102 using the time-windowing in synchronism in time with the band splitter 101 to produce frequency information 1103. The length w of a time window used in the time-frequency conversion is determined as $$w=(1/fr)/(1/fs)$$

where fr is a frequency resolution required in the frequency information 1103.

In the MPEG1 audio, the time-frequency conversion is accomplished with the Fast Fourier Transform (FFT), so that the value of w is minimum two to the nth power meeting a desired frequency resolution fr, and each time window partially overlaps with preceding and following time windows for establishing the time continuity. The frequency analyzer 103 calculates the number of allocation bits in a time period excluding the portions overlapping with the preceding and following time windows using a known psychoacoustic masking technique in a psychoacoustic mode in each of the k subbands derived by the band splitter 101 and outputs bit allocation information 1104 to the encoding circuit 104. The time period excluding the overlapping portions corresponds to a unit time length of frames.

The encoding circuit 104 determines a scale factor of each of the k subbands based on a maximum amplitude of one of the subband signals 1102 per unit frame length, normalizes the amplitude of each of the subband signals 1102 based on a corresponding one of the scale factors, re-quantizes it based on the bit allocation information 1104, produces a bit stream based on the re-quantized samples, the bit allocation information 1104, the scale factors, and frame synchronization information, and outputs the bit stream as an encoded output signal 1105.

FIG. 47 shows a conventional MPEG1 audio layer decoding system.

The signal 1106 encoded by an encoding system such as the one shown in FIG. 46 is inputted to the frame analyzer 105. The frame analyzer 105 extracts from the signal 1106 a frame, the bit allocation information, and the scale factors and provides frame analyzed information 1107 to the decoding circuit 106.

The decoding circuit 106 performs a decoding operation in each subband using the frame-analyzed information 1107 to produce subband signals 1108. The subband signals 1108 are combined in the band combining circuit 107 and outputted as a decoded output signal 1109. In order to decrease the deterioration of information with the encoding and decoding operations to reconstruct an input signal perfectly, the band combining circuit 107 needs to meet the perfect reconstruction requirements in relation to the band splitter 101 of the encoding system. To this end, a technique using QMFs is known in the art.

However, the conventional subband encoding used in the MPEG, as described in FIG. 46, performs the scale factor information producing operation, the bit allocation information producing operation, and the re-quantizing operation in each of the k subbands to construct a frame, thus encountering problems of increases in load of encoding operation and bit rate.

The subband encoding is required to perform the time-frequency conversion to analyze signals in a frequency domain for establishing the information compression based on the psychoacoustic model. The realization of high-efficiency compression without any deterioration of information requires keeping the frequency resolution completely. This also requires, when the frequency conversion is performed, performing a window function on a sample for an extended period of time.

Between the subband encoding and decoding operations, the length of a frame is determined based on the number of samples required for the windowing operation. This frame length is defined as a base unit to perform the encoding, decoding, and buffering operations. The time required for each of the operations equivalent to the frame length and the time delay by a subband split filter bank will lead to problems of increase in operation time delay with increases in sound quality and compression rate.

The subband encoding also has a problem of increase in total operation resulting from the frequency analyzing and bit allocation operations.

When the subband encoding is employed in radio transmission, the synchronization acquisition of clocks in a receiver system and synchronization of radio frame require production and detection of synchronization words. The decreasing errors occurring in a transmission path requires an additional error correcting operation, which will result in an increase in delay time in overall operations of the system resulting from buffering in each operation. The additional error correcting operation is usually performed regardless of characteristics of information produced in the subband encoding, thus resulting in an fatal error in each application even if a burst error and a bit error rate, as viewed in a long time unit, are not great.

SUMMARY OF THE INVENTION

It is therefore a principal object of the present invention to avoid the disadvantages of the prior art.

It is another object of the present invention to provide a subband encoding and a decoding system capable of decreasing a operation load and an encoding bit rate.

According to one aspect of the invention, there is provided a subband encoding apparatus which comprises: (a) a subband splitter dividing an input signal in a frequency band into subband signals; (b) a first scale factor information producing circuit measuring signal levels of the subband signals to determine scale factors and producing scale factor information indicative thereof; (c) a bit allocation information producing circuit producing bit allocation information based on the scale factor information; (d) a second scale factor information producing circuit producing scale factor flag information indicating the fact that the scale factor information has changed from that one frame earlier and updated scale factor information indicating the scale factor information which has changed from that one frame earlier; (e) a re-quantizing circuit re-quantizing the subband signals using the scale factor information and the bit allocation information to provide re-quantized output signals; (f) a frame constructing circuit constructing a frame made up of the re-quantized signal, the updated scale factor information, and the scale factor flag information and outputs the frame as an encoded output signal; and (g) a subband-limiting circuit limiting the number of subbands of the subband signals to be re-quantized by the re-quantizing circuit based on an upper limit frequency of an audible band.

According to the second aspect of the invention, there is provided a subband encoding apparatus for radio transmission which comprises: (a) a subband splitter dividing an input signal in a frequency band into a preselected number of subbands to produce subband signals; (b) a first scale factor information producing circuit measuring signal levels of the subband signals to determine scale factors and producing scale factor information indicative thereof; (c) a subband grouping circuit breaking down the subbands into a preselected number of subband groups and determining scale factors in the subband groups using the scale factor information to provide group scale factor information indicative thereof; (d) a bit allocation information producing circuit producing bit allocation information based on the group scale factor information; (e) a second scale factor information producing circuit producing group scale factor flag information indicating the fact that the group scale factor information has changed from that one frame earlier and updated group scale factor information indicating the group scale factor information which has changed from that one frame earlier; (f) a re-quantizing circuit re-quantizing the subband signals using the group scale factor information and the bit allocation information to provide re-quantized output signals; (g) a frame constructing circuit constructing a frame made up of the re-quantized signal, the updated group scale factor information, and the group scale factor flag information and outputs the frame as an encoded output signal; and (h) a subband-limiting circuit limiting the number of subbands of the subband signals to be re-quantized by the re-quantizing circuit based on an upper limit frequency of an audible band.

In the preferred mode of the invention, the subband-limiting circuit determines a minimum value of an upper limit subband number meeting a relation of ((input signal sampling frequency/2)/(the number of subbands)×(upper limit subband number))≧(the upper limit frequency in a given application) and determines an upper limit frequency of the subbands of the subband signals to be re-quantized by the re-quantizing circuit.

The subband splitter divides a frequency band of (sampling frequency of the input signal)/2 into 32 subbands. The subband grouping circuit breaks down 32 subbands into 6 to 20 subband groups.

The encoded output signal is outputted in the form of a frame whose length is determined by a relation of (the number of subbands)/(sampling frequency of the input signal).

The encoded output signal may alternatively be outputted in the form of a frame whose length is determined by a relation of (the number of subbands)×2/(sampling frequency of the input signal).

The bit allocation information producing circuit determines a ratio of the value of the group scale factor information in each of the subband groups to the smallest value of a known minimum audible level curve in each of the subbands within the subband group. The bit allocation information producing circuit determines energy rates in all the subbands based on the ratios to obtain the bit allocation information.

The bit allocation information producing circuit may alternatively determine a ratio of the value of the group scale factor information in each of the subband groups to an average value of a known minimum audible level curve in each of the subbands within the subband group. The bit allocation information producing circuit determines the energy rates in all the subbands based on the ratios to obtain the bit allocation information.

The bit allocation information producing circuit may determine a product of the energy rate in each of the subbands and the possible number of bits to be allocated to one frame, rank all the subbands in the order of magnitude of decimals of the products, determine the remaining number of bits to be allocated, and allocate the remaining bits, in sequence, to the ranked subbands.

The bit allocation information producing circuit may produce the bit allocation information using weighting coefficients in a frequency domain.

The bit allocation information producing circuit may alternatively produce the bit allocation information using weighting coefficients each provided for the scale factor information in one of the subbands.

The frame constructing circuit may set a length of the frame to that of a radio transmission frame and pads a synchronization word required for radio transmission in the frame.

The frame constructing circuit transmits frames each made up only of synchronization words for synchronization acquisition at regular intervals.

The frame constructing circuit may alternatively transmit frames each made up only of the group scale factor information at regular intervals.

The frame constructing circuit may alternatively transmit frames each made up of the group scale factor information and synchronization words for synchronization acquisition at regular intervals.

An error correction encoding circuit may further be provided which performs an error correction encoding operation on the encoded output signal.

The error correction encoding circuit performs error correction encoding operations having different error correcting capabilities on data in a frame of the encoded output signal according to error resistances of the data.

The error correction encoding circuit may use a BCH code.

The error correction encoding circuit may alternatively use a convolutional code.

The error correction encoding circuit may use different error correcting codes according to the error resistances of the data.

The error correction encoding circuit may use both a BCH code and a convolutional code.

The error correction encoding circuit may provide a bit in a frame of the encoded output signal which undergoes no error correction encoding operation according to weights of data contained in the frame.

The error correction encoding circuit may perform the error correction encoding operation on the encoded output signal regardless of a bit length of the updated scale factor information which changes every frame.

A rearranging circuit may further be provided which rearranges output signals produced by re-quantizing the subband signals for minimizing adverse effects of code errors on a decoding operation.

The frame constructing circuit may perform an interleaving operation on the encoded output signal.

According to the third aspect of the invention, there is provided a subband decoding apparatus which comprises: (a) a frame analyzer establishing synchronization of frames of an inputted subband encoded signal to extract therefrom re-quantized signals, scale factor flag information indicating the fact that scale factor information has changed from that one frame earlier in a subband encoding operation of the inputted subband encoded signal, and updated scale factor information indicating the scale factor information which has changed from that one frame earlier in the subband encoding operation; (b) a scale factor information producing circuit producing the scale factor information in all subbands of the inputted subband encoded signal using the updated scale factor information and the scale factor flag information; (c) a bit allocation information producing circuit producing bit allocation information based on the scale factor information produced by the scale factor information producing circuit; (d) a subband signal producing circuit receiving the re-quantized signals to produce subband signals using the scale factor information and the bit allocation information; and (e) a band combining circuit combining the subband signals to produce a decoded output signal.

According to the fourth aspect of the invention, there is provided a radio transmission subband decoding apparatus which comprises: (a) a frame analyzer establishing synchronization of frames of an inputted subband encoded signal to extract therefrom re-quantized signals, group scale factor flag information indicating the fact that group scale factor information on scale factors in subband groups into which subbands are broken down in a subband encoding operation of the inputted suband encoded signal has changed from that one frame earlier, and updated group scale factor information indicating the group scale factor information which has changed from that one frame earlier in the subband encoding operation; (b) a group scale factor information producing circuit producing the group scale factor information in the subband groups of the inputted subband encoded signal using the updated scale factor information and the scale factor flag information; (c) a bit allocation information producing circuit producing bit allocation information based on the group scale factor information produced by the group scale factor information producing circuit; (d) a subband signal producing circuit receiving the re-quantized signals to produce subband signals using the group scale factor information and the bit allocation information; and (e) a band combining circuit combining the subband signals to produce a decoded output signal.

In the preferred mode of the invention, the system may further comprises a muting circuit which mutes frames contained at regular intervals in the inputted subband encoded signal when each of the frames is made up of either or both of the scale factor information and synchronization words for synchronization acquisition and a data interpolation circuit which performs data interpolation of digital signals undergoing a decoding operation.

The radio transmission subband decoding system may alternatively comprise a muting circuit which mutes frames contained at regular intervals in the inputted subband encoded signal when each of the frames is made up of either or both of the group scale factor information and synchronization words for synchronization acquisition and a data interpolation circuit which performs data interpolation of digital signals undergoing a decoding operation.

The subband decoding system may alternatively comprise a muting circuit which mutes frames contained at regular intervals in the inputted subband encoded signal when each of the frames is made up of either or both of the scale factor information and synchronization words for synchronization acquisition and a data interpolation circuit which performs data interpolation of analog signals undergoing a decoding operation.

The radio transmission subband decoding system may further comprise a muting circuit which mutes frames contained at regular intervals in the inputted subband encoded signal when each of the frames is made up of either or both of the group scale factor information and synchronization words for synchronization acquisition and a data interpolation circuit which performs data interpolation of analog signals undergoing a decoding operation.

The subband decoding system may comprise a muting circuit which mutes frames contained at regular intervals in the inputted subband encoded signal as a function of the number of bits in each of the frames and a data interpolation circuit which performs data interpolation of digital signals undergoing a decoding operation.

The radio transmission subband decoding system may comprise a muting circuit which mutes frames contained at regular intervals in the inputted subband encoded signal as a function of the number of bits in each of the frames and a data interpolation circuit which performs data interpolation of digital signals undergoing a decoding operation.

The suband decoding system may comprise a muting circuit which mutes frames contained at regular intervals in the inputted subband encoded signal as a function of the number of bits in each of the frames and a data interpolation circuit which performs data interpolation of analog signals undergoing a decoding operation. The radio transmission subband decoding system may comprise a muting circuit which mutes frames contained at regular intervals in the inputted subband encoded signal as a function of the number of bits in each of the frames and a data interpolation circuit which performs data interpolation of analog signals undergoing a decoding operation.

The decoded output signal may be subjected to a deinterleaving operation during analysis of a frame of the input signal.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
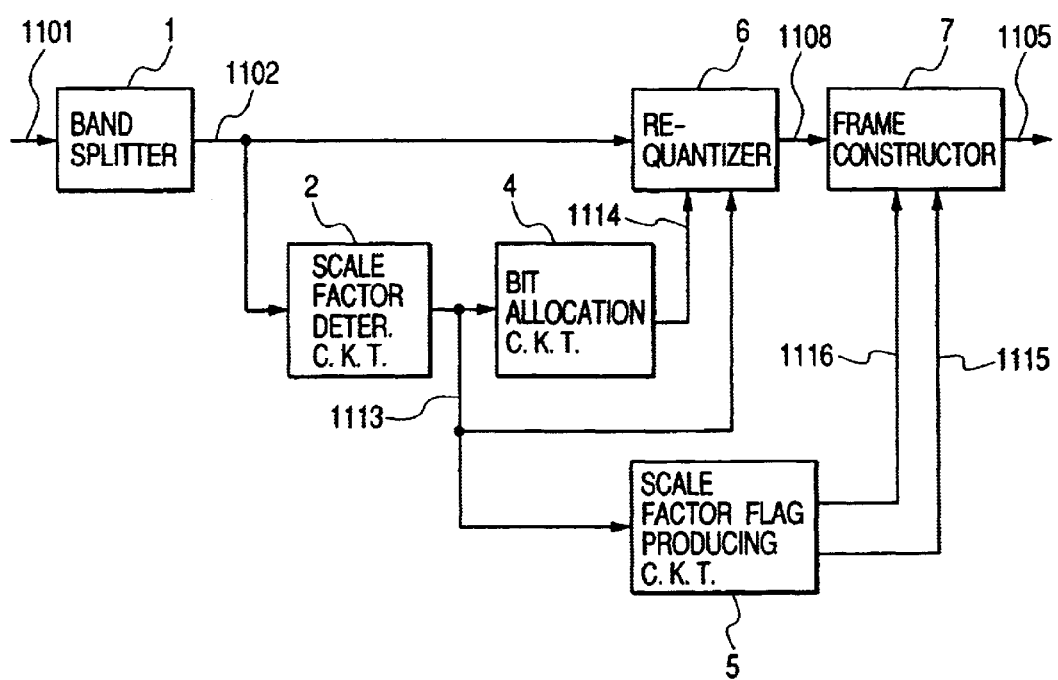
FIG. 1 is a block diagram which shows a subband encoding system according to the first embodiment of the invention.

Referring now to the drawings, particularly to FIG. 1, there is shown a subband encoding system according to the first embodiment of the invention.

The subband encoding system is designed to split an input signal in frequency band into a plurality of consecutive subbands, produce bit allocation information based on scale factor information in each subband, obtain scale factor flag information that indicates a change in scale factor information from that one frame earlier and updated scale factor information indicating scale factors which have changed from those one frame earlier, impose restrictions on the number of subbands based on subband signals, the scale factor information, the bit allocation information, and an upper frequency of an audio band to re-quantize subband signals, and construct a encoded frame using the re-quantized signals, the scale factor flag information, and the updated scale factor information.

The subband encoding system generally includes the band splitter 1, the scale factor determining circuit 2, the bit allocation circuit 4, the scale factor flag producing circuit 5, the re-quantizer 6, and the frame constructing circuit 7.

The band splitter 1 divides the input signal 1101 in frequency band into a plurality of subbands to produce the subband signals 1102. The scale factor determining circuit 2 measures a maximum amplitude level in each of the subbands to determine a scale factor for normalization and outputs scale factor information 1112 indicative thereof. The bit allocation circuit 4 determines bit to be allocated in each of the subbands using the scale factor information 1112. The scale factor determining circuit 5 produces scale factor flag information 1115 indicating a change in scale factor information and updated scale factor information 1116 indicating the changed or new scale factor information 1112. The re-quantizer 6 re-quantizes the subband signal in each of the subbands and outputs a re-quantized signal 1108. The frame constructing circuit 7 constructs a frame made up of the re-quantized signals 1108, the updated scale factor information 1116, and the scale factor flag information 1115.

Figure 3:
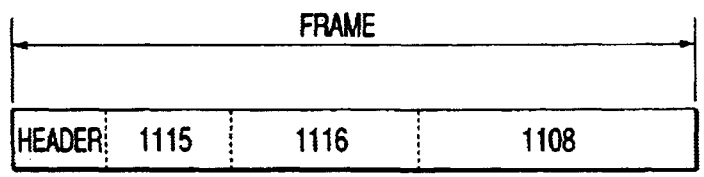
FIG. 3 shows a frame structure in a subband encoding of the first embodiment of the invention.
Figure 2:
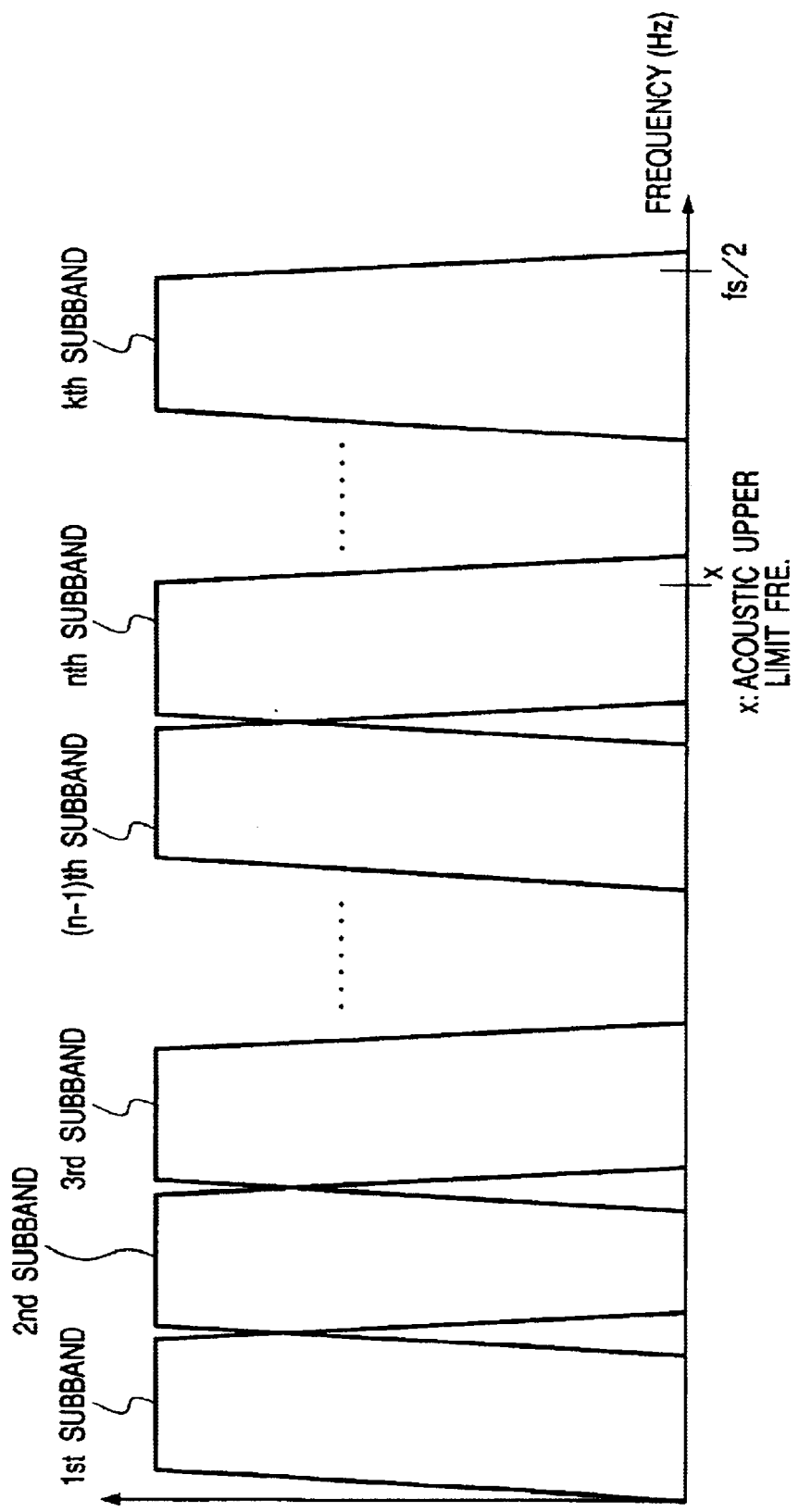
FIG. 2 shows the relation between a frequency band spit and an upper limit frequency in subband encoding used in the first embodiment and decoding.

FIG. 2 shows the relation between a series of spit bands or subbands and an upper limit frequency in the subband encoding performed in this embodiment. FIG. 3 shows the structure of a frame formed by the subband encoding.

The frame, as shown in FIG. 3, includes a header, the scale factor flag information 1115, the updated scale factor information 1116, and the re-quantized signals 1118. The header includes padded information, e.g., an encoded frame synchronization signal for establishing synchronization of encoded frames. The scale factor flag information 1115 indicates a change in scale factor. The updated scale factor information 1116 indicates the scale factor information which has changed from that one frame earlier. The re-quantized signal 1118 is a signal derived by re-quantizing the subband signal in each of the subbands.

In operation, when the signal 1101 to be encoded is inputted to the subband encoding system, the band splitter 1 divides the bandwidth of the input signal 1101 having a sampling frequency fs, as shown in FIG. 2, into k subbands whose overall band is defined by the bandwidth of the Nyquist frequency (fs/2) of the input signals 1101. Note that k is a preselected one of integers. In the MPEG1 audio, the bandwidth of an input signal is divided into 32 regular subbands, but the input signal 1101 of this embodiment may alternatively be divided into a predetermined number of irregular subbands depending upon the design of filters. The number of subbands produced by the band splitter 1 is, as described above, k, but the band splitter 1 outputs the subband signals 1102 in n of the k subbands. Note that n is an integer selected from 1 to (k−1) and, in FIG. 2, determined by an upper limit frequency of the application. The subband signals 1102 are baseband signals down-sampled using a known frequency modulation technique.

The scale factor determining circuit 2 measures a maximum level of amplitudes of samples of the subband signal 1101 in each of the n subbands corresponding to a frame length time in synchronism with the band splitter 1101 and then determines a scale factor in each of the n subbands for normalizing the maximum amplitude level to output it as the scale factor information 1112. The scale factors from the (n+1)th to the kth subband are set to a maximum scale factor, that is, a scale factor indicating a minimum signal amplitude value. Similarly, the following operations deal with samples of the input signal 1101 over the frame length time as a unit input or a unit output. Usually, the normalized level is set to a maximum input sound pressure in an encoding block.

The bit allocation circuit 4 uses the scale factor information of the n subbands to determine bits to be allocated in each of the n subbands and outputs them as the bit allocation information 1114. Bits to be allocated in the (n+1)th to the kth subband are set to zero (0). Specifically, no bits are allocated in the (n+1)th to the kth subband.

The scale factor flag producing circuit 5 determines whether the scale factor information 1112 has changed from that one frame earlier and outputs the scale factor flag information 1115 indicating the fact that the scale factor information 1112 has changed from that one frame earlier. The scale factor flag information 1115 is expressed in one bit in each of the n subbands. The scale factor flag producing circuit 5 also outputs as the updated scale factor information 1116 the scale factor information 112 in each subband only when it has changed from that one frame earlier. Simultaneously, the re-quantizer 6 uses the bit allocation information 1114 and the scale factor information 1112 to re-quantize the subband signal in each of the subbands and outputs it as the re-quantized signal 1108.

The frame constructing circuit 7 adds the encoded frame synchronization signal to the inputs to construct the encoded frame, as shown in FIG. 3, which includes the scale factor flag information 1115, the updated scale factor information 1116, and the re-quantized signals 1108 and outputs it as the encoded output signal 1105. The header is provided in a leading portion of the frame in time, but may alternatively be located in another portion if a given protocol is established between the encoding system and the decoding system. The same is true for the scale factor flag information 1115, the updated scale factor information 1116, and the re-quantized signal 1108.

One example of the subband encoding operation will be described with reference to FIG. 2. Assume that the upper limit frequency y in a given application is 20 kHz, the sampling frequency fs of the input signal 1101 and the encoded output signal 1105 is 48 kHz, and the number k of subbands is 32. In this case, the upper limit frequency subband number n is set to a minimum one of integers which meet the relation of ((input signal sampling frequency/2)/ (the number of subbands)×(upper limit frequency subband number))≧(the upper limit frequency in a given application) and will be 27. The band division operation and the subband combining operation, as described above, are performed on the number of subbands defined by the upper limit frequency subband number n. The scale factor information, the scale factor flag information, and the bit allocation information are derived in only 27 of the subbands from the lower frequency side in the subband encoding and decoding. This causes a theoretical upper limit encoding frequency x to be 20.25 kHz. The remaining higher frequency subbands are ignored in constructing the encoded frame. The encoded output signals 1105 in these subbands indicate zero (0). Several examples are listed in the following table.

| Number | y kHz | fs kHz | k | n | x kHz |
|---|---|---|---|---|---|
| 1 | 20 | 48 | 32 | 27 | 20.25 |
| 2 | 20 | 44.1 | 32 | 30 | 20.671875 |
| 3 | 20 | 96 | 64 | 54 | 20.25 |
| 4 | 15 | 48 | 32 | 20 | 15 |
| 5 | 15 | 44.1 | 32 | 11 | 15.1597375 |
| 6 | 15 | 44.1 | 64 | 40 | 15 |
| 7 | 15 | 32 | 32 | 30 | 15 |
| 8 | 10 | 48 | 32 | 14 | 10.5 |
| 9 | 10 | 44.1 | 32 | 28 | 11.025 |
| 10 | 10 | 96 | 64 | 28 | 10.5 |
| 11 | 10 | 32 | 32 | 20 | 10 |
| 12 | 7 | 48 | 32 | 10 | 7.5 |
| 13 | 7 | 44.1 | 32 | 6 | 8.26875 |
| 14 | 7 | 96 | 64 | 20 | 7.5 |
| 15 | 7 | 32 | 32 | 14 | 7 |

As apparent from the above discussion, the subband encoding system of this embodiment is designed to split an input signal in frequency band into a plurality of subbands, produce the bit allocation information based on the scale factor information in each subband, obtain the scale factor flag information that indicates updating of scale factor information one frame earlier and the updated scale factor information, impose restrictions on the number of subbands based on the subband signals, the scale factor information, the bit allocation information, and the upper limit frequency of an audible band to perform the re-quantizing operation, and construct the encoded frame using the re-quantized output signals, the scale factor flag information, and the updated scale factor information. Specifically, the subband encoding system of this embodiment performs the subband encoding using only the scale factors which have changed from those one program cycle earlier and decreases the number of subbands used in constructing the encoded frame as a function of the upper limit value in an audible frequency range, thereby resulting in decreases in encoding load and encoding bit rate.

Figure 4:
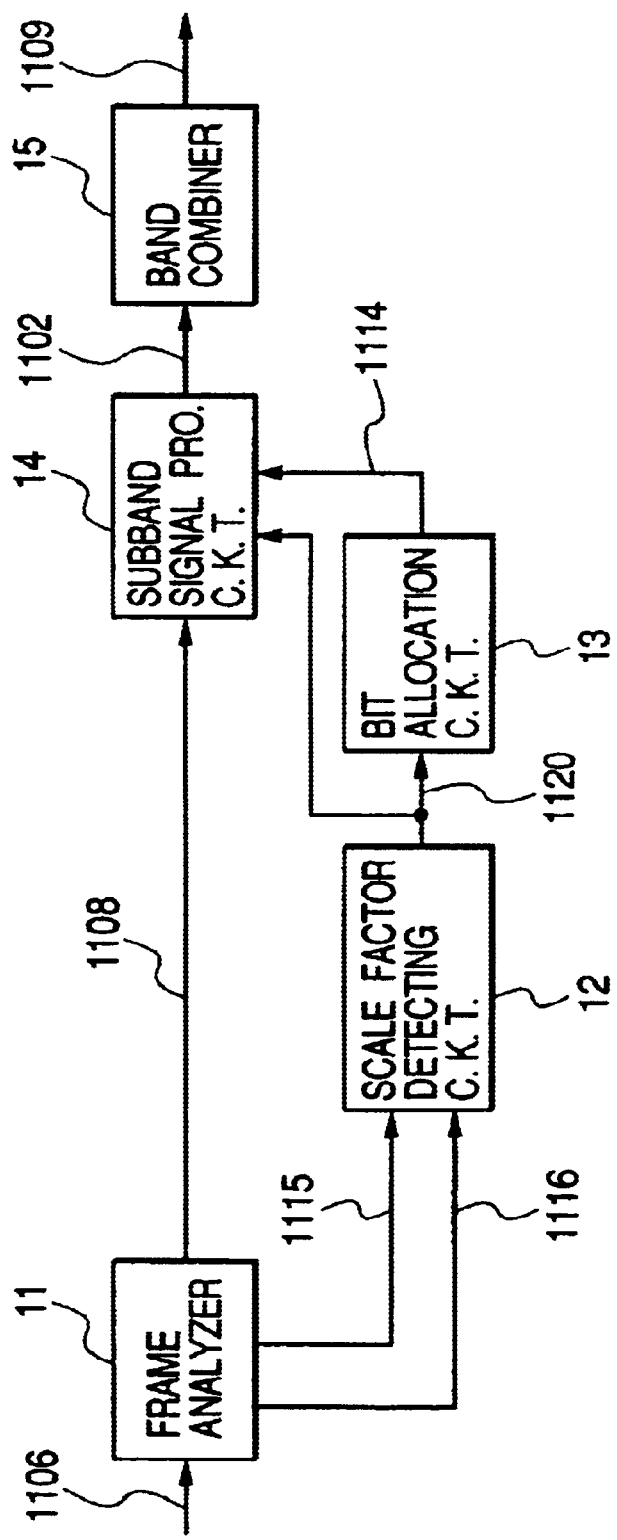
FIG. 4 is a block diagram which shows a decoding system according to the second embodiment of the invention.

FIG. 4 shows a subband decoding system according to the second embodiment of the invention.

The subband decoding system of this embodiment is designed to extract a re-quantized signal, the updated scale factor information, and the scale factor flag information from an inputted encoded signal, obtain scale factors in all subbands from the updated scale factor information and the scale factor flag information, derive the bit allocation information based on the scale factor information, extract subband signals from the re-quantized signal based on the scale factor information and the bit allocation information, and band-combine the subband signals to produce a decoded output signal.

The subband decoding system includes the frame analyzer 11, the scale factor detecting circuit 12, the bit allocation circuit 13, the subband signal producing circuit 14, and the band combining circuit 15.

The frame analyzer 11 extracts from the inputted encoded signal 1106, the scale factor flag information 1115, the updated scale factor information 1116, and the re-quantized signal 1108, as described in the first embodiment. The scale factor detecting circuit 12 produces the scale factor information 1120 in each subband. The bit allocation circuit 13 determines bit allocation in each subband using the scale factor information 1120. The subband signal producing circuit 14 samples the re-quantized signal in each subband to produce the subband signal 1102. The band combining circuit 15 combines the subband signals 1102 to produce the decoded output signal 1109.

The subband decoding operation performed in this embodiment will be described below in detail with reference to FIGS. 2, 3, and 4.

The encoded signal 1106 has the frame structure, as shown in FIG. 3. The frame analyzer 11 analyzes data contained in each frame. Specifically, the frame analyzer 11 establishes the synchronization of the frame based on the header thereof to obtain n pieces of scale factor flag information 1115, the updated scale factor information 1116, and the re-quantized signals 1108.

The outputs of the frame analyzer 11 are produced on a frame basis. The following operations are performed on the frame basis. The scale factor detecting circuit 12 receives the updated scale factor information 1116, the scale factor flag information 1115, and the scale factor information one frame earlier to produce the scale factors in the k subbands as the scale factor information 1120. The scale factor detecting circuit 12 sets the scale factors in the (n+1)th to the kth subband to a value indicating a maximum scale factor, that is, a minimum signal amplitude. Similarly, the following operations deal with samples of the encoded signal 1106 over the frame length time as a unit input or a unit output.

The bit allocation circuit 13 determines bit allocation in each of the n subbands using the scale factor information of a corresponding one of the n subbands and outputs it as the bit allocation information 1114. The bit allocation values in the (n+1)th to the kth subband are set to zero (0).

The subband signal producing circuit 14 detects the re-quantized signal 1108 in each of the subbands based on the bit allocation information 1114 to produce the subband signal 1102 using the scale factor information 1120.

The band combining circuit 15 combines the subband signals 1102 inputted thereto to produce the decoded output signal 1109. The decoded output signal 1109 is made up of a combination of subband signals over the k subbands, as shown in FIG. 2, whose overall band is defined by the bandwidth of the Nyquist frequency (fs/2). The decoded output signal 1109 is outputted at a time interval that is the reciprocal of the sampling frequency fs. The amplitude level of the decoded output signal 1109 is expressed binary as a function of the number of quantized bits.

Figure 5:
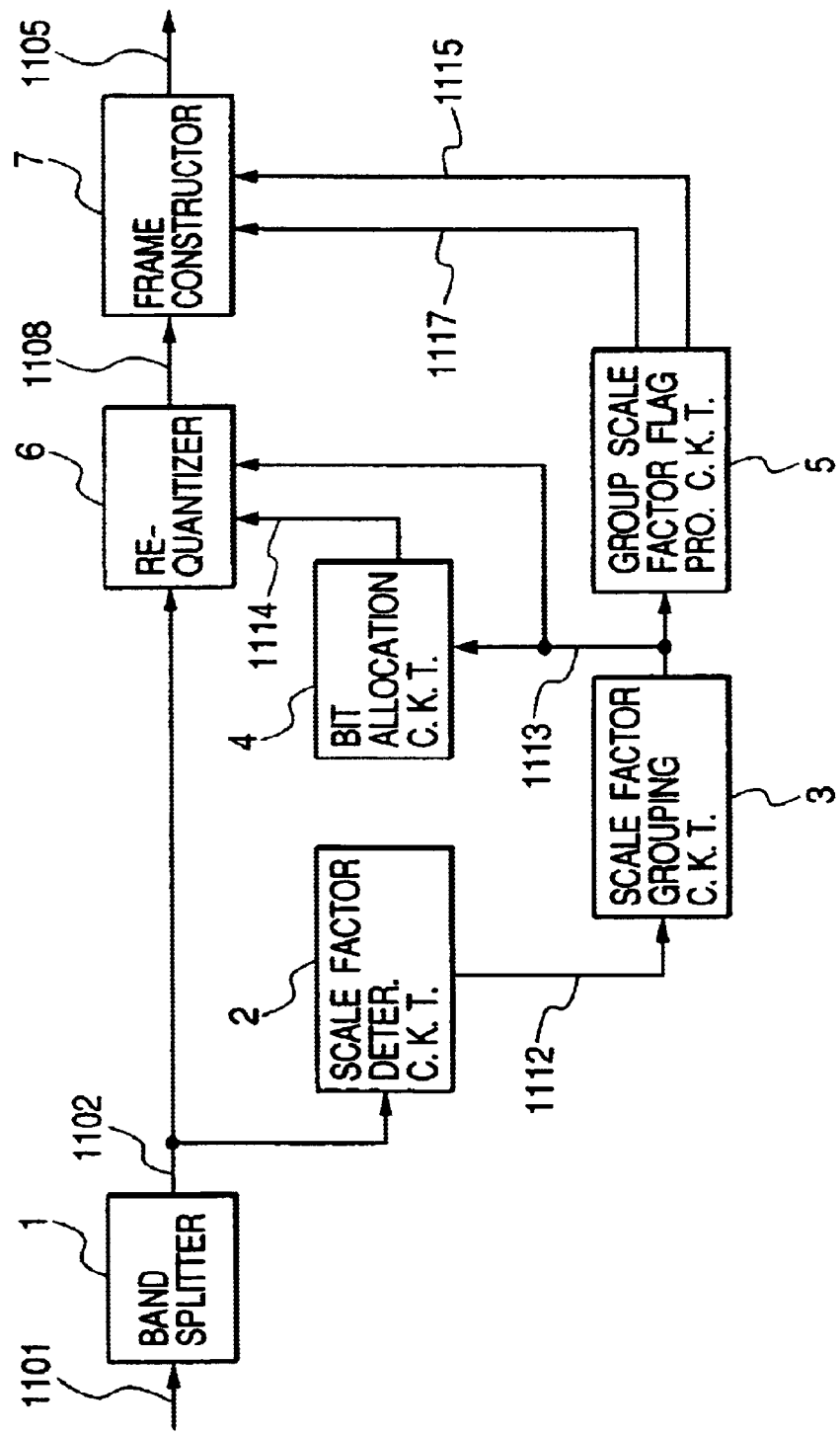
FIG. 5 is a block diagram which shows a subband encoding system according to the third embodiment of the invention.

FIG. 5 shows a subband encoding system according to the third embodiment of the invention which is different in structure from the one shown in FIG. 1, only in the scale factor grouping circuit 3. Other arrangements are identical with those in FIG. 1.

The subband encoding system of this embodiment is designed to group scale factors to produce bit allocation information, re-quantize subband signals, obtain group scale factor flag information that indicates a change in group scale factor information from that one frame earlier and updated group scale factor information to produce an encoded output signal using the re-quantized signals.

Figure 6:
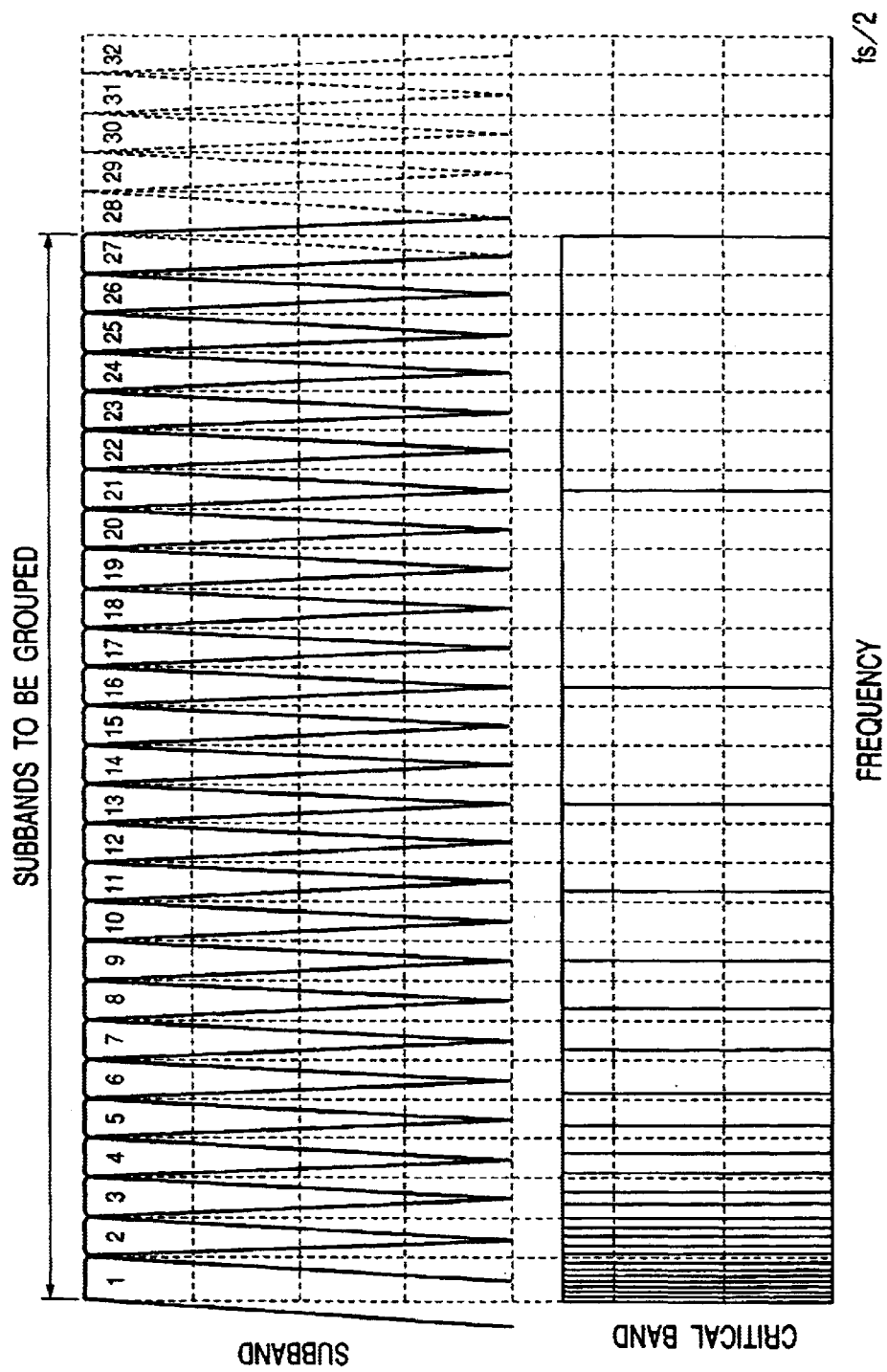
FIG. 6 shows the relation between the total number of subbands spit in the third embodiment and some of the subbands grouped by a scale factor information grouping circuit.
Figure 7:
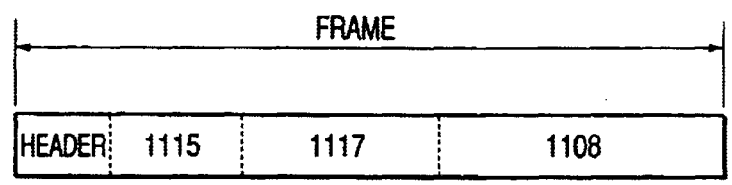
FIG. 7 illustrates a frame structure of an encoded output signal.

FIG. 6 shows the relation between the total number of subbands and some of the subbands grouped by the scale factor grouping circuit 3. FIG. 7 shows the structure of a frame in the subband encoding of this embodiment. The frame consists of a header, the scale factor flag information 1115, the update group scale factor information 1117, and the re-quantized signals 1118.

In operation, when the input signal 1101 is inputted to the subband encoding system, the band splitter 1 divides the bandwidth of the input signal 1101 having a sampling frequency fs, as shown in FIG. 2, into k subbands whose overall band is defined by the bandwidth of the Nyquist frequency (fs/2) of the input signals 1101. Note that k is a preselected one of integers. In the MPEG1 audio, the bandwidth of an input signal is divided into 32 regular subbands, but the input signal 1101 of this embodiment may alternatively be divided into a predetermined number of irregular subbands depending upon the design of filters. The number of subbands produced by the band splitter 1 is, as described above, k, but the band splitter 1 outputs the subband signals 1102 in n of the k subbands. Note that n is an integer selected from 1 to (k−1) and determined by an upper limit frequency in a given application. The subband signals 1102 are baseband signals down-sampled using a known frequency modulation technique.

The scale factor determining circuit 2 measures a maximum level of amplitudes of samples of the subband signal 1101 in each of the n subbands corresponding to the frame length time in synchronism in time with the band splitter 1101 and then determines a scale factor for normalizing the maximum amplitude level to output it as the scale factor information 1112. The scale factors from the (n+1)th to the kth subband are set to a maximum scale factor, that is, a scale factor indicating a minimum signal amplitude value. Similarly, the following operations deal with samples of the input signal 1101 over the frame length time as a unit input or a unit output. Usually, the normalized level is set to a maximum input sound pressure in an encoding block.

The scale factor grouping circuit 3 breaks down, as will be described later in detail, the scale factors in n of the k subbands into a preselected number m of units and outputs the group scale factor information 1113. In the example of FIG. 6, k=32, n=27, and m is a preselected natural number smaller than n. The value of m in FIG. 6 may be set to one of 1 to 26, but preferably determined in light of a known critical acoustic band.

The bit allocation circuit 4 uses the scale factor information of the n subbands to determine bits to be allocated in each of the n subbands and outputs it as the bit allocation information 1114. Bits to be allocated in the (n+1)th to the kth subband are set to zero (0). Specifically, no bits are allocated in the (n+1)th to the kth subband.

The group scale factor flag producing circuit 5 determines whether the group scale factor information 1113 has changed from that one frame earlier and outputs the group scale factor flag information 1115 indicating the fact that the group scale factor information 1113 has changed. The group scale factor flag information 1115 is expressed in one bit in each of the m subbands. Specifically, the group scale factor flag information is expressed in m bits per frame. The group scale factor flag producing circuit 5 also outputs as the updated group scale factor information 1117 the group scale factor information 1113 only when it has changed from that one frame earlier. Simultaneously, the re-quantizer 6 uses the bit allocation information 1114 and the group scale factor information 1113 to re-quantize the subband signal 1102 in each of the subbands and outputs it as the re-quantized signal 1108.

The frame constructing circuit 7 adds the encoded frame synchronization signal to the inputs to construct the encoded frame, as shown in FIG. 7, which includes the scale factor flag information 1115, the updated group scale factor information 1117, and the re-quantized signal 1108 and outputs it as the encoded output signal 1105. The header is provided in a leading portion of the frame in time, but may alternatively be located in another portion if a given protocol is established between the encoding system and the decoding system. The same is true for the scale factor flag information 1115, the updated group scale factor information 1117, and the re-quantized signal 1108.

Figure 9:
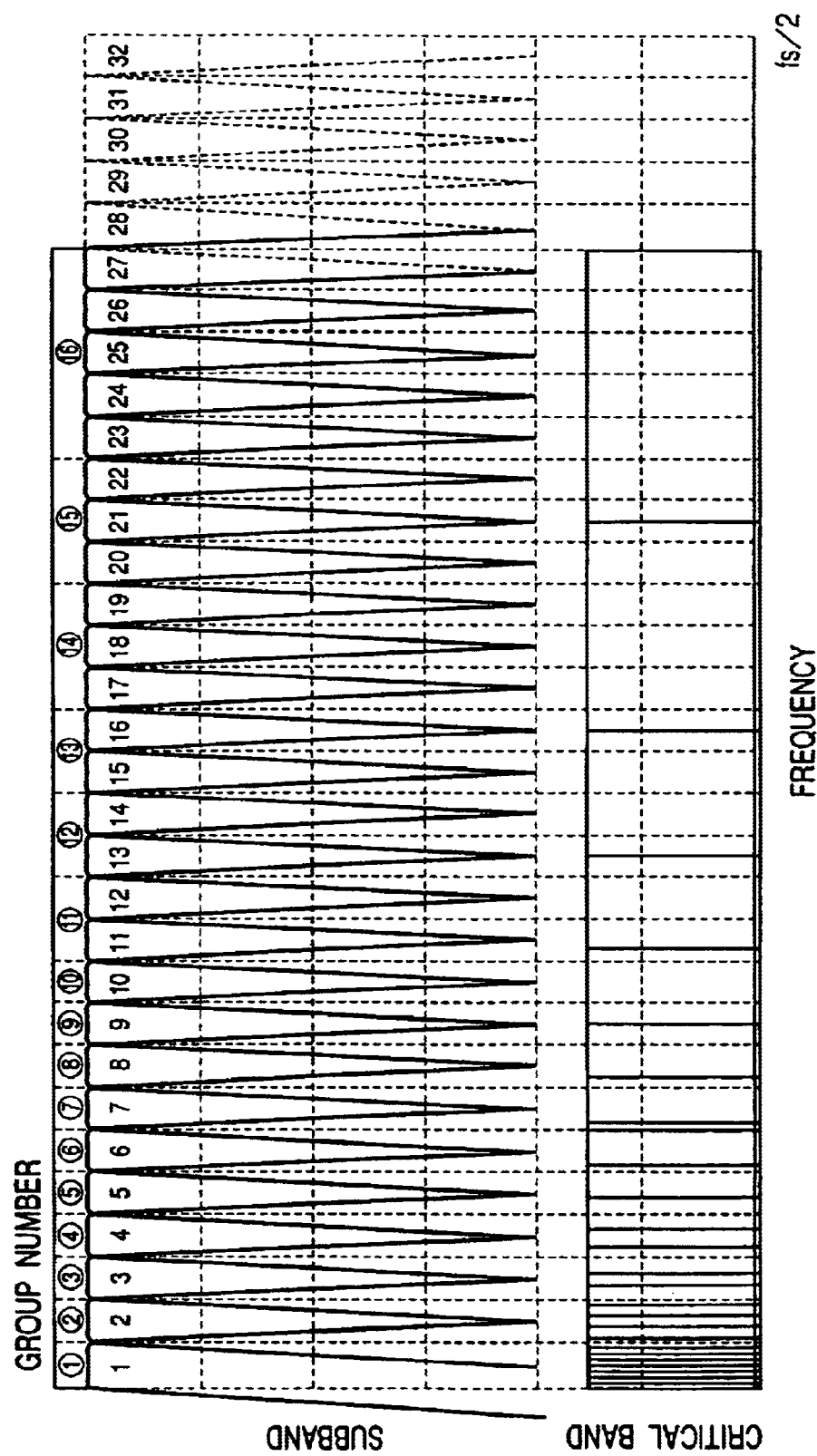
FIG. 9 shows one example of grouping of subbands.

One example of grouping of the subbands will be described with reference to FIG. 9. In this example, the sampling frequency fs is 48 kHz, (fs/2)=24 kHz bandwidth is divided into 32 subbands, and an upper limit subband is the $27^{th}$ subband. A lower portion of FIG. 9 represents an example of a known critical acoustic band.

As can be seen from the drawing, of the 27 subbands to be subjected to the encoding operation, the $11^{th}$ and $12^{th}$ subbands, the $13^{th}$ and $14^{th}$ subbands, the $15^{th}$ and $16^{th}$ subbands, the $17^{th}$ to $19^{th}$ subbands, the $20^{th}$ to $22^{nd}$ and subbands, and $23^{rd}$ to $27^{th}$ subbands are grouped, respectively. Each of the $1^{st}$ to $10^{th}$ subbands forms one group by itself. This results in the formation of 16 subband groups. The group scale factor information 1113 and the group scale factor flag information 1115 are provided in each of the 16 subband groups. In production of the group scale factor information 1113, the smallest of scale factors in each subband group is selected to set the scale factors of all the subbands thereof to the smallest one. Specifically, the group scale factor information 1113 of each subband group indicates the smallest scale factor therein.

Figure 10:
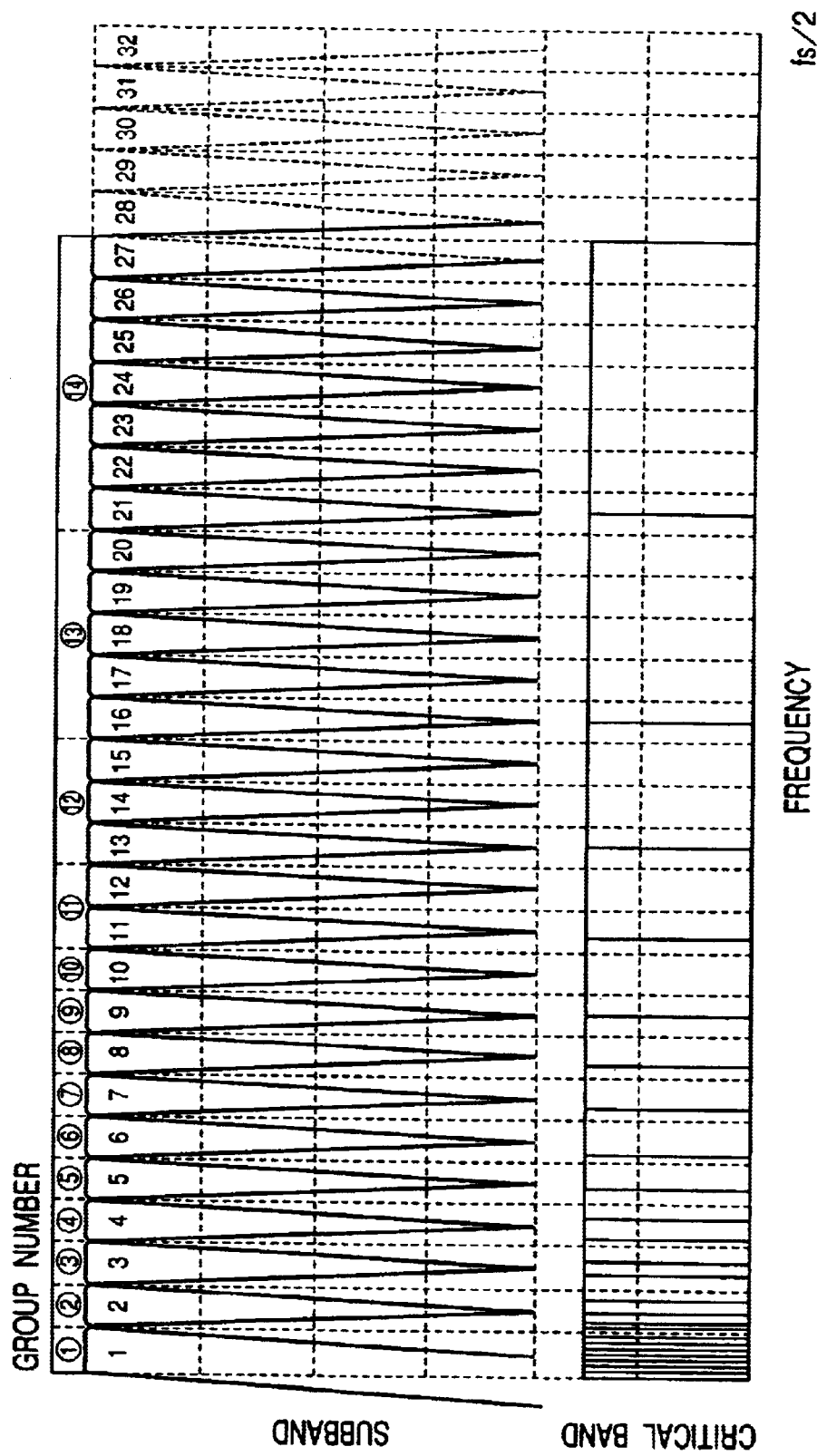
FIG. 10 shows the second example of grouping of subbands.

FIG. 10 shows the second example of grouping of the n subbands. In this example, the sampling frequency fs is 48 kHz, (fs/2)=24kHz bandwidth is divided into 32 subbands, and an upper limit subband is the $27^{th}$ subband. A lower portion of FIG. 10 represents an example of a known critical acoustic band.

As can be seen from the drawing, of the 27 subbands to be subjected to the encoding operation, the $11^{th}$ and $12^{th}$ subbands, the $13^{th}$ to $15^{th}$ subbands, the $16^{th}$ to $20^{th}$ subbands, and 21st to 27th subbands are grouped, respectively. Each of the 1st to 10th subbands forms one subband group by itself. This results in the formation of 14 subband groups. The group scale factor information 1113 and the group scale factor flag information 1115 are provided in each of the 14 subband groups. The group scale factor information 1113 is produced in the same manner as described in FIG. 9.

Figure 11:
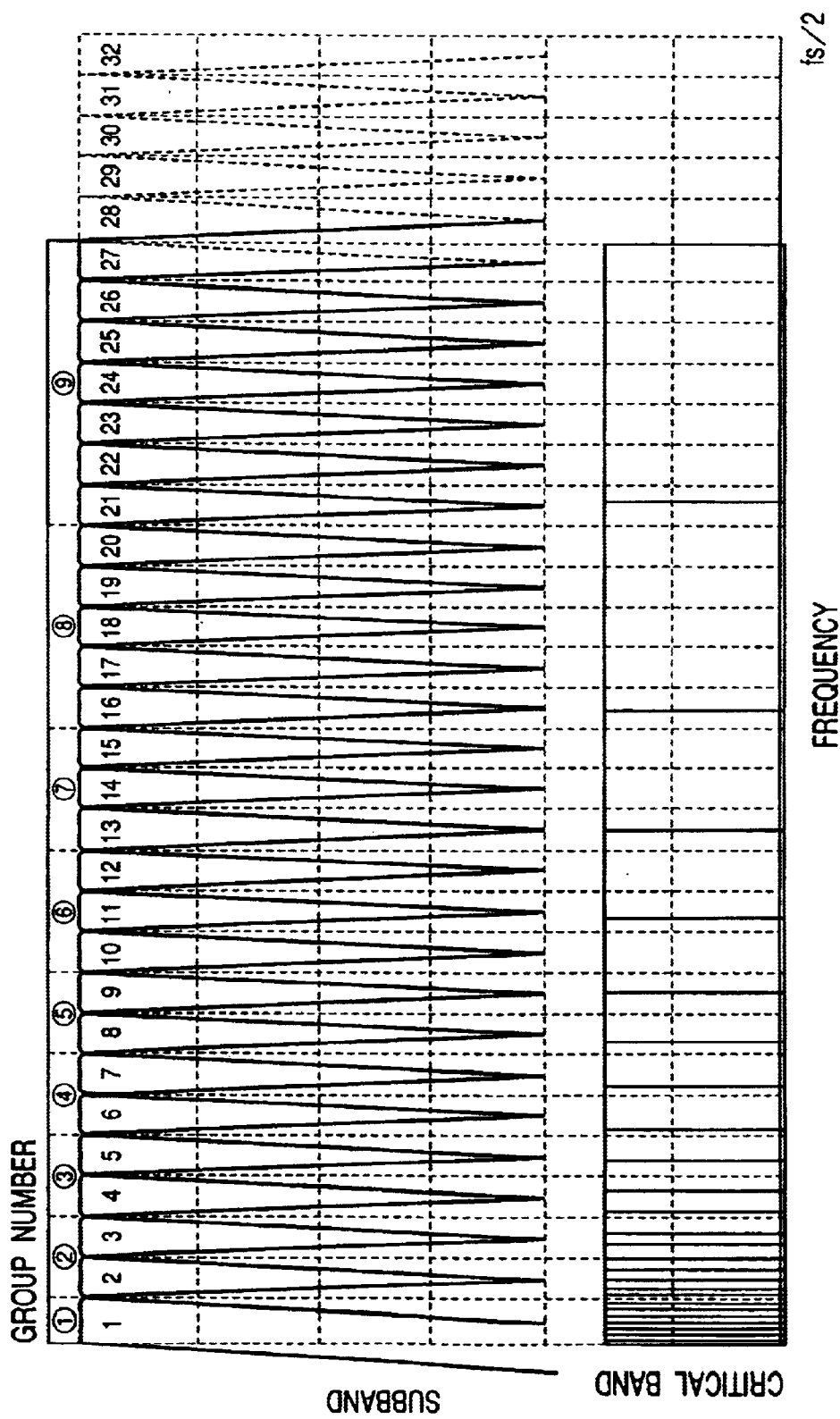
FIG. 11 shows the third example of grouping of subbands.

FIG. 11 shows the second example of grouping of the n subbands. In this example, the sampling frequency fs is 48 kHz, (fs/2)=24kHz bandwidth is divided into 32 subbands, and an upper limit subband is the 27th subband. A lower portion of FIG. 11 represents an example of a known critical acoustic band.

As can be seen from the drawing, of the 27 subbands to be subjected to the encoding operation, the 2nd and 3rd subbands, the 4th and 5th subbands, the 6th and 7th subbands, the 8th and 9th subbands, the 10th to 12th subbands, the 13th to 15th subbands, 16th to 20th subbands, and the 21st to 27th subbands are grouped, respectively. The 1st subband forms one subband group by itself This results in the formation of 9 subband groups. The group scale factor information 1113 and the group scale factor flag information 1115 are provided in each of the 9 subband groups. The group scale factor information 1113 is produced in the same manner as described in FIG. 9.

Figure 12:
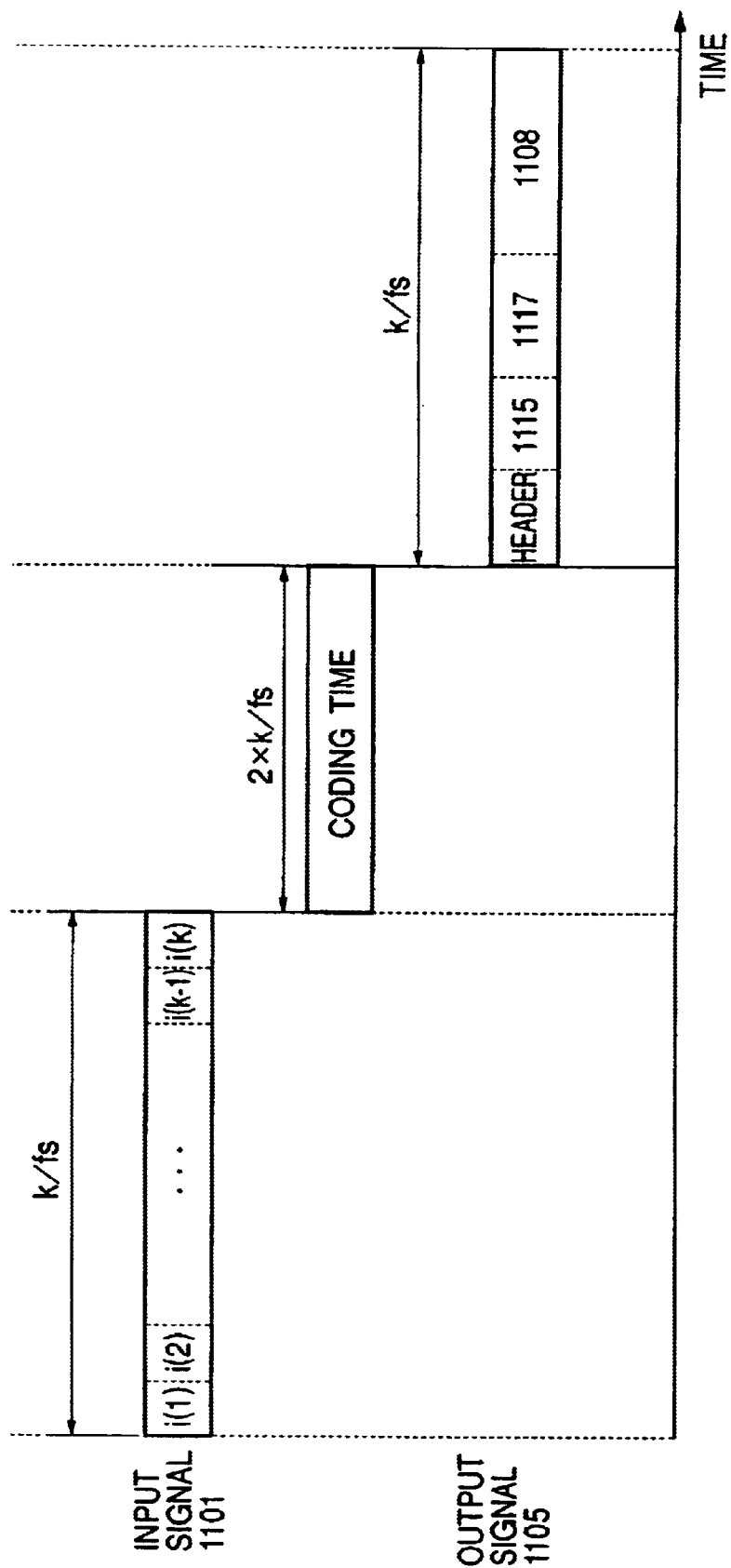
FIG. 12 shows frame structures of an input signal and an encoded output signal in the third embodiment of the invention.

The first example of the encoding operation in this embodiment will be described below with reference to FIGS. 5, 6, and 12. FIG. 6 illustrates for the case k=32, n=27. The number m of the subband groups is set to one of integers from 2 to (n−1). k and fs in FIG. 12 have the same values as those in FIG. 6, respectively.

The band splitter 1 in FIG. 5 samples the input signal 1101 equivalent to the number of quantizing bits at a time interval of 1/sampling frequency fs. The samples are expressed by i(1), i(2), . . . , and i(k).

The band splitter 1 splits, as shown in FIG. 6, the (fs/2) band into k subbands. The number of samples of the input signal 1101 required for formation of the first subband is k which will be a minimum input unit in the encoding operation. The samples i(1) to i(k) of the input signal 1101 are subjected to the operations of the band splitter 1 to the frame constructing circuit 7 in FIG. 5 to construct a frame whose length is, as shown in FIG. 12, defined by (the number k of the subbands/sampling frequency fs). In order to realize the real-time processing, the encoding operation is performed, as shown in FIG. 12, within a time period of 2×k/fs.

Figure 14:
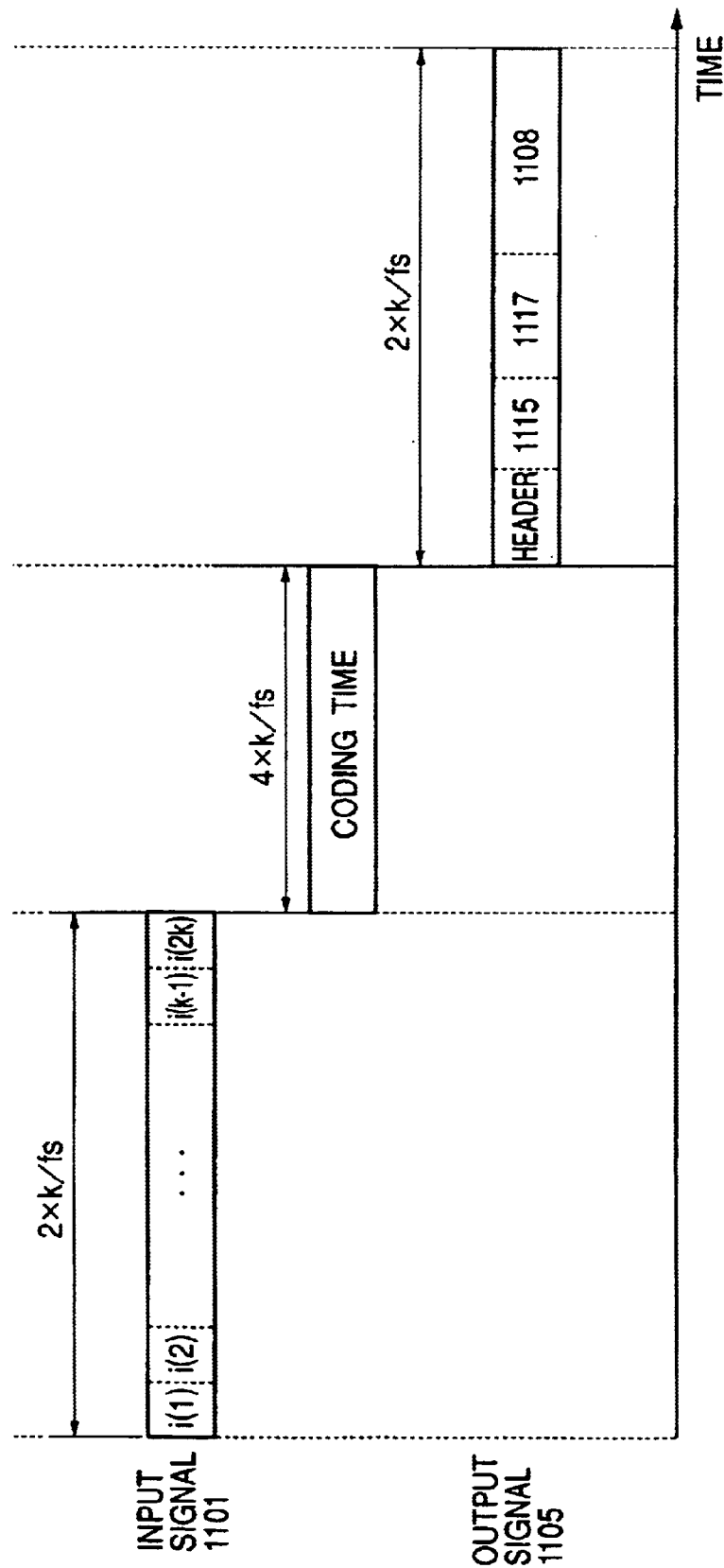
FIG. 14 shows frame structures of an input signal and an encoded output signal in a modification of the third embodiment of the invention.

The second example of the encoding operation will be described with reference to FIGS. 5, 6, and 14. k and fs in FIG. 14 are identical with those in FIG. 6, respectively.

The band splitter 1, like the above, samples the input signal 1101 equivalent to the number of quantizing bits at a time interval of 1/sampling frequency fs. The samples are expressed by i(1), i(2), . . . .

The band splitter 1 splits, as shown in FIG. 6, the (fs/2) band into k subbands. The number of samples of the input signal 1101 required for formation of the first subband is k which will be a minimum input unit in the encoding operation. In this example, the samples i(1) to i(2k) of the input signal 1101, as shown in FIG. 14, are subjected to the operations of the band splitter 1 to the frame constructing circuit 7 to construct a frame whose length is, as shown in FIG. 14, defined by 2×(the number k of the subbands/sampling frequency fs). In order to realize the real-time processing, the encoding operation is performed, as shown in FIG. 14, within a time period of 4×k/fs.

The first example of the normalizing operation will be discussed below with reference to FIGS. 5 and 16. In this example, the number k of subbands is 32, the number m of subband groups is 14, the sampling frequency fs is 48 kHz, the upper limit frequency subband number n is 27, and the frame length time is ($32/48000$)sec.

Figure 15:
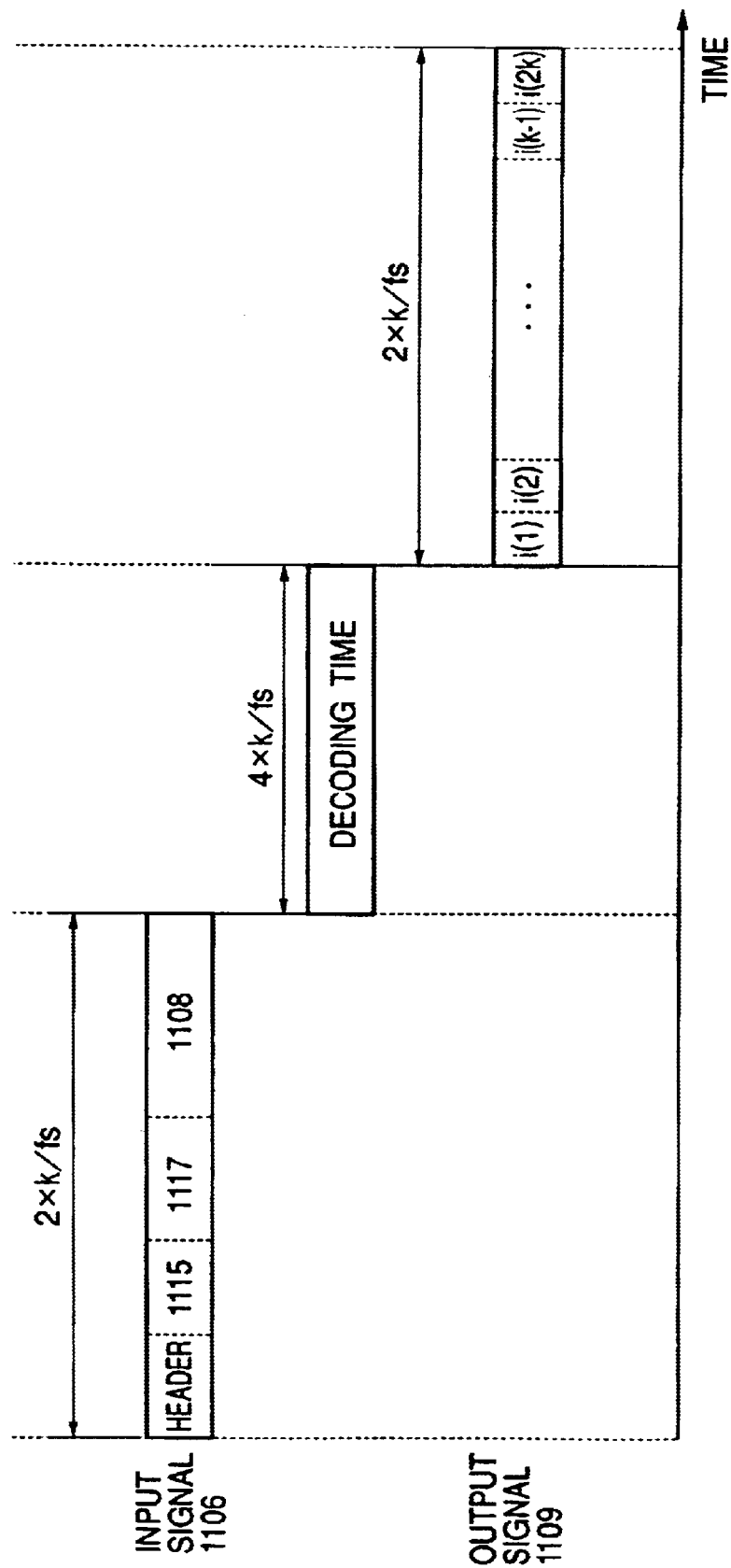
FIG. 15 shows frame structures of an input signal and a decoded output signal in a modification of the third embodiment of the invention.

An input signal, as illustrated in FIG. 15, has frequency characteristics for a time equivalent to one frame of the input signal 1101 in FIG. 5.

Figure 16:
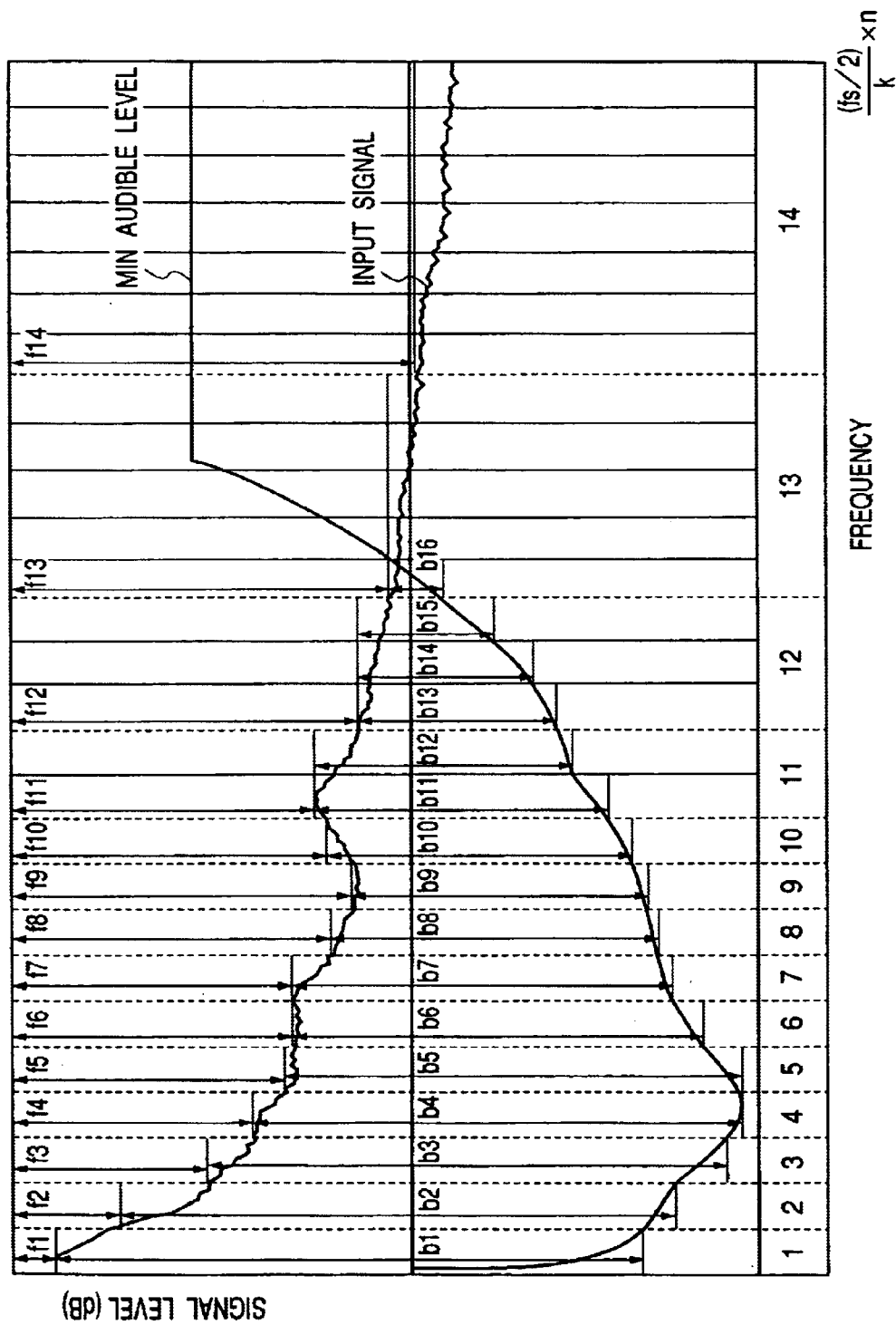
FIG. 16 shows a relation between a signal level and a frequency in subbands of a subband encoding input signal in one frame in the third embodiment.

The scale factor grouping circuit 3 determines the scale factors (i.e., the group scale factor information 1113), as indicated by f1, f2, . . . , and f14 in the 14 subband groups in FIG. 16, respectively. Each of f1, f2, . . . , and f14 indicates a ratio of a maximum level of the input signal in one of the 14 subband groups to a normalized level.

The bit allocation circuit 4 determines ratios b1, b2, b3, . . . , and b27 in the 27 subbands, respectively. Each of the ratios b1, b2, b3, . . . , and b27 in the 27 subbands is a ratio of the value of the group scale factor information 1113 in each of the subband groups to the smallest value of a known minimum audible level curve in each of the subbands within the subband group. The reason why b17 to b27 are not indicated in FIG. 16 is because the input signal is lower than the minimum audible level curve. In this case, a bit of 0 is allocated to each of the 17th subband to the 27th subband. Subsequently, an energy rate in each subband is determined using b1 to b27 according to the equation below.

$$\text{Energy Rate} = \frac{b_i}{\sum_{j=1}^{27} b_j}$$

where i is one of integers from 1 to 17.

The bit allocation circuit 4 determines the product of the energy rate in each subband and the possible number of bits to be allocated to one frame and rounds it off to an integer under the necessary condition that the total number of bits to be allocated to all the subbands is less than or equal to the possible number of bits to be allocated to one frame and produces the bit allocation information 1114.

The second example of the normalizing operation will be discussed below with reference to FIGS. 5 and 17. In this example, the number k of subbands is 32, the number m of subband groups is 14, the sampling frequency fs is 48 kHz, the upper limit frequency subband number n is 27, and the frame length time is ($32/48000$) sec.

Figure 17:
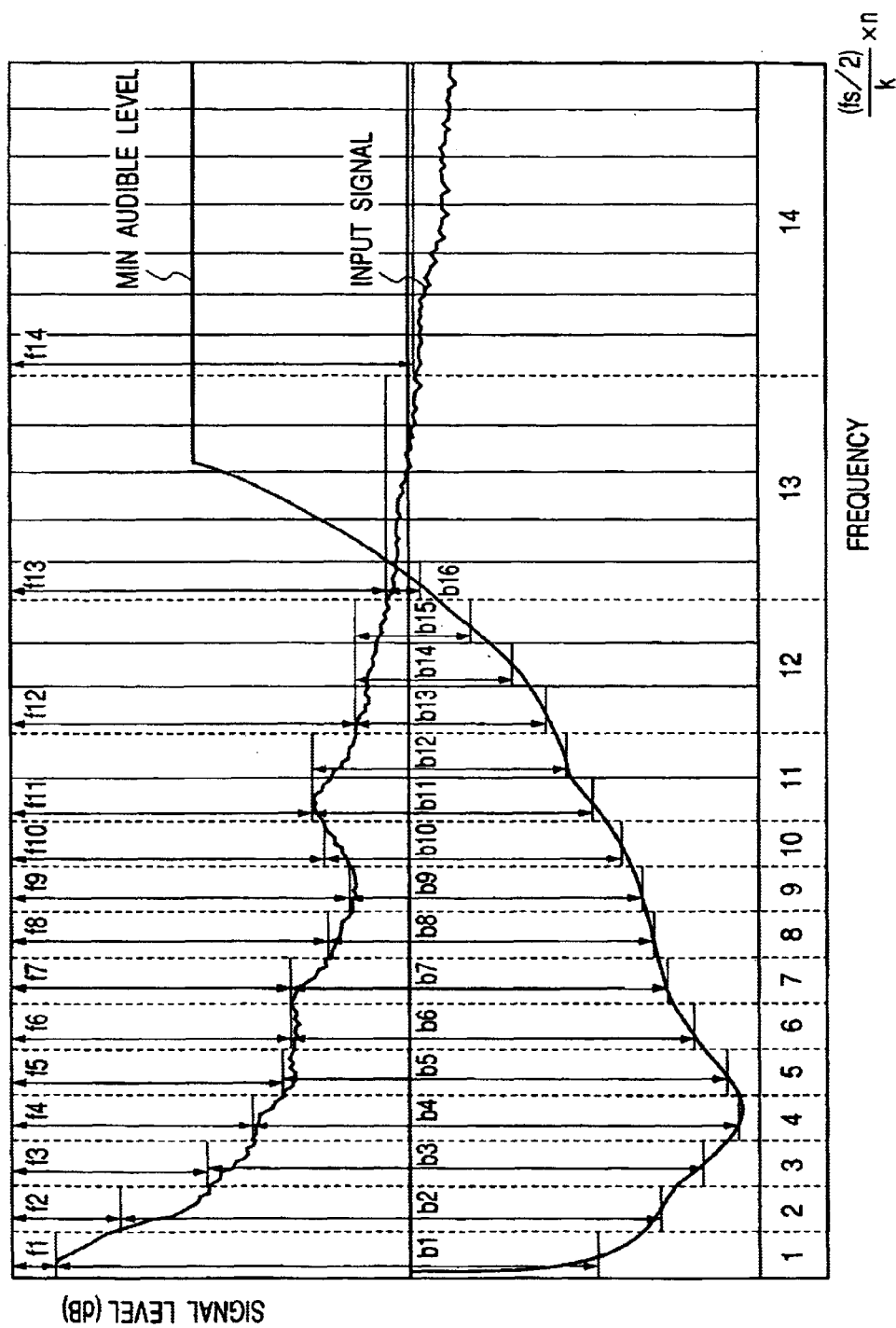
FIG. 17 shows a relation between a signal level and a frequency in subbands of a subband encoding input signal in one frame in a modification of the third embodiment.

An input signal, as illustrated in FIG. 17, has frequency characteristics for a time equivalent to one frame of the input signal 1101 in FIG. 5.

The scale factor grouping circuit 3 determines the scale factors (i.e., the group scale factor information 1113), as indicated by f1, f2, . . . , and f14 in the 14 subband groups in FIG. 17, respectively. Each of f1, f2, . . . , and f14 indicates a ratio of a maximum level of the input signal in one of the 14 subband groups to a normalized level.

The bit allocation circuit 4 determines ratios b1, b2, b3, . . . , and b27 in the 27 subbands, respectively. Each of the ratios b1, b2, b3, . . . , and b27 in the 27 subbands is a ratio of the value of the group scale factor information 1113 in each of the subband groups to an averaged value of a known minimum audible level curve in each of the subbands within the subband group. The determination of the averaged value of the minimum audible level curve in each of the subbands may be made in known various manners. The reason why b17 to b27 are not indicated in FIG. 17 is because the input signal is lower than the minimum audible level curve. In this case, a bit of 0 is allocated to each of the 17th subband to the 27th subband.

The bit allocation performed in the bit allocation circuit 4 using the energy rate will be described below. Assume that the number k of subbands is 32, the number m of subband groups is 14, the sampling frequency fs is 48 kHz, the upper limit frequency subband number n is 27, and the frame length time is ($32/48000$)sec.

The bit allocation circuit 4 determines the product of the energy rate in each subband and the possible number of bits to be allocated to one frame, ranks all the subbands in the order of magnitude of decimals of the products, and then omits the decimals of the products to provide the resultant integers as the bit allocation information 1114. Subsequently, the bit allocation circuit 4 calculate the sum of values indicated by the bit allocation information 1114 in all the subbands to determine the remaining number of bits which may be allocated according to the relation of (the possible number of bits to be allocated to one frame)−(the sum of values indicated by the bit allocation information 1114 in all the subbands) and allocates the remaining bits, in sequence, to the subbands ranked in the above order one to each. This is repeated until the remaining bits are all allocated to determine the final bit allocation information 1114.

The bit allocation which may alternatively be performed in the bit allocation circuit 4 using the energy rate and the weighted coefficient will be described below. Assume that the number k of subbands is 32, the number m of subband groups is 14, the sampling frequency fs is 48 kHz, the upper limit frequency subband number n is 27, and the frame length time is ($32/48000$)sec.

The bit allocation circuit 4 multiplies the product of the energy rate and the possible number of bits to be allocated to one frame calculated in each of the subbands by a weighted coefficient given in the corresponding one of the subbands. The weighted coefficient given in each of the subbands is for performing a weighting operation in a frequency domain of a given application and may be changed stepwise in a given range defined by the application. From each of the products after multiplied by the weighted coefficient, decimals are omitted to produce the bit allocation information 1114 in the same manner as described above.

The bit allocation which may alternatively be performed in the bit allocation circuit 4 using the energy rate and the weighted coefficient selected for each scale factors will be described below. Assume that the number k of subbands is 32, the number m of subband groups is 14, the sampling frequency fs is 48 kHz, the upper limit frequency subband number n is 27, and the frame length time is ($32/48000$)sec.

The bit allocation circuit 4 multiplies the product of the energy rate and the possible number of bits to be allocated to one frame calculated in each of the subbands by a weighted coefficient given in a corresponding one of the scale factors. The weighted coefficient given in each of the scale factors is for performing a weighting operation in an amplitude direction according to a given application and may be changed stepwise in a given range defined by the application. From each of the products after multiplied by the weighted coefficient, decimals are omitted to produce the bit allocation information 1114 in the same manner as described above.

The subband encoding system of this embodiment is, as apparent from the above discussion, designed to determine the number of bits to be allocated based on the group scale factor information derived by the scale factor information, re-quantize the subband signals, obtain the group scale factor flag information that indicates the event of change in the group scale factor information from that one frame earlier and updated group scale factor information to produce an encoded output signal using the re-quantized signals. This results in decreases in encoding operation load and encoding bit rate.

Figure 8:
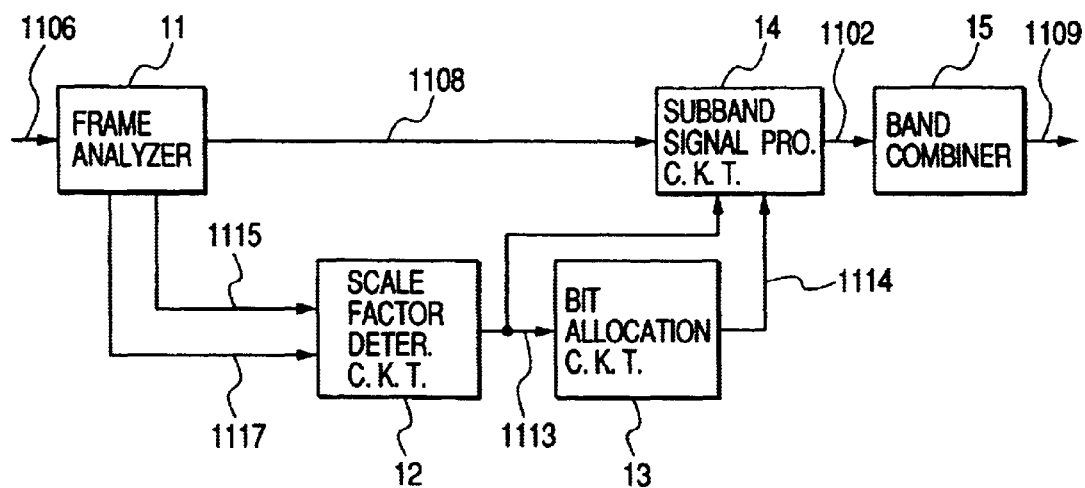
FIG. 8 is a block diagram which shows a subband decoding system according to the fourth embodiment of the invention.

FIG. 8 shows a subband decoding system according to the fourth embodiment of the invention.

The subband decoding system of this embodiment is designed to detects from an inputted signal the encoded frame structure information such as a re-quantized signal, the updated group scale factor information, and the group scale factor flag information from an inputted subband-encoded signal, obtain the group scale factor information from the updated group scale factor information and the group scale factor flag information, derive the bit allocation information based on the group scale factor information, and produce subband signals based on the group scale factor information and the bit allocation information, and the re-quantized signal.

The subband decoding system includes the frame analyzer 11, the scale factor detecting circuit 12, the bit allocation circuit 13, the subband signal producing circuit 14, and the band combining circuit 15.

The frame analyzer 11 extracts from the inputted encoded signal 1106, the group scale factor flag information 1115, the updated group scale factor information 1117, and the re-quantized signal 1108. The scale factor detecting circuit 12 produces the group scale factor information 1113 in the subbands. The bit allocation circuit 13 determines bit allocation in each subband using the group scale factor information 1117. Other arrangements are identical with those in the second embodiment.

The subband decoding operation performed in this embodiment will be described below in detail with reference to FIGS. 6, 7, and 8.

The encoded signal 1106 has the frame structure, as shown in FIG. 7. The frame analyzer 11 analyzes data contained in each frame. Specifically, the frame analyzer 11 establishes the synchronization of the frame based on the heater thereof to obtain m pieces of group scale factor flag information 1115, the updated group scale factor information 1117, and the re-quantized signals 1108 and outputs them on a frame basis. The following operations are performed on the frame basis.

The scale factor detecting circuit 12 uses the updated group scale factor information 1117, the group scale factor flag information 1115, and the scale factor information one frame earlier to produce the scale factor information in the k subbands and outputs it as the group scale factor information 1113. The scale factor detecting circuit 12 sets the scale factors in the (n+1)th to the kth subband to a value indicating a maximum scale factor, that is, a minimum signal amplitude. Similarly, the following operations deal with samples of the encoded signal 1106 over the frame length time as a unit input or a unit output.

The bit allocation circuit 13 determines bit allocation in each of the n subbands using the group scale factor information 1113 of a corresponding one of the n subbands and outputs it as the bit allocation information 1114. The bit allocation values in the (n+1)th to the kth subband are set to zero (0).

The subband signal producing circuit 14 detects the re-quantized signal 1108 in each of the subbands based on the bit allocation information 1114 to produce the subband signal 1102 using the group scale factor information 1113.

The band combining circuit 15 combines the subband signals 1102 inputted thereto to produce the decoded output signal 1109.

Alternative examples of the decoding operation in this embodiment will be described below using time charts of FIGS. 13 and 15.

Figure 13:
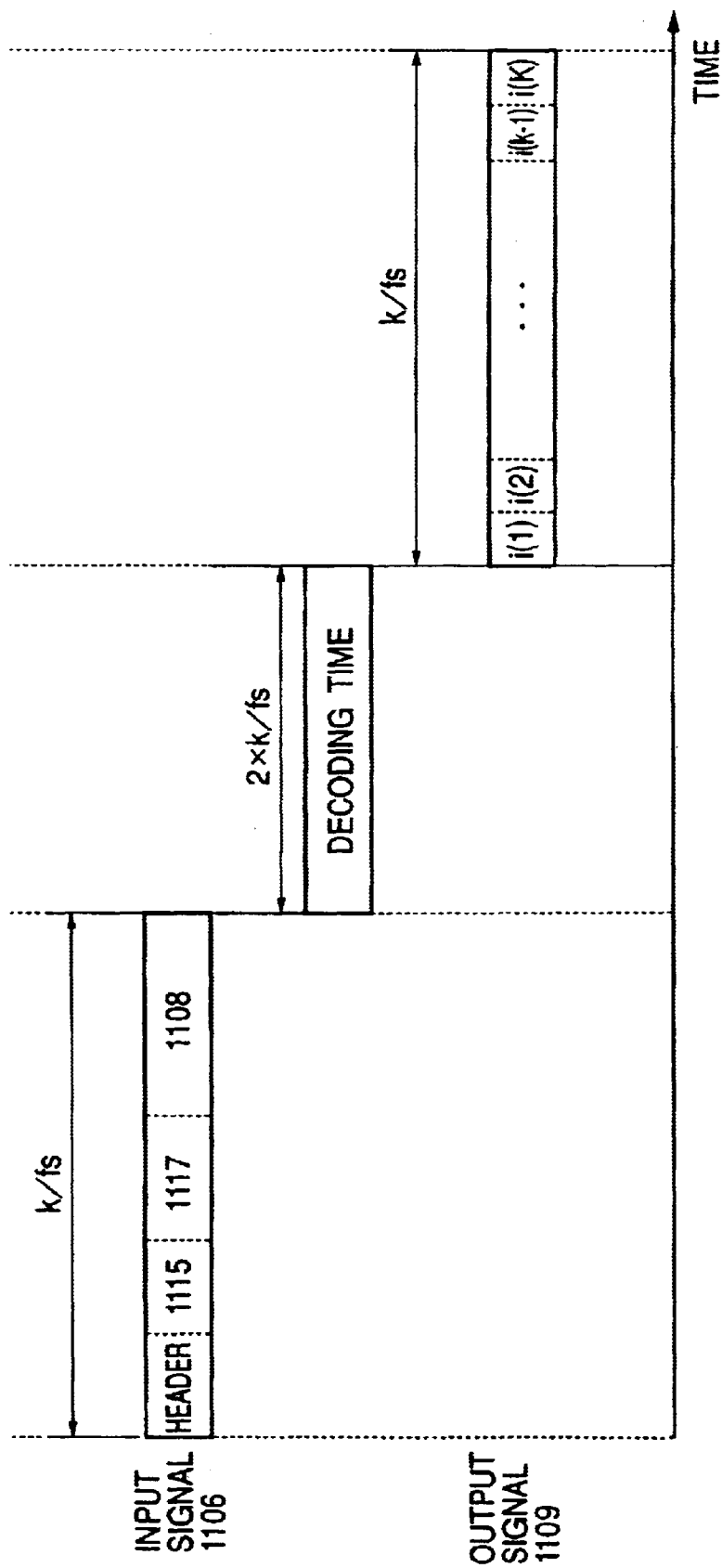
FIG. 13 shows frame structures of an input signal and a decoded output signal in the third embodiment of the invention.

In the case shown in FIG. 13, the decoding operation is performed within a time period of 2×k/fs in order to realize the real-time processing. In the case shown in FIG. 15, the decoding operation is performed within of 4×k/fs in order to realize the real-time processing.

The bit allocating operation is the same as that in the encoding operation as described above, and explanation thereof in detail will be omitted here.

The subband decoding system of this embodiment is, as apparent from the above discussion, designed to extract from the inputted subband encoded signal encoded frame constructing information such as the re-quantized signals, and the updated group scale factor information, produce the group scale factor information using the updated group scale factor information and the group scale factor flag information, determines the bit allocation based on the group scale factor information, and produce the subband signals using the group scale factor information, the bit allocation information, and the re-quantized signals. This results in a decrease in load of the subband decoding operation.

Figure 18:
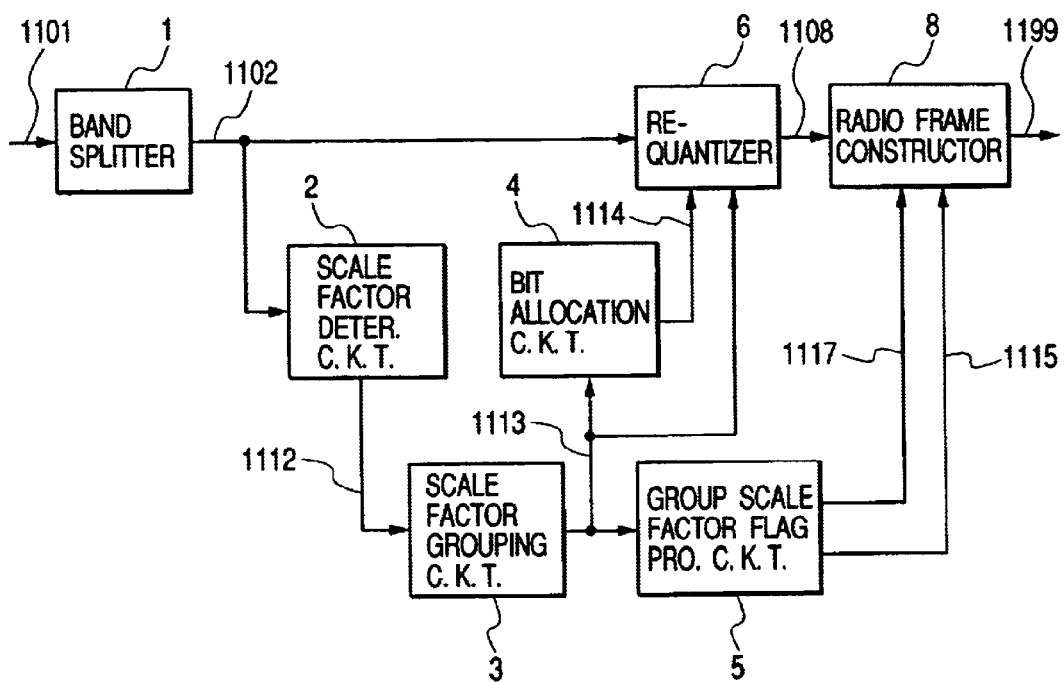
FIG. 18 is a block diagram which shows a subband encoding system according to the fifth embodiment for use in radio transmission.

FIG. 18 shows a subband encoding system for use in radio transmission according to the fifth embodiment of the invention which is designed to bring the frame length in an encoding operation into agreement with that in the radio transmission and pads a synchronization word for synchronization acquisition required by a receiver in encoded data.

The radio transmission frame constructing circuit 8 constructs an encoded frame using the updated group scale factor information 1117, the group scale factor flag information 1115 and the re-quantized signals 1108. Other arrangements in this system are identical with those in FIG. 5.

Figure 19:
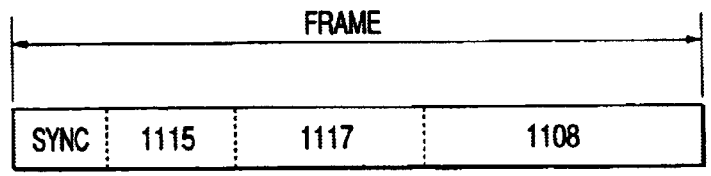
FIG. 19 shows the structure of a radio transmission frame in the fifth embodiment.

FIG. 19 shows the structure of a radio transmission frame in this embodiment which has padded radio transmission information sync such as a synchronization acquisition signal or guard time.

Figure 20:
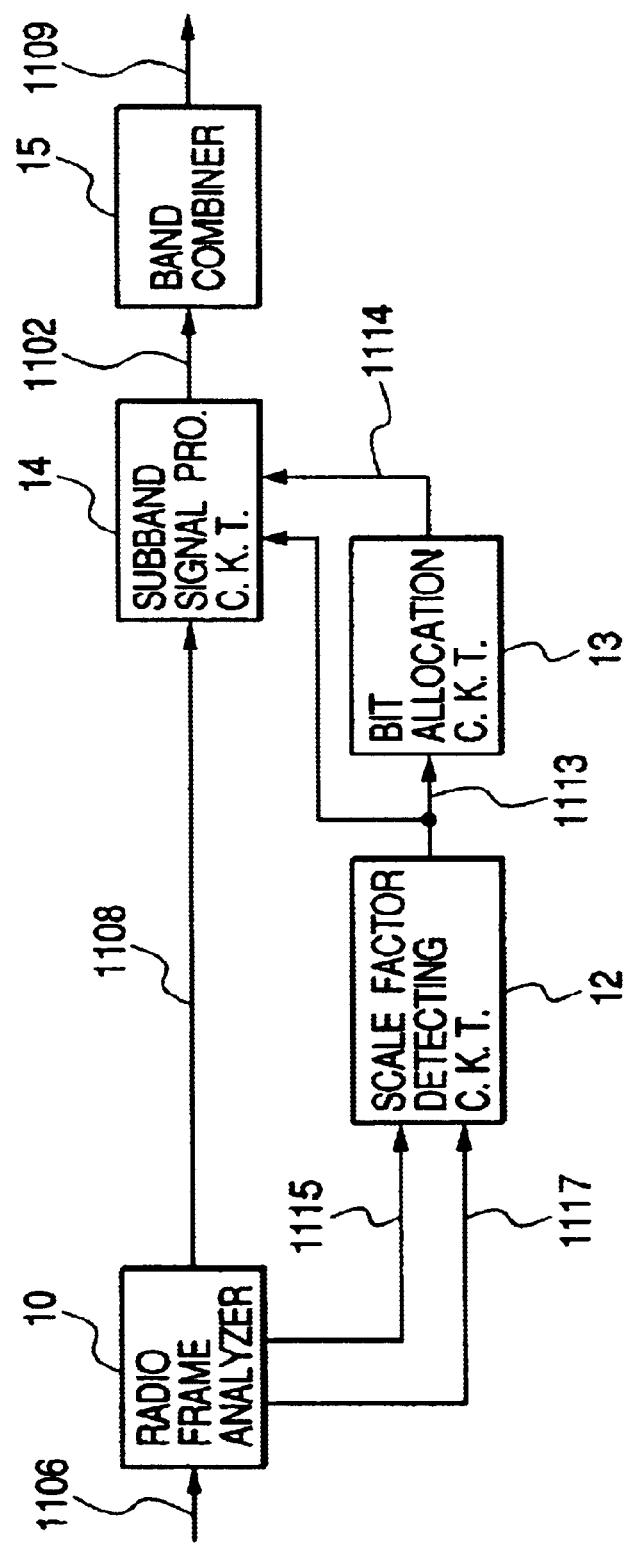
FIG. 20 is a block diagram which shows a subband decoding system according to the fifth embodiment for use in radio transmission.

FIG. 20 shows a subband decoding system employed in the radio transmission which includes the radio transmission frame analyzer 10 performs an operation such as synchronization acquisition required for the radio transmission to extract from the input signal 1106 the group scale factor flag information 1115, the updated group scale factor information 1116, and the re-quantized signals 1108. Other arrangements are identical with those in FIG. 8, and explanation thereof in detail will be omitted here.

In operation, when the signal 1101 is inputted to the subband encoding system, the band splitter 1 divides the input signal 1101 having a sampling frequency fs in frequency band into k subbands whose overall band is defined by the bandwidth of the Nyquist frequency (fs/2) of the input signals 1101. Note that k is a preselected one of integers. In the MPEG1 audio, the bandwidth of an input signal is divided into 32 regular subbands, but the input signal 1101 of this embodiment may alternatively be divided into a predetermined number of irregular subbands depending upon the design of filters. The number of subbands produced by the band splitter 1 is, as described above, k, but the band splitter 1 outputs the subband signals 1102 in n of the k subbands. Note that n is an integer selected from 1 to (k−1) and determined by an upper limit of a standard audible frequency. For example, the n subbands occupy a range of 20 kHz. The subband signals 1102 are baseband signals down-sampled using a known frequency modulation technique.

The scale factor determining circuit 2 measures a maximum level of amplitudes of samples of the subband signal 1101 in each of the n subbands corresponding to the frame length time in synchronism in time with the band splitter 1101 and then determines a scale factor for normalizing the maximum amplitude level to output it as the scale factor information 1112. The scale factors from the (n+1)th to the kth subband are set to a maximum scale factor, that is, a scale factor indicating a minimum signal amplitude value.

The scale factor grouping circuit 3 breaks down the scale factors in n of the k subbands into a preselected number m of units and outputs the group scale factor information 1113 in the same manner as described above. In the example, k=32, n=27, and m is a preselected natural number smaller than n. The value of m may be set to one of 1 to 26, but preferably determined in light of a known critical acoustic band.

The bit allocation circuit 4 uses the group scale factor information 1113 of the n subbands to determine bits to be allocated in each of the n subbands and outputs it as the bit allocation information 1114. Bits to be allocated in the (n+1)th to the kth subband are set to zero (0). Specifically, no bits are allocated in the (n+1)th to the kth subband.

The group scale factor flag producing circuit 5 determines whether the group scale factor information 1113 has changed from that one frame earlier and outputs the group scale factor flag information 1115 indicating the fact that the group scale factor information 1113 has changed. The group scale factor flag information 1115 is expressed in one bit in each of the m subbands. The group scale factor flag producing circuit 5 also outputs as the updated group scale factor information 1117 the group scale factor information 1113 only when it has changed from that one frame earlier. Simultaneously, the re-quantizer 6 uses the bit allocation information 1114 and the group scale factor information 1113 to re-quantize the subband signal 1102 in each of the subbands and outputs it as the re-quantized signal 1108.

The frame constructing circuit 7 inserts encoded frame synchronization signal into the inputs to construct the encoded frame, as shown in FIG. 19, which includes the group scale factor flag information 1115, the updated group scale factor information 1117, and the re-quantized signal 1108 and outputs it as the encoded radio transmission output signal 1105. The padded radio transmission information sync contains information required for the radio transmission such as a frame synchronization signal, a synchronization acquisition signal such as a clock synchronization signal, and a guard time needed for diversity switching or bi-directional switching.

The frame synchronization signal and the clock synchronization signal are expressed by a series of v fixed patterns each made of u bits called a synchronization word. Note that u and v may be variable integers, but are fixed values in this embodiment. For example, the synchronization signal is made up of a series of ten (=v) synchronization words each expressed in four-bit pattern "1001". The frame synchronization signal and the clock synchronization signal are not independent of each other, but expressed by a single synchronization signal which may be used in a clock synchronizing operation and a frame synchronizing operation in a decoding system, respectively. The radio transmission information sync is provided in a leading portion of the frame in time, but may alternatively be located in another portion if a given protocol is established between the encoding system and the decoding system. The same is true for the scale factor flag information 1115, the updated group scale factor information 1117, and the re-quantized signal 1108.

The encoded radio transmission output signal 1199 is modulated and then transmitted on a carrier wave having a transmission frequency. The transmitted wave is received by a receiving system. The receiving system converts the input in frequency into a base band frequency, demodulates, and subjects it to a radio transmission decoding operation.

The decoding operation will be described below with reference to FIG. 20.

The input signal 1106 to be decoded has the radio transmission encoded frame structure, as shown in FIG. 19. The ratio transmission frame analyzer 10 analyzes the information contained in the input signal 1106. Specifically, the radio transmission frame analyzer 10 acquires the synchronization of the radio transmission encoded frame and a decoding clock based on the radio transmission information sync, performs operations required for the radio transmission such as the diversity switching and the bi-directional switching within the guard time, extracts n pieces of group scale factor flag information 1115, the updated group scale factor information 1117, and the re-quantized signals 1108. In this example, k=32, and n=27.

The outputs from the radio transmission frame analyzer 10 are each provided on a frame basis. The following operations are performed on the frame basis.

The scale factor detecting circuit 12 produces the scale factor information in the k subbands based on the updated group scale factor information 1117, the group scale factor flag information 1115, and the scale factor information one frame earlier and outputs it as the group scale factor information 1113. The scale factor detecting circuit 12 sets the scale factors in the (n+1)th to the kth subband to a value indicating a maximum scale factor, that is, a minimum signal amplitude.

The bit allocation circuit 13 determines bit allocation in each of the n subbands using the group scale factor information 1113 and outputs it as the bit allocation information 1114. The bit allocation values in the (n+1)th to the kth subband are set to zero (0).

The subband signal producing circuit 14 detects the re-quantized signal 1108 in each of the subbands based on the bit allocation information 1114 to produce the subband signal 1102 using the group scale factor information 1113.

The band combining circuit 15 combines the subband signals 1102 inputted thereto to produce the decoded output signal 1109. The decoded output signal 1109 is made up of a combination of subband signals over the k subbands whose overall band is defined by the bandwidth of the Nyquist frequency (fs/2). Note that k is a given integer. In the MPEG1 audio, the bandwidth of an input signal is divided into 32 regular subbands, but may alternatively be divided into a predetermined number of irregular subbands depending upon the design of filters. The subband signals 1102 are baseband signals down-sampled using a known frequency modulation technique. The decoded output signal 1109 is outputted at a time interval that is the reciprocal of the sampling frequency fs. The amplitude level of the decoded output signal 1109 is expressed binary as a function of the number of quantized bits.

An example of producing an encoded signal into which a frame made up only of the radio transmission information sync is inserted and decoding it will be described below with reference to FIGS. 18, 20, and 21.

Figure 21:
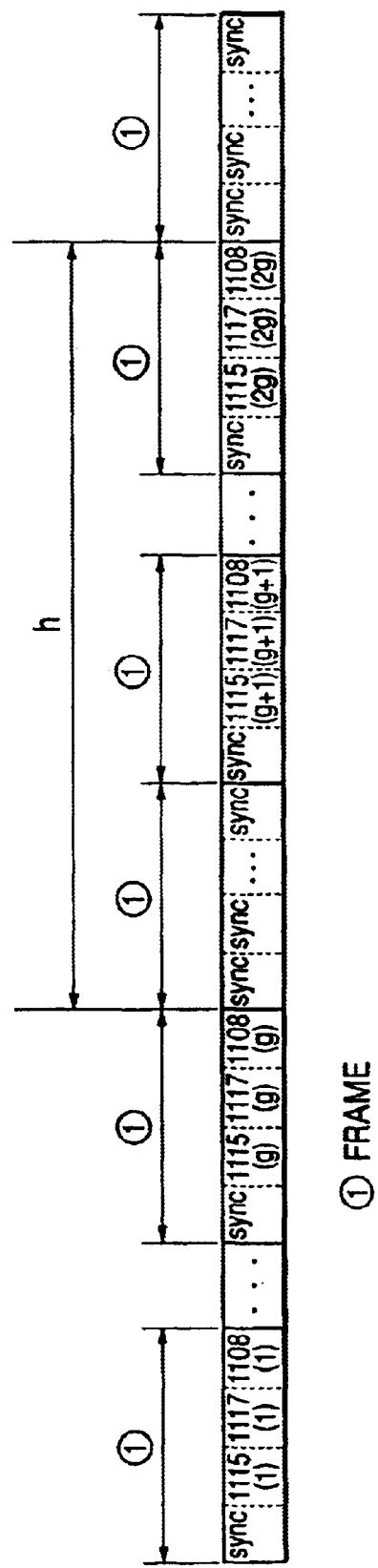
FIG. 21 shows a series of radio transmission frames produced by a subband encoding system of the fifth embodiment.

The radio transmission frame constructing circuit 8 pads the frame made up only of the radio transmission information sync, as shown in FIG. 21, in the output signal 1199 every fixed time interval h. In FIG. 21, the numbers in parenthesis indicate the time sequential numbers of the frames made up of the group scale factor flag information 1115, the updated group scale factor information 1117, and the re-quantized signal 1108. "g" is an integer more than or equal to two (2). The time interval h is expressed by the length of the radio transmission encoded frame×g. The padded radio transmission information sync contains, as described above, the information required for the radio transmission such as a frame synchronization signal, a synchronization acquisition signal such as a clock synchronization signal, and a guard time needed for diversity switching or bi-directional switching. The frame synchronization signal and the clock synchronization signal are expressed by a series of v fixed patterns each made of u bits called a synchronization word. The updated group scale factor information 1117(g+1) and the scale factor flag information 1115(g+1) located immediately after the frame made up only of the radio transmission information sync are dealt with as updated data on the updated group scale factor information 1117(g) and the scale factor flag information 1115(g) two frames earlier. The encoded ratio transmission output signal 1199 in FIG. 19 is modulated and then transmitted on a carrier wave having a transmission frequency.

The decoding operation of the subband decoding system, as shown in FIG. 20, designed to decode the encoded radio transmission output signal 1199 into which the above described frame made up only of the radio transmission information sync is inserted will be described below.

The input signal 1106 (i.e., the encoded radio transmission output signal 1199) has the radio transmission encoded frame structure, as shown in FIG. 21. The ratio transmission frame analyzer 10 analyzes the information contained in the input signal 1106. Specifically, the radio transmission frame analyzer 10 first detects the frame made up only of the radio transmission information sync, establishes the synchronization acquisition of the encoded radio transmission frame and the decoding clock using the radio transmission information or header sync contained, as shown in FIG. 19, in the encoded radio transmission frame, performs operations required for the radio transmission such as the diversity switching and the bi-directional switching within the guard time, extracts n pieces of group scale factor flag information 1115, the updated group scale factor information 1117, and the re-quantized signals 1108. The frames each made up only of the radio transmission information sync are processed using the periodicity that they are padded in the encoded radio transmission output signal 1199 at the fixed intervals h. Subsequently, all the padded radio transmission information is analyzed, and the synchronization acquisition operation is performed on the frame synchronization signal and the clock synchronization signal to improve the accuracy in the frame synchronization and the clock synchronization in processing the following frame. The subsequent operations are the same as those in the fourth embodiment, and explanation thereof in detail will be omitted here.

Figure 22:
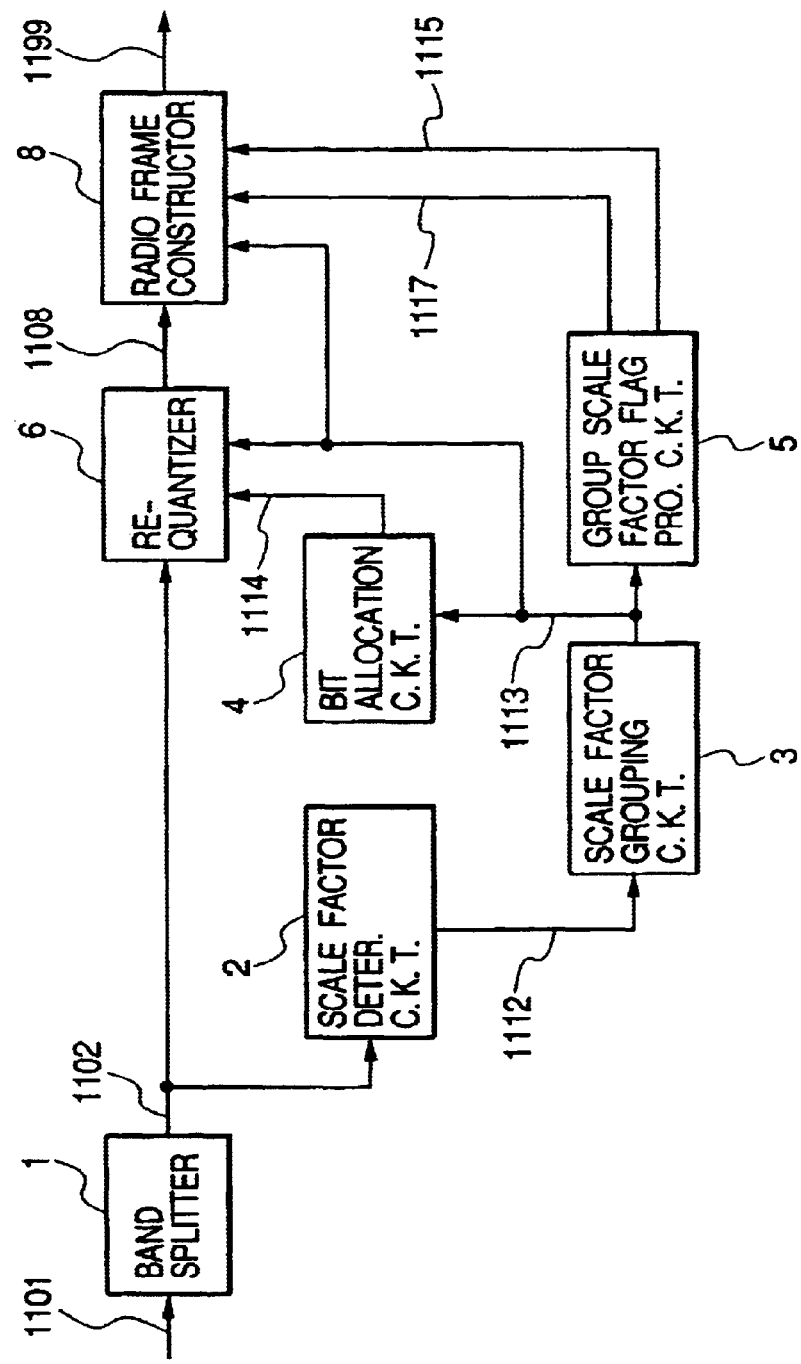
FIG. 22 is a block diagram which shows a subband encoding system according to a modification of the fifth embodiment.

FIG. 22 shows a subband encoding system for use in radio transmission designed to pad a frame made up only of the group scale factor information 1113 in the encoded radio transmission output signal 1199. Other operations are identical with those in the third embodiment, and explanation thereof in detail will be omitted here.

Figure 23:
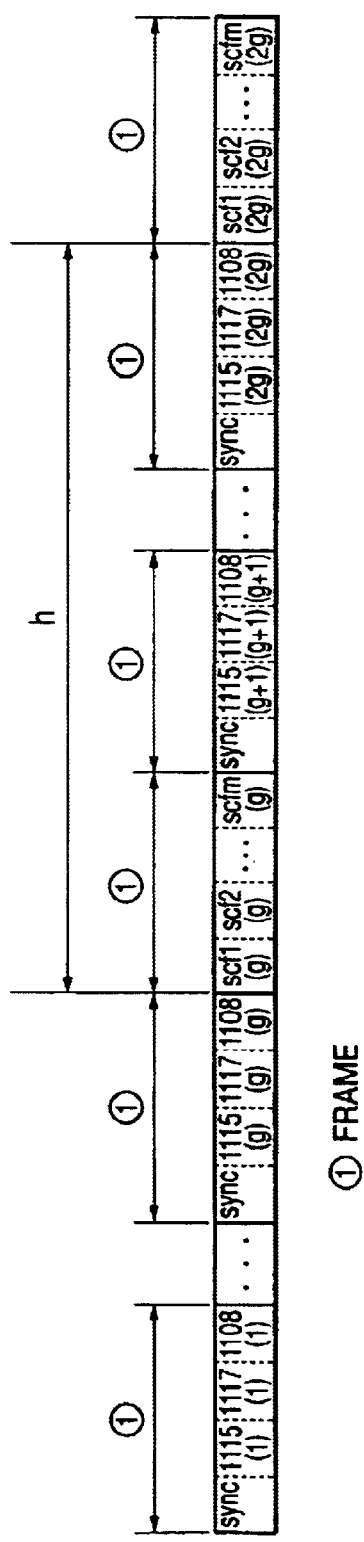
FIG. 23 shows the structure of a radio transmission frame in the modification in FIG. 22.

The radio transmission frame constructing circuit 8 receives the group scale factor information 1113 outputted from the scale factor grouping circuit 3 and inserts a frame, as shown in FIG. 23, made up only of the group scale factor information 1113 into the output signal 1199 every fixed time interval h. In FIG. 23, the numbers in parenthesis indicate the time sequential numbers of the frames. "g" is an integer more than or equal to two (2). The time interval h is expressed by the length of the encoded radio transmission frame, as indicated by $\hat{1}$ in FIG. 23×g. The padded radio transmission information sync contains, as described above, the information required for the radio transmission such as a frame synchronization signal, a synchronization acquisition signal such as a clock synchronization signal, and a guard time needed for diversity switching or bi-directional switching.

Each frame made up only of the group scale factor information 1113 is expressed, as shown in FIG. 23, by scf1 to scfm each of which is the group scale factor information 1113 of one of the m subband groups one frame earlier and contains t series of the group scale factor information scf1 to scfm where t is an integer meeting the following condition. T×(the number of bits required for expression of scf1 to scfm)≦(the possible number of bits to be allocated to one frame)

The thus encoded ratio transmission output signal 1199 in FIG. 22 is modulated and then transmitted on a carrier wave having a transmission frequency.

The decoding operation of the subband decoding system, as shown in FIG. 20, designed to decode the encoded radio transmission output signal 1199 into which the above described frame made up only of the group scale factor information 1133 is inserted will be described below.

The input signal 1106 (i.e., the encoded radio transmission output signal 1199) has the radio transmission encoded frame structure, as shown in FIG. 23. The ratio transmission frame analyzer 10 analyzes the information contained in the input signal 1106. Specifically, when detecting one of the frames made up of the updated group scale factor information 1117, the padded radio transmission information sync, the group scale factor flag information 1115, and the re-quantized signals 1108, the radio transmission frame analyzer 10 establishes the synchronization acquisition of the encoded radio transmission frame and the decoding clock using the radio transmission information or header sync contained, as shown in FIG. 23, in the encoded radio transmission frame, performs operations required for the radio transmission such as the diversity switching and the bi-directional switching within the guard time, extracts n pieces of group scale factor flag information 1115, the updated group scale factor information 1117, and the re-quantized signals 1108. The frames each made up only of the group scale factor information scf1 to scfm are processed using the periodicity that they are padded in the encoded radio transmission output signal 1199 at the fixed intervals h. Subsequently, all the group scale factor information is analyzed and used as reference data in processing the following frame. The subsequent operations are the same as those in the fourth embodiment, and explanation thereof in detail will be omitted here.

The second example of producing an encoded signal into which a longer frame made up only of the padded radio transmission information is inserted and decoding it will be described below with reference to FIGS. 20, 22, and 24.

Figure 24:
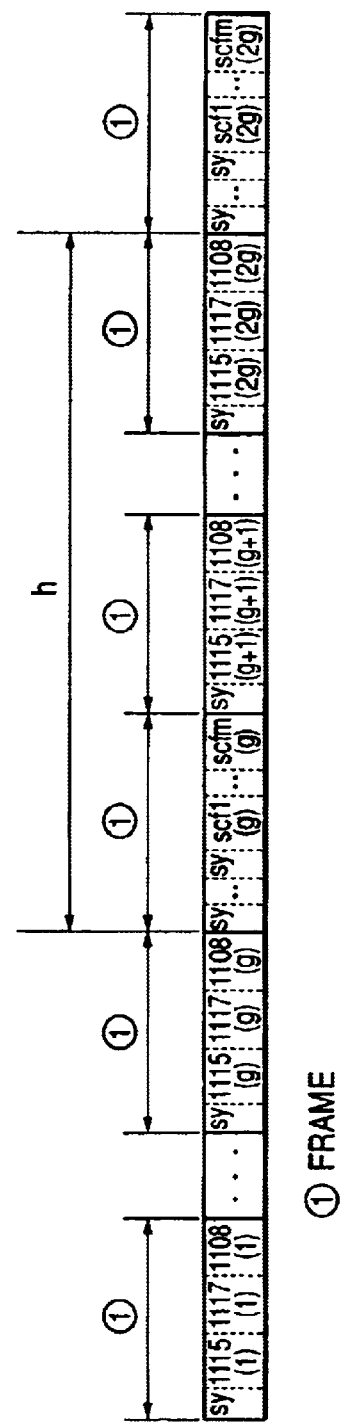
FIG. 24 shows the structure of a radio transmission frame in a modification of the fifth embodiment.

The radio transmission frame constructing circuit 8 in FIG. 22 receives the group scale factor information 1113 outputted from the scale factor grouping circuit 3, constructs a frame, as shown in FIG. 24, made up of the group scale factor information 1113 and the radio transmission information sy, and inserts it into the output signal 1199 every fixed time interval h. In FIG. 24, the numbers in parenthesis indicate the time sequential numbers of the frames. "g" is an integer more than or equal to two (2). The time interval h is expressed by the length of the encoded radio transmission frame, as indicated by $\hat{1}$ in FIG. 24×g. The padded radio transmission information sy contains the information required for the radio transmission such as a frame synchronization signal, a synchronization acquisition signal such as a clock synchronization signal, and a guard time needed for diversity switching or bi-directional switching. The frame synchronization signal and the clock synchronization signal contained in the frame consisting of the radio transmission information sy, the group scale factor flag information 1115, the updated group scale factor information 1117, the re-quantized signals 1108, and the radio transmission information sy are expressed by a series of v fixed patterns each made of u bits called a synchronization word.

The radio transmission information sy is padded in a leading portion of the frame, but may alternatively be padded in another portion if a given protocol is established between the encoding system and the decoding system.

Each of the longer frames made up of the group scale factor information 1113 and the radio transmission information sy consists of t series of m pieces of the group scale factor information scf1 to scfm of the m subband groups one frame earlier and r series of v patterns each made of u bits. "t" and "r" are integers which meet the following condition. (t×(the number of bits required for expression of scf1 to scfm))+(r+u+v)≦(the possible number of bits to be allocated to one frame)

The thus encoded ratio transmission output signal 1199 in FIG. 22 is modulated and then transmitted on a carrier wave having a transmission frequency.

The decoding operation of the subband decoding system, as shown in FIG. 20, designed to decode the encoded radio transmission output signal 1199 into which the above described frame is inserted will be described below.

The input signal 1106 (i.e., the encoded radio transmission output signal 1199) has the encoded radio transmission frame structure, as shown in FIG. 24. The ratio transmission frame analyzer 10 analyzes the information contained in the input signal 1106. Specifically, when detecting one of the frames made up of the updated group scale factor information 1117, the padded radio transmission information sy, the group scale factor flag information 1115, and the re-quantized signals 1108, the radio transmission frame analyzer 10 establishes the synchronization acquisition of the encoded radio transmission frame and the decoding clock using the radio transmission information or header sy contained, as shown in FIG. 24, in the encoded radio transmission frame, performs operations required for the radio transmission such as the diversity switching and the bi-directional switching within the guard time, extracts n pieces of group scale factor flag information 1115, the updated group scale factor information 1117, and the re-quantized signals 1108. The frames each made up of the group scale factor information scf1 to scfm and the radio transmission information sy longer than usual are processed using the periodicity that they are padded in the encoded radio transmission output signal 1199 at the fixed intervals h. Subsequently, the synchronization acquisition operation is performed on the frame synchronization signal and the clock synchronization signal to improve the accuracy in the frame synchronization and the clock synchronization in processing the following frame. All the group scale factor information is analyzed and used as reference data in processing the following frame. The subsequent operations are the same as those in the fourth embodiment, and explanation thereof in detail will be omitted here.

Figure 25:
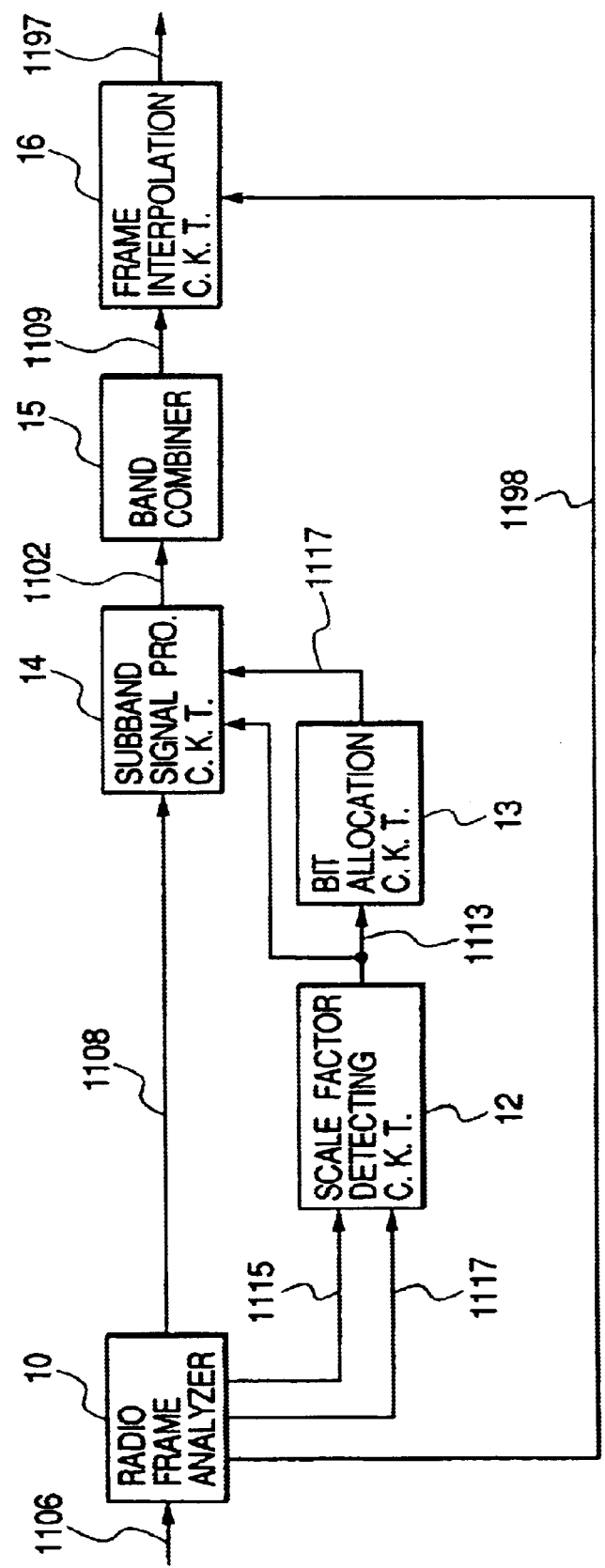
FIG. 25 is a block diagram which shows a subband decoding system according to the sixth embodiment for use in radio transmission.

FIG. 25 shows a subband decoding system according to the sixth embodiment of the invention which is designed to mute frames consisting of the group scale factor information, the synchronization word for the synchronization acquisition, or both transmitted at regular intervals and perform a data interpolation operation on a digital signal or analog signal in a decoding circuit.

The subband decoding system includes the frame interpolation circuit 16 working to establish frame interpolation of a decoded output signal. Other arrangements are identical with those in FIG. 20, and explanation thereof in detail will be omitted here.

Figure 26:
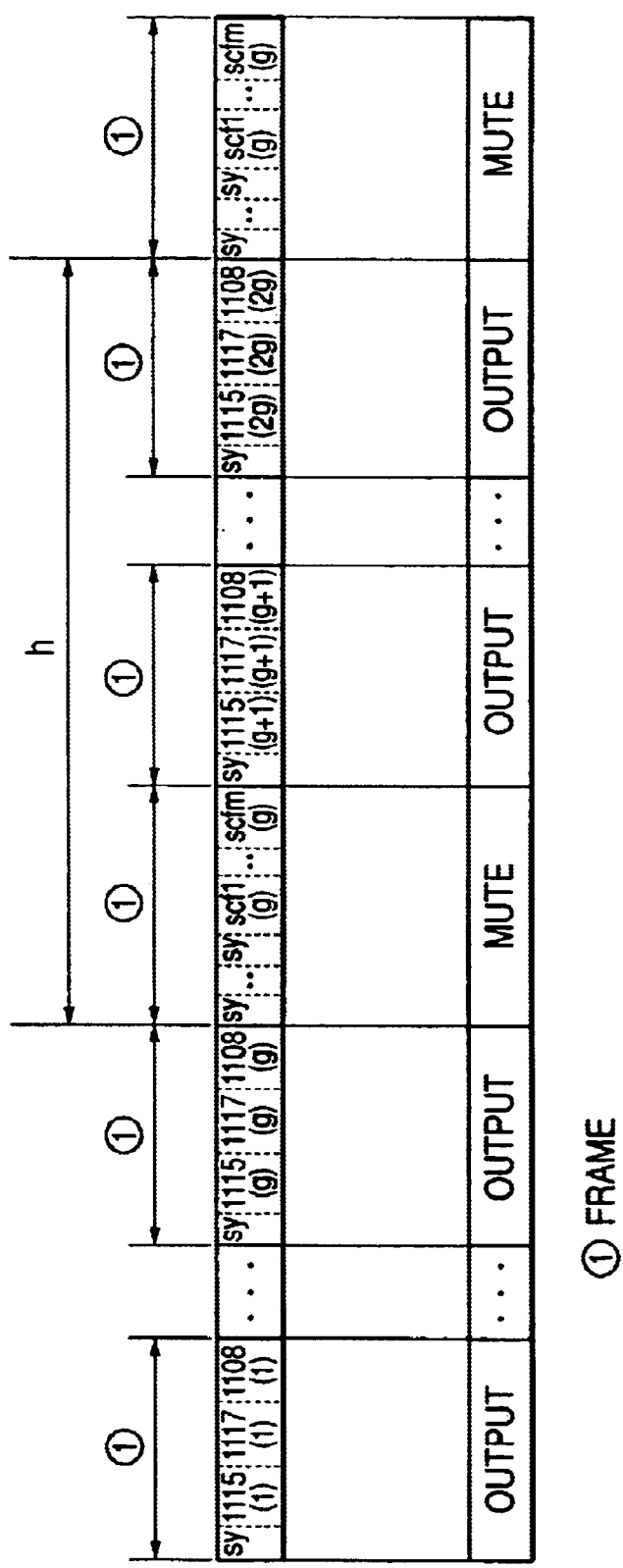
FIG. 26 shows the structure of a radio transmission frame in the modification of FIG. 25.

The input signal 1106 which is encoded in the same manner as described in the fifth embodiment is inputted to the radio transmission frame analyzer 10. The input signal 1106 has the encoded radio transmission frame structure, as shown in FIG. 26.

The ratio transmission frame analyzer 10 analyzes the information contained in the input signal 1106. Specifically, when detecting one of the frames made up of the updated group scale factor information 1117, the padded radio transmission information sy, the group scale factor flag information 1115, and the re-quantized signals 1108, the radio transmission frame analyzer 10 establishes the synchronization acquisition of the encoded radio transmission frame and the decoding clock using the radio transmission information or header sy contained, as shown in FIG. 26, in the encoded radio transmission frame, performs operations required for the radio transmission such as the diversity switching and the bi-directional switching within the guard time, extracts n pieces of group scale factor flag information 1115, the updated group scale factor information 1117, and the re-quantized signals 1108. The frames each made up of the group scale factor information scf1 to scfm and the radio transmission information sy are processed using the periodicity that they are padded in the encoded radio transmission output signal 1199 at the fixed intervals h Subsequently, the synchronization acquisition operation is performed on the frame synchronization signal and the clock synchronization signal to improve the accuracy of the frame synchronization and the clock synchronization in processing the following frame. All the group scale factor information 1113 is analyzed and used as reference data in processing the following frame.

The ratio transmission frame analyzer 10 also produces a frame interpolation control signal 1198 to the frame interpolation circuit 16 as a function of whether a frame now detected is one of the frames made up of the group scale factor information 1113 and the radio transmission information sy or not. If the frame being detected by the frame analyzer 10 is the frame made up of the group scale factor information 1113 and the radio transmission information sy, the frame interpolation control signal 1198 is, as clearly shown in FIG. 26, a mute command signal having a frame interpolation command. If not, the frame interpolation control signal 1198 is an output command signal to output the encoded output signal 1109 as it is. The mute command signal and the output command signal are each produced in the form of a binary signal. The amount of information on one command is not limited. The other decoding operations are the same as those in the fifth embodiment, and explanation thereof in detail will be omitted here.

The frame interpolation circuit 16 is responsive to the mute command signal inputted from the radio transmission frame analyzer 10 to perform the frame interpolation of the encoded output signal 1109 from the band combining circuit 15, while it is responsive to the output command signal to output the encoded output signal 1109 as it is. The frame interpolation performed in the frame interpolation circuit 16 is a typical audio interpolation of digital signals.

Figure 27:
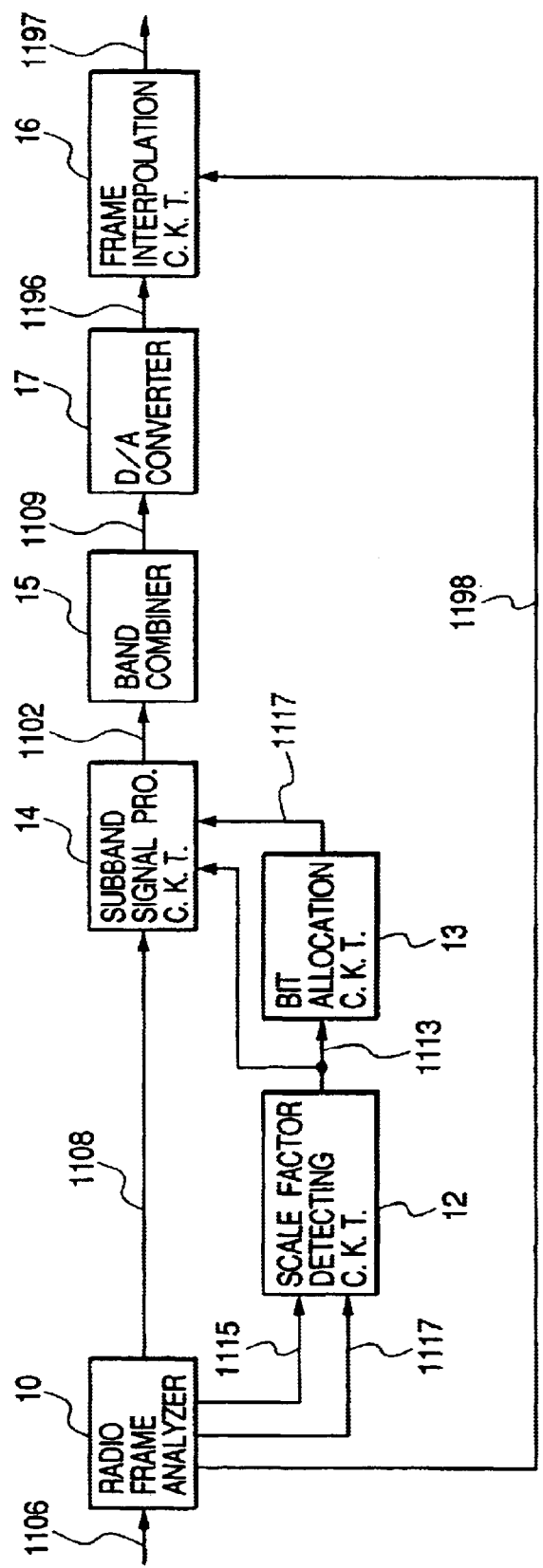
FIG. 27 is a block diagram which shows a subband decoding system according to a modification of the sixth embodiment.

FIG. 27 shows a modification of the subband decoding system according to the sixth embodiment which is designed to convert a decoded output signal into an analog signal and perform the frame interpolation thereof. Other arrangements are identical with those in FIG. 25.

The input signal 1106 has the encoded radio transmission frame structure, as shown in FIG. 26. The ratio transmission frame analyzer 10 analyzes the information contained in the input signal 1106. Specifically, when detecting one of the frames made up of the updated group scale factor information 1117, the padded radio transmission information sy, the group scale factor flag information 1115, and the re-quantized signal 1108, the radio transmission frame analyzer 10 acquires the synchronization of the encoded radio transmission frame and the decoding clock using the radio transmission information or header sy contained, as shown in FIG. 26, in the encoded radio transmission frame, performs operations required for the radio transmission such as the diversity switching and the bi-directional switching within the guard time, extracts n pieces of group scale factor flag information 1115, the updated group scale factor information 1117, and the re-quantized signals 1108. The frames each made up of the group scale factor information scf1 to scfm and the radio transmission information sy are processed using the periodicity that they are padded in the encoded radio transmission output signal 1199 at the fixed intervals h. Subsequently, the synchronization acquisition operation is performed on the frame synchronization signal and the clock synchronization signal to improve the accuracy of the frame synchronization and the clock synchronization in processing the following frame. All the group scale factor information 1113 is analyzed and used as reference data in processing the following frame.

The ratio transmission frame analyzer 10 also produces the frame interpolation control signal 1198 to the frame interpolation circuit 16 as a function of whether a frame now detected is one of the frames made up of the group scale factor information 1113 and the radio transmission information sy or not. If the frame being detected by the frame analyzer 10 is the frame made up of the group scale factor information 1113 and the radio transmission information sy, the frame interpolation control signal 1198 is, as clearly shown in FIG. 26, a mute command signal indicating a frame interpolation command. If not, the frame interpolation control signal 1198 is an output command signal to output the encoded radio transmission output signal 1199. The mute command signal and the output command signal are expressed in a binary signal. The amount of information on one command is not limited. The following decoding operations are the same as those in the fifth embodiment, and explanation thereof in detail will be omitted here.

The D/A converter 17 converts the encoded digital output signal 1109 from the band combining circuit 15 into the analog signal 1196 and outputs it to the frame interpolation circuit 16. The frame interpolation circuit 16 is responsive to the mute command signal inputted from the radio transmission frame analyzer 10 to perform the frame interpolation of the analog signal 1196 from the D/A converter 17, while it is responsive to the output command signal to output the analog signal 1196 as it is. The frame interpolation performed in the frame interpolation circuit 16 is a typical audio interpolation using a filtering technique.

The subband decoding system of the sixth embodiment is, as described above, designed to mute the frames made up of the group scale factor information, the synchronization words, or both and perform an operation of the data interpolation on a digital signal or an analog signal in the decoding circuit, thereby avoiding detection of a data blank of one frame produced in the encoding or decoding operation by a user's interface.

Figure 28:
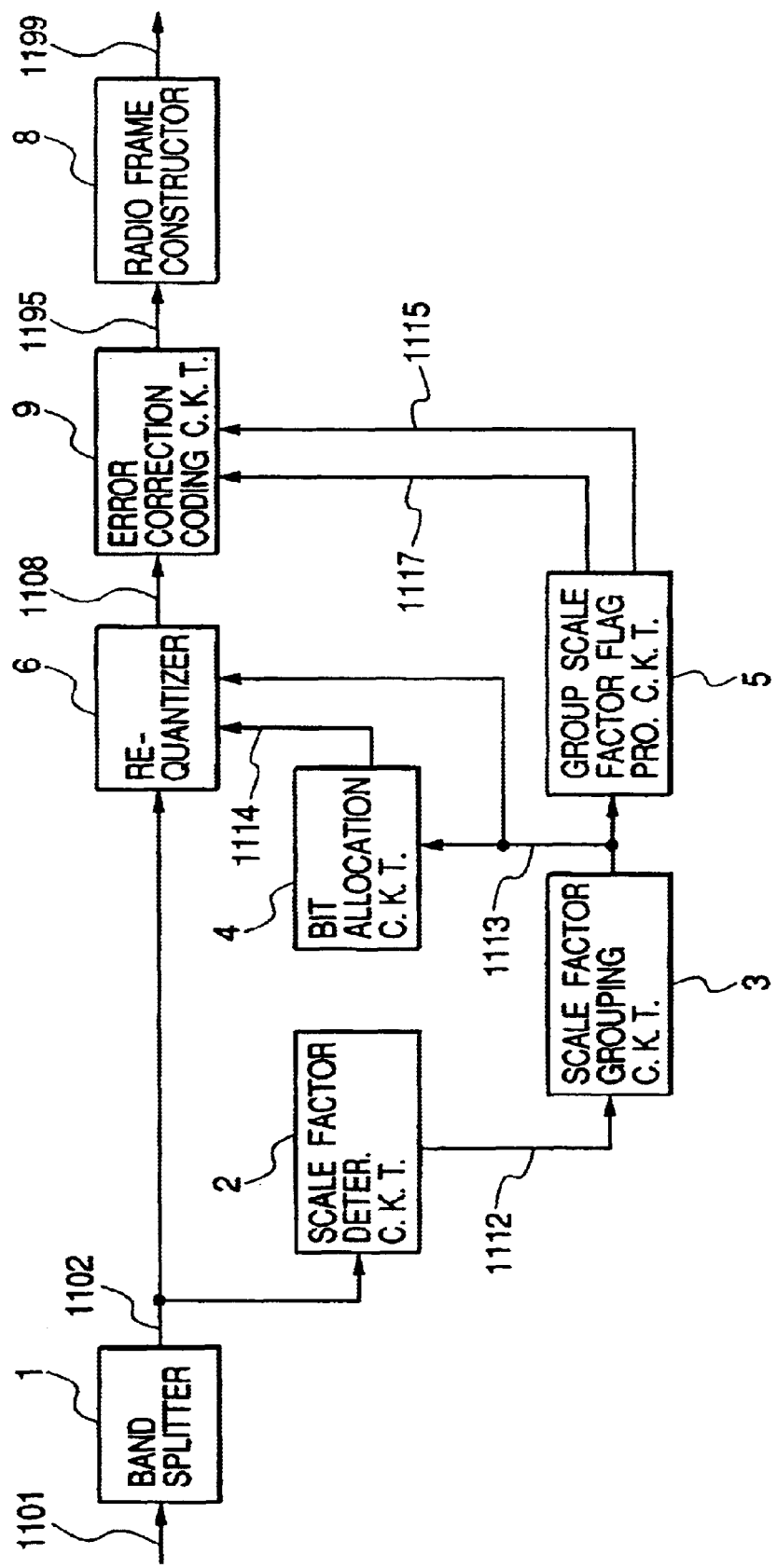
FIG. 28 is a block diagram which shows a subband encoding system according to the seventh embodiment of the invention designed to perform error correction encoding for an encoded signal.

FIG. 28 shows a subband encoding system according to the seventh embodiment of the invention which is designed to perform error correction encoding using a BCH code or a convolutional code.

The subband encoding system of this embodiment includes the error correction encoding circuit 9 which performs an error correction encoding operation on the re-quantized signal 1108, the updated group scale factor information 1117, and the group scale factor flag information 1115. Other arrangements are identical with those of the fifth embodiment in FIG. 18.

Figure 31:
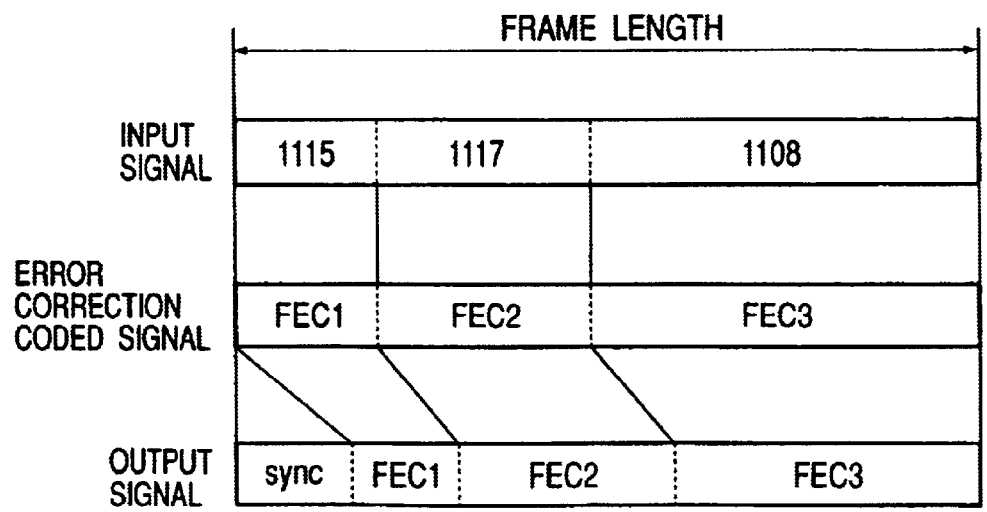
FIG. 31 shows frame structures of an input signal to an error correction encoding circuit, an output signal of the error correction encoding circuit, and an encoded output signal in a modification of the seventh embodiment.

The error correction encoding circuit 9 performs error correction encoding operations on the group scale factor flag information 1115, the updated group scale factor information 1117, and the re-quantized signal 1108 in a relation, as shown in FIG. 31, to produce the error correction encoded output signal 1195. The error correction encoding circuit 9 uses as error correction codes, block codes, convolutional codes, or connecting codes.

Figure 30:
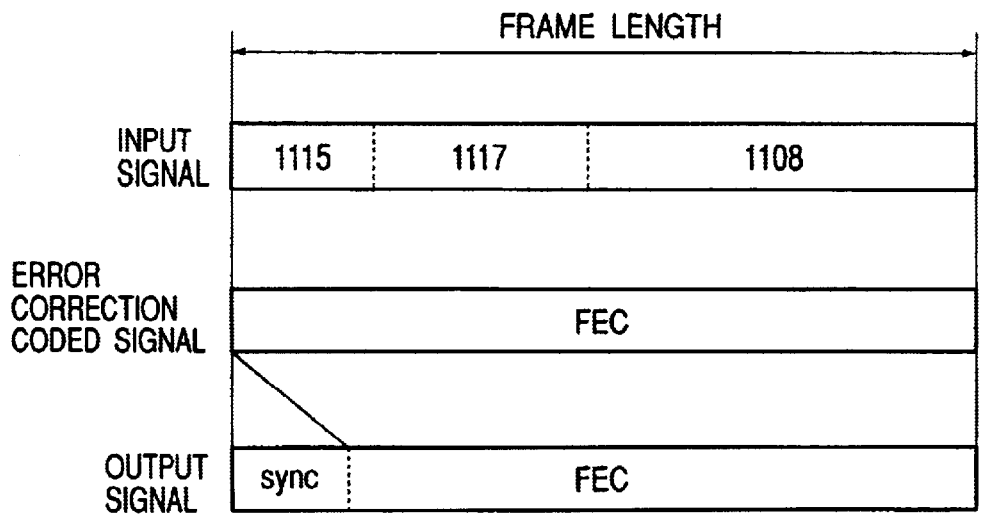
FIG. 30 shows frame structures of an input signal to an error correction encoding circuit, an output signal of the error correction encoding circuit, and an encoded output signal in the seventh embodiment.

In the case of the frame structure, as shown in FIG. 30, the error correction encoding operations are performed on the group scale factor flag information 1115, the updated group scale factor information 1117, and the re-quantized signal 1108 in that order, however, the order may be changed if a given protocol is established between the encoding system and the decoding system.

The ratio transmission frame constructing circuit 8 pads the radio transmission information sync, as shown in FIG. 30, in the error correction encoded output signal 1195 to construct the radio transmission frame and outputs it as the encoded radio transmission output signal 1199. The encoded radio transmission output signal 1199 is modulated and then transmitted on a carrier wave.

Figure 29:
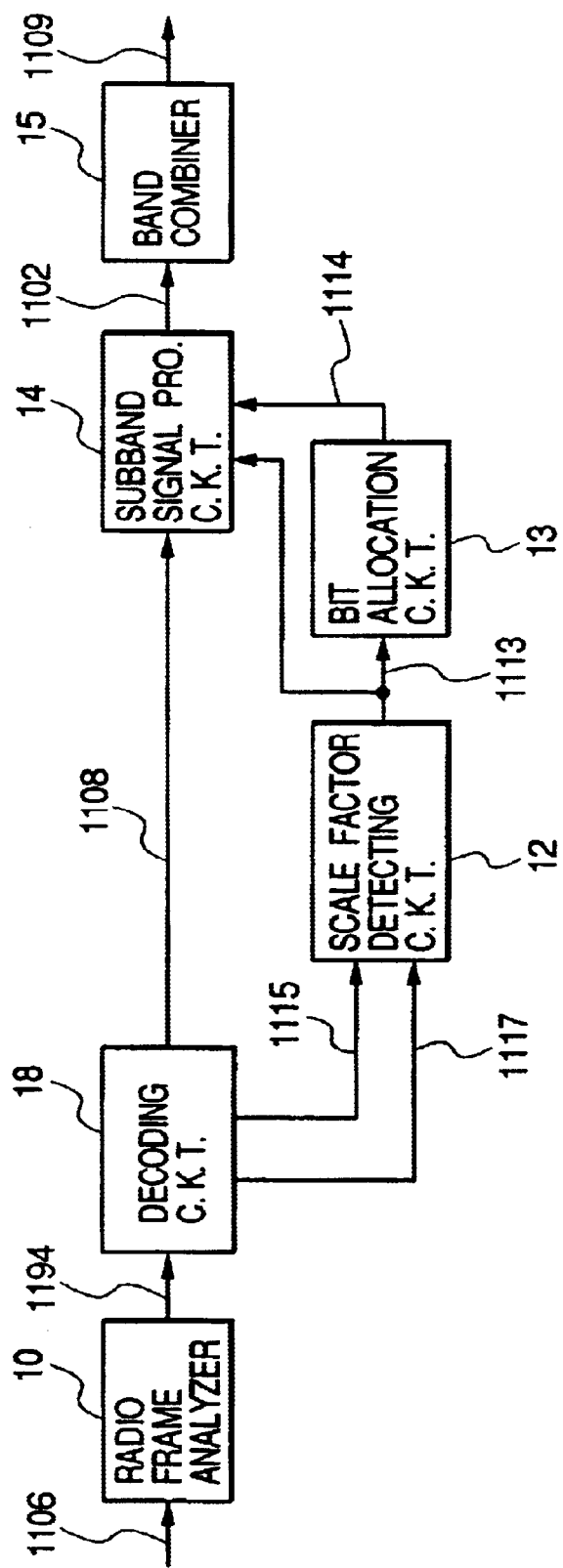
FIG. 29 is a block diagram which shows a subband decoding system according to the seventh embodiment of the invention designed to decodes error correction encoded signals inputted thereto.

FIG. 29 shows a subband decoding system according to the seventh embodiment of the invention which decodes signals error correction-encoded by a subband encoding system such as the one shown in FIG. 28.

The radio transmission frame analyzer 10 analyzes the radio transmission information sync padded in the encoded input signal 1106 and produces the information FEC from which the radio transmission information sync is removed as the error correction encoded signal 1194. Specifically, the radio transmission frame analyzer 10 uses the radio transmission information sync to acquire the synchronization of the radio transmission encoded frame and the decoding clock and performs operations required for the radio transmission such as the diversity switching and the bi-directional switching within the guard time. The error correction encoded signal decoding circuit 18 performs an error correcting/decoding operation on the error correction encoded signal 1194 to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

An example of use of three error correcting codes will be described below with reference to FIGS. 28, 29, and 31.

In the encoding operation, the error correction encoding circuit 9 performs the error correction encoding on the group scale factor flag information 1115, the updated group scale factor information 1117, and the re-quantized signal 1108. The error correction encoding is achieved, as shown in FIG. 31, by subjecting the group scale factor flag information 1115, the updated group scale factor information 1117, and the re-quantized signal 1108 to error correction encoding operations different in error correcting capability from each other to produce error correction code words FEC1, FEC2, and FEC3, respectively, which are, in turn, outputted in a frame, as shown in FIG. 31, to the radio transmission frame constructing circuit 8.

The error correcting capabilities of the error correction encoding operations in the error correction encoding circuit 9 are stronger in the order of the group scale factor flag information 1115, the updated group scale factor information 1117, and the re-quantized signal 1108. This is for establishing the dependence on production of the bit allocation information which is greater in the order of the group scale factor flag information 1115, the updated group scale factor information 1117, and the re-quantized signal 1108. The code errors in the group scale factor flag information 1115 and the updated group scale factor information 1117 usually impinge greatly on several frames until the erroneous information is updated. This is a serious problem.

The time-sequential orders of the error correction encoding operations and the error correction code words FEC1, FEC2, and FEC3 are not limited to the ones as described above, but they may be changed if a given protocol is established between the encoding system and the decoding system.

The radio transmission frame constructing circuit 8 adds the radio transmission information sync to the error correction encoded output signal 1195 (i.e., the frame made up of the error correction code words FEC1, FEC2, and FEC3)and outputs it as the encoded output signal 1199. The encoded output signal 1199 is modulated and then transmitted on a carrier wave.

In the decoding operation in FIG. 29, the radio transmission frame analyzer 10 analyzes the radio transmission information sync padded in the encoded input signal 1106 and produces the information from which the radio transmission information sync, as shown in FIG. 31, is removed as the error correction encoded signal 1194. Specifically, the radio transmission frame analyzer 10 uses the radio transmission information sync to acquire the synchronization of the radio transmission encoded frame and the decoding clock and performs operations required for the radio transmission such as the diversity switching and the bi-directional switching within the guard time. The error correction encoded signal decoding circuit 18 performs error correcting/decoding operations different in error correction ability from each other on the error correction code words FEC1, FEC2, and FEC3 to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

An example of use of three BCH codes will be described below with reference to FIGS. 32, 33, and 34.

Figure 32:
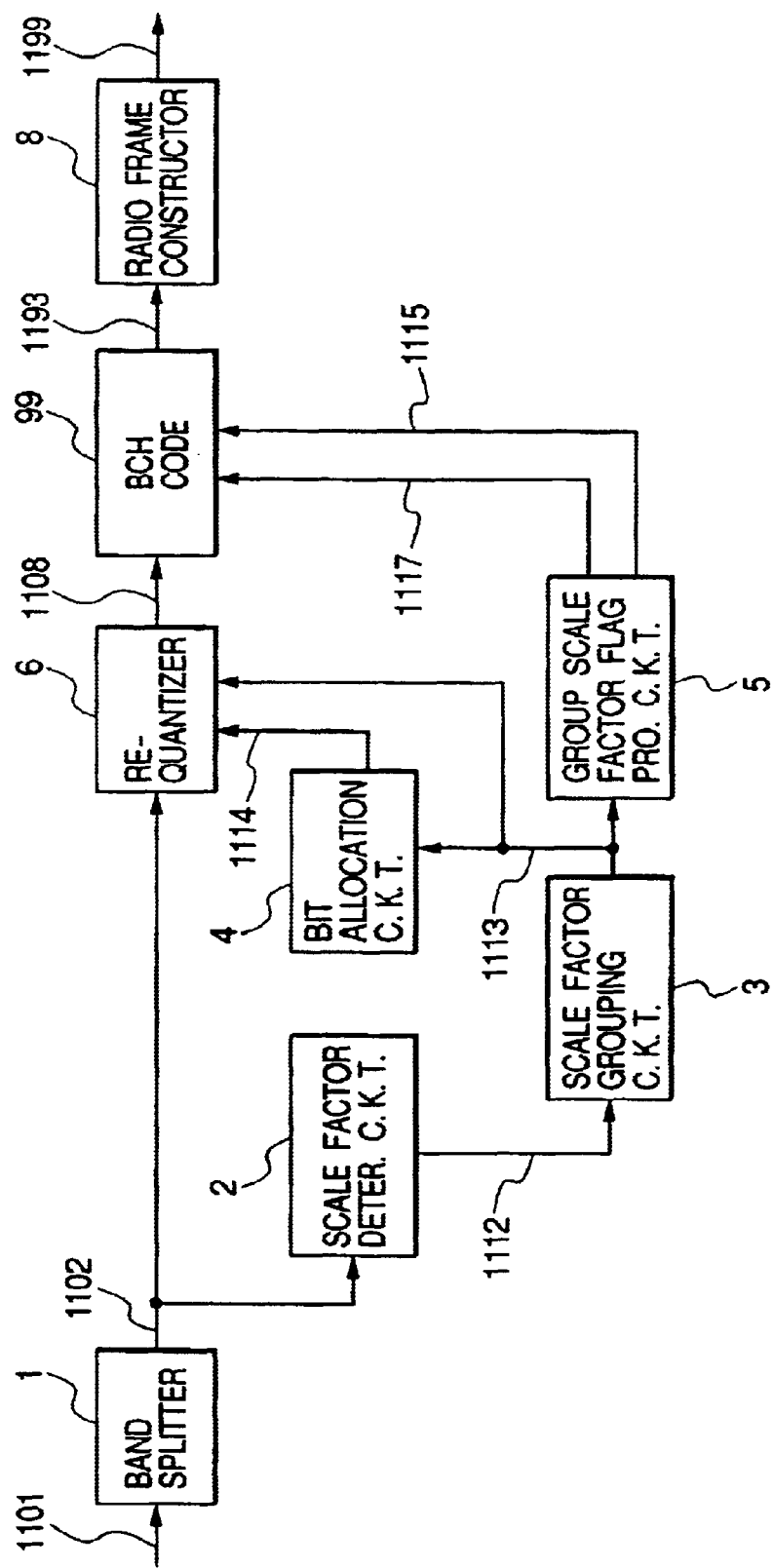
FIG. 32 is a block diagram which shows a subband encoding system according to a modification of the seventh embodiment.

The subband encoding system in FIG. 32 is different from the one shown in FIG. 28 only in the BCH encoding circuit 99. Other arrangements are identical, and explanation thereof in detail will be omitted here.

The BCH encoding circuit 99 performs error correction encoding on the group scale factor flag information 1115, the updated group scale factor information 1117, and the re-quantized signal 1108 using the BCH codes. The error correction encoding is achieved by subjecting an input frame consisting of, as shown in FIG. 34, the group scale factor flag information 1115, the updated group scale factor information 1117, and the re-quantized signal 1108 to BHC encoding operations different in error correcting capability from each other to produce BCH code words BCH1, BCH2, and BCH3, respectively, which are, in turn, outputted in a frame, as shown in FIG. 34, as the BCH encoded output signal 1193 to the radio transmission frame constructing circuit 8.

The error correcting capabilities of the BHC encoding operations in the BCH encoding circuit 99 are stronger in the order of the group scale factor flag information 1115, the updated group scale factor information 1117, and the re-quantized signal 1108. This is for establishing the dependence on production of the bit allocation information which is greater in the order of the group scale factor flag information 1115, the updated group scale factor information 1117, and the re-quantized signal 1108. The code errors in the group scale factor flag information 1115 and the updated group scale factor information 1117 usually impinge greatly on several frames until the erroneous information is updated. This is a serious problem.

The time-sequential orders of the BCH encoding operations and the BCH code words BCH1, BCH2, and BCH3 are not limited to the ones as described above, but they may be changed if a given protocol is established between the encoding system and the decoding system.

Figure 34:
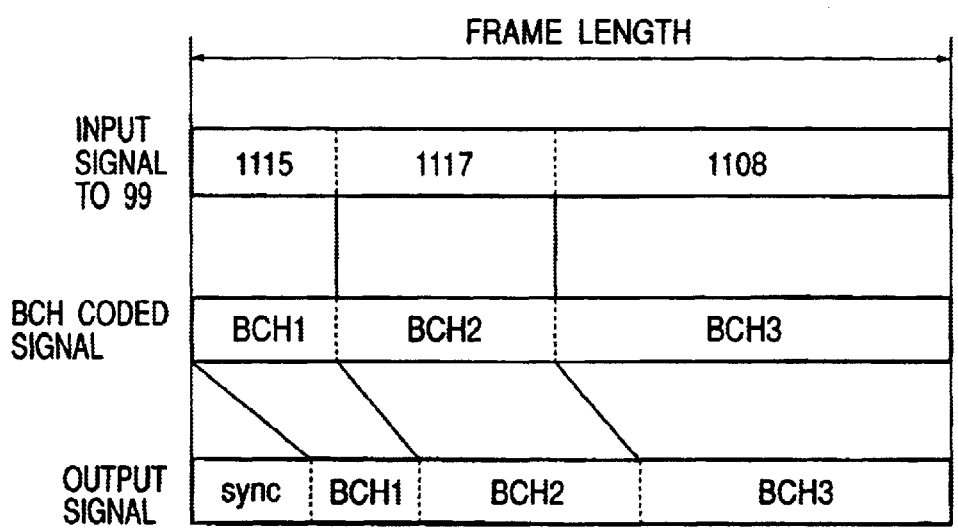
FIG. 34 shows frame structures of an input signal to a BCH encoding circuit, an output signal of the BCH encoding circuit, and an encoded output signal in the modification of FIG. 32.

The radio transmission frame constructing circuit 8 adds the radio transmission information sync, as shown in FIG. 34, to the BCH encoded output signal 1193 (i.e., the frame made up of the BCH code words BCH1, BCH2, and BCH3) and outputs it as the encoded output signal 1199. The encoded output signal 1199 is modulated and then transmitted on a carrier wave.

Figure 33:
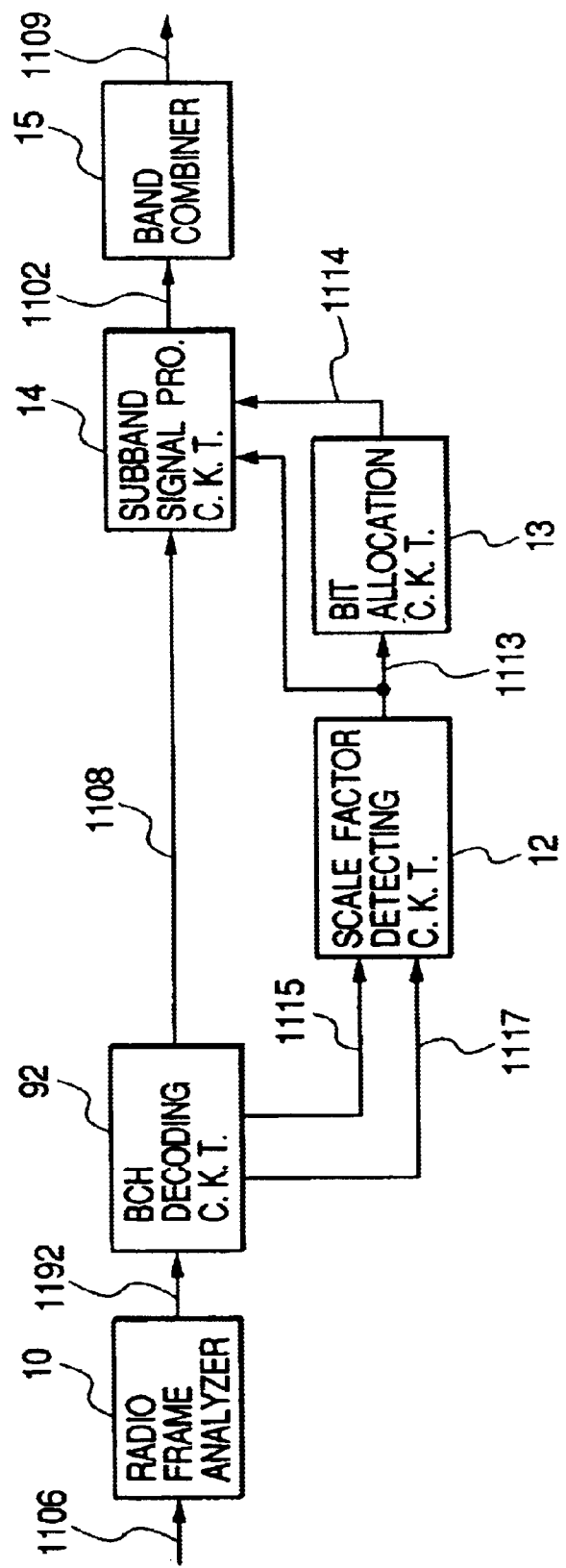
FIG. 33 is a block diagram which shows a subband decoding system decoding an input signal encoded by the modification of FIG. 32.

In the decoding operation in FIG. 33, the radio transmission frame analyzer 10 analyzes the radio transmission information sync padded in the encoded input signal 1106 and produces the BCH encoded signal 1192 made up of the BCH code words BCH1, BCH2, and BCH3 from which the radio transmission information sync is removed. Specifically, the radio transmission frame analyzer 10 uses the radio transmission information sync to acquire the synchronization of the radio transmission encoded frame and the decoding clock and performs operations required for the radio transmission such as the diversity switching and the bi-directional switching within the guard time. The BCH encoded signal decoding circuit 98 performs BCH-decoding operations different in error correcting capability from each other on the BCH code words BCH1, BCH2, and BCH3, respectively, to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

Figure 35:
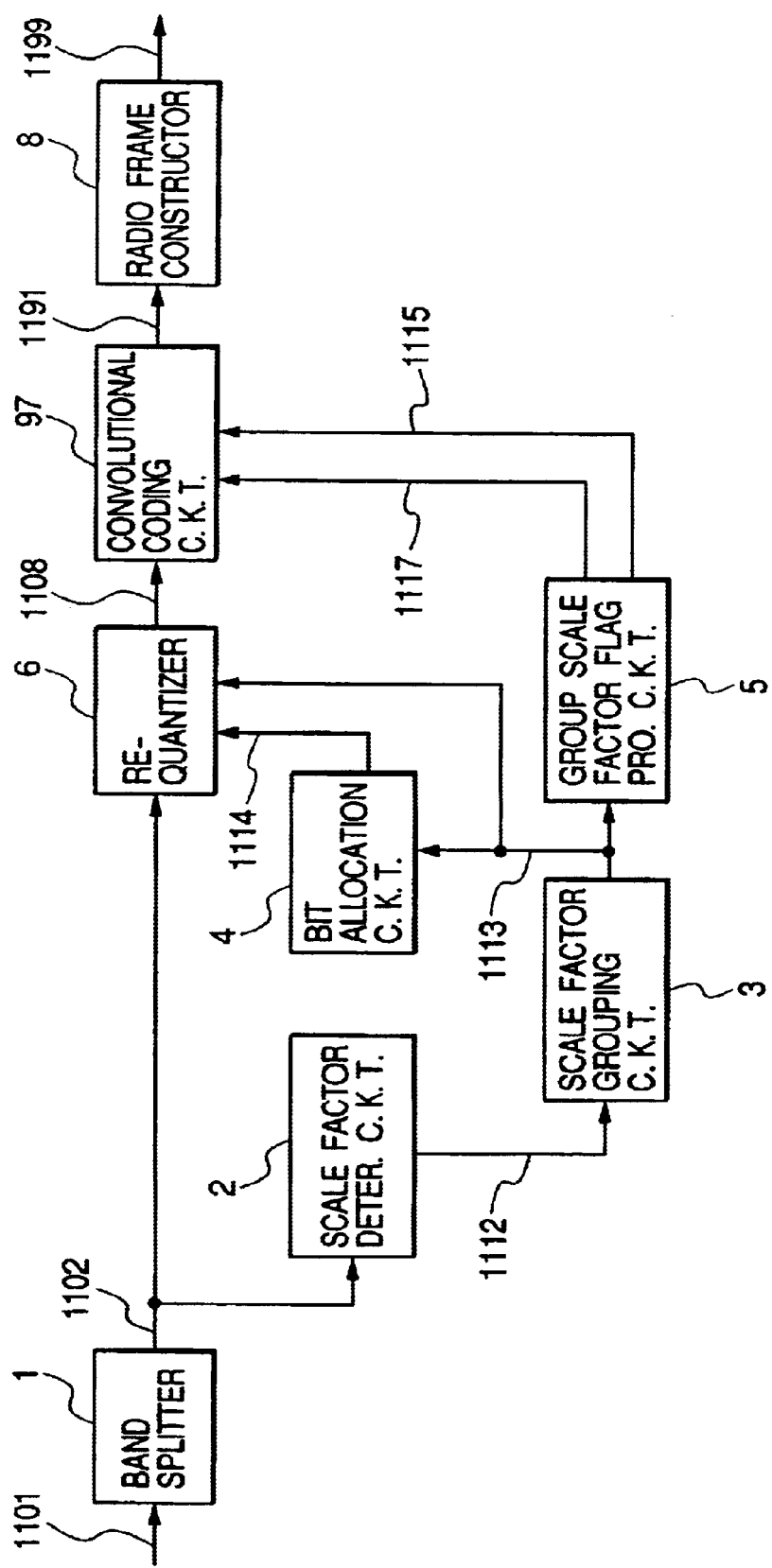
FIG. 35 is a block diagram which shows a subband encoding system according to a modification of the seventh embodiment.

An example of use of three convolutional codes will be described below with reference to FIGS. 35, 36, and 37.

The subband encoding system in FIG. 32 is different from the one shown in FIG. 28 only in the convolutional encoding circuit 97. Other arrangements are identical, and explanation thereof in detail will be omitted here.

The convolutional encoding circuit 97 performs error correction encoding on the group scale factor flag information 1115, the updated group scale factor information 1117, and the re-quantized signal 1108 using the convolutional codes. The error correction encoding is achieved by subjecting an input frame consisting of, as shown in FIG. 37, the group scale factor flag information 1115, the updated group scale factor information 1117, and the re-quantized signal 1108 to convolutional encoding operations different in error correcting capability from each other to produce convolutional code words CNV1, CNV2, and CNV3, respectively, which are, in turn, outputted in a frame, as shown in FIG. 37, as the convolution-encoded output signal 1193 to the radio transmission frame constructing circuit 8.

The error correcting capabilities of the convolutional encoding operations in the convolutional encoding 97 are stronger in the order of the group scale factor flag information 1115, the updated group scale factor information 1117, and the re-quantized signal 1108. This is for establishing the dependence on production of the bit allocation information which is greater in the order of the group scale factor flag information 1115, the updated group scale factor information 1117, and the re-quantized signal 1108. The code errors in the group scale factor flag information 1115 and the updated group scale factor information 1117 usually impinge greatly on several frames until the erroneous information is updated. This is a serious problem.

The time-sequential orders of the convolutional encoding operations and the convolutional code words CNV, CNV2, and CNV3 are not limited to the ones as described above, but they may be changed if a given protocol is established between the encoding system and the decoding system.

Figure 37:
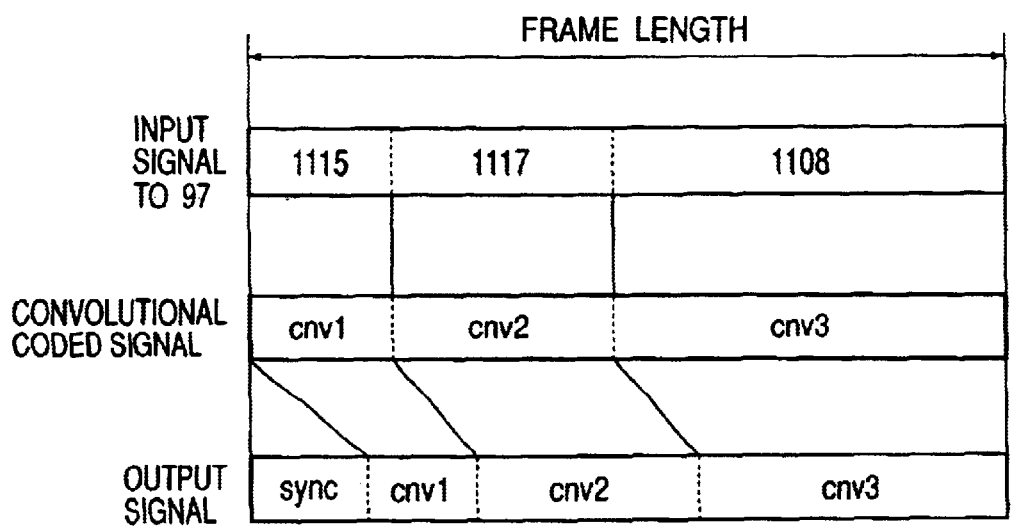
FIG. 37 shows frame structures of an input signal to a convolutional encoding circuit, an output signal of the convolutional encoding circuit, and an encoded output signal in the modification of FIG. 35.

The radio transmission frame constructing circuit 8 adds the radio transmission information sync, as shown in FIG. 37, to the convolution-encoded output signal 1191 (i.e., the frame made up of the convolutional code words CNV1, CNV2, and CNV3) and outputs it as the encoded output signal 1199. The encoded output signal 1199 is modulated and then transmitted on a carrier wave.

Figure 36:
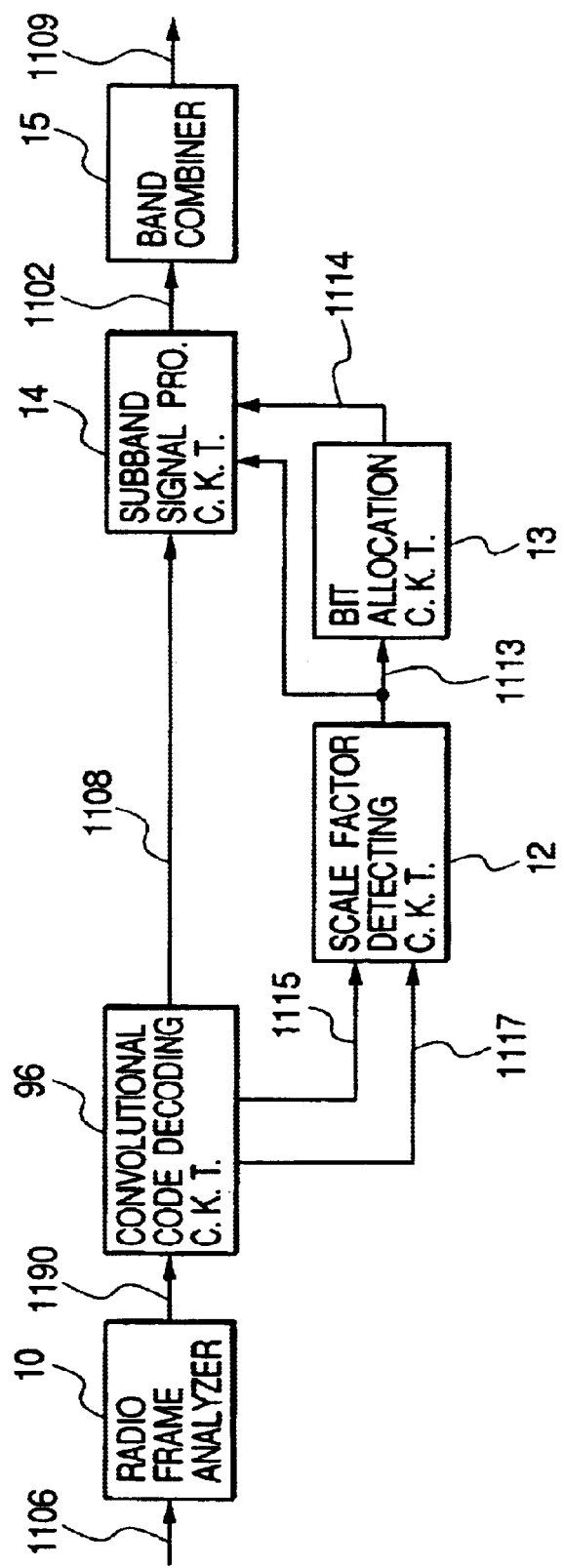
FIG. 36 is a block diagram which shows a subband decoding system decoding an input signal encoded by the modification of FIG. 35.

In the decoding operation in FIG. 36, the radio transmission frame analyzer 10 analyzes the radio transmission information sync padded in the encoded input signal 1106 and produces the convolution-encoded signal 1190 made up of the convolutional code words CNV1, CNV2, and CNV3 from which the radio transmission information sync is removed. Specifically, the radio transmission frame analyzer 10 uses the radio transmission information sync to acquire the synchronization of the radio transmission encoded frame and the decoding clock and performs operations required for the radio transmission such as the diversity switching and the bi-directional switching within the guard time. The convolution-encoded signal decoding circuit 96 performs convolution-encoded signal decoding operations different in error correcting capability from each other on the convolutional code words CCNV, CNV2, and CNV3, respectively, to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

An alternative example of use of three error correcting codes will be described below with reference to FIGS. 28, 29, and 38.

In the encoding operation in FIG. 28, the error correction encoding circuit 9 performs the error correction encoding on the group scale factor flag information 1115, the updated group scale factor information 1117, and the re-quantized signal 1108. The error correction encoding is achieved by subjecting the group scale factor flag information 1115, the updated group scale factor information 1117, and the re-quantized signal 1108 to at least two types of error correction encoding operations to produce, as shown in FIG. 38, error correction code words FECA, FECB, and FECC, respectively, which are, in turn, outputted in a frame, as shown in FIG. 38, as the error correction encoded output signal 1195 to the radio transmission frame constructing circuit 8.

The error correction encoding operations in this example use at least two different error correcting codes such as a block code and a convolutional code. The error correcting capabilities of the error correction encoding operations in the error correction encoding circuit 9 are stronger in the order of the group scale factor flag information 1115, the updated group scale factor information 1117, and the re-quantized signal 1108. This is for establishing the dependence on production of the bit allocation information which is greater in the order of the group scale factor flag information 1115, the updated group scale factor information 1117, and the re-quantized signal 1108. The code errors in the group scale factor flag information 1115 and the updated group scale factor information 1117 usually impinge greatly on several frames until the erroneous information is updated. This is a serious problem.

The time-sequential orders of the error correction encoding operations and the error correction code words FECA, FECB, and FECC are not limited to the ones as described above, but they may be changed if a given protocol is established between the encoding system and the decoding system.

The radio transmission frame constructing circuit 8 adds the radio transmission information sync to the error correction encoded output signal 1195 (i.e., the frame made up of the error correction code words FECA, FECB, and FECC) and outputs it as the encoded output signal 1199. The encoded output signal 1199 is modulated and then transmitted on a carrier wave.

Figure 38:
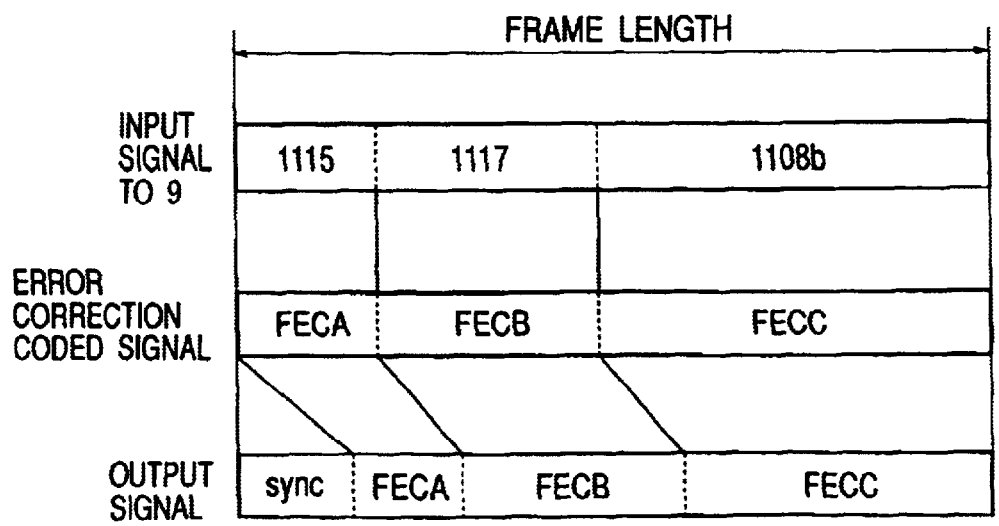
FIG. 38 shows frame structures of an input signal to an error correction encoding circuit, an output signal of the error correction encoding circuit, and an encoded output signal in a modification of the seventh embodiment performing at least two different types of error correction encoding operations.

In the decoding operation in FIG. 29, the radio transmission frame analyzer 10 analyzes the radio transmission information sync padded in the encoded input signal 1106 and produces the information from which the radio transmission information sync, as shown in FIG. 38, is removed as the error correction encoded signal 1194 made up of the error correction code words FECA, FECB, and FECC. Specifically, the radio transmission frame analyzer 10 uses the radio transmission information sync to acquire the synchronization of the radio transmission encoded frame and the decoding clock and performs operations required for the radio transmission such as the diversity switching and the bi-directional switching within the guard time. The error correction encoded signal decoding circuit 18 performs corresponding types of error correcting/decoding operations on the error correction code words FECA, FECB, and FECC to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

An example of use of two convolutional codes and one BCH code will be described below with reference to FIGS. 28, 29, and 39.

Figure 39:
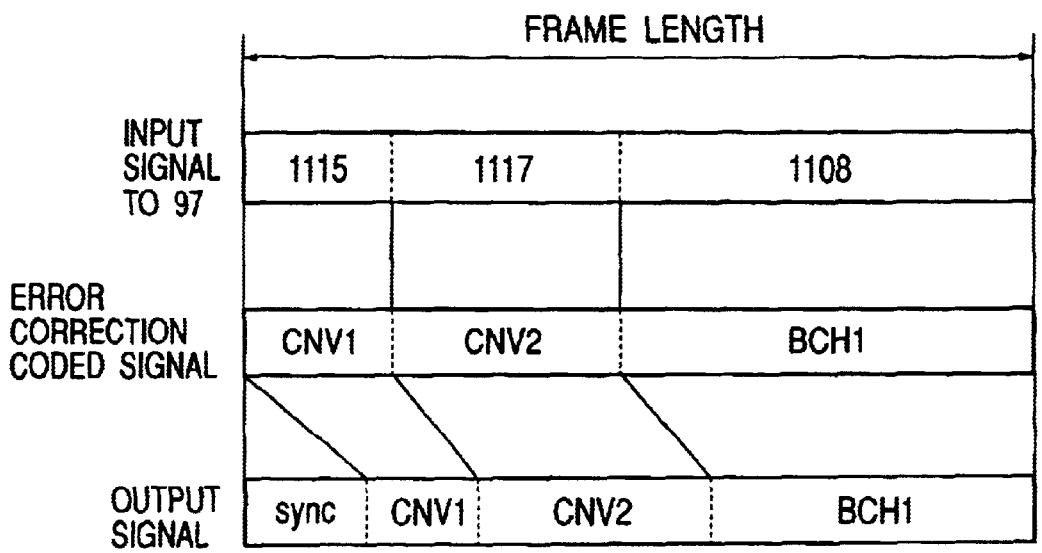
FIG. 39 shows frame structures of an input signal to an error correction encoding circuit, an output signal of the error correction encoding circuit, and an encoded output signal in the second modification of the seventh embodiment performing at least two different types of error correction encoding operations.

In the encoding operation in FIG. 28, the error correction encoding circuit 9 performs the error correction encoding on the group scale factor flag information 1115, the updated group scale factor information 1117, and the re-quantized signal 1108 in an input frame as shown in FIG. 39. The error correction encoding is achieved by subjecting the group scale factor flag information 1115, the updated group scale factor information 1117, and the re-quantized signal 1108 to the BCH encoding and convolutional encoding operations to produce, as shown in FIG. 39, error correction code words CNV1, CNV2, and BCH1, respectively, which are, in turn, outputted in a frame, as shown in FIG. 39, as the error correction encoded output signal 1195 to the radio transmission frame constructing circuit 8. In this example, the group scale factor flag information 1115 and the updated group scale factor information 1117 are subjected to the convolutional encoding operation different in error correcting capability from each other, while the re-quantized signal 1108 is subjected to the BCH encoding operation, however, a combination of the two different error correction encoding operations is not liminted to the one as described above, but it may be changed if a given protocol is established between the encoding system and the decoding system.

The error correcting capabilities are stronger in the order of the group scale factor flag information 1115, the updated group scale factor information 1117, and the re-quantized signal 1108. This is for establishing the dependence on production of the bit allocation information which is greater in the order of the group scale factor flag information 1115, the updated group scale factor information 1117, and the re-quantized signal 1108. The code errors in the group scale factor flag information 1115 and the updated group scale factor information 1117 usually impinge greatly on several frames until the erroneous information is updated. This is a serious problem.

The time-sequential order of the error correction code words CNV1, CNV2, and BCH1 in the error correction encoded output signal 1195 and the encoded output signal 1199 are not limited to the one as described above, but it may be changed if a given protocol is established between the encoding system and the decoding system.

The radio transmission frame constructing circuit 8 adds the radio transmission information sync to the error correction encoded output signal 1195, as shown in FIG. 39, and outputs it as the encoded output signal 1199. The encoded output signal 1199 is modulated and then transmitted on a carrier wave.

In the decoding operation in FIG. 29, the radio transmission frame analyzer 10 analyzes the radio transmission information sync padded in the encoded input signal 1106 and produces the information from which the radio transmission information sync, as shown in FIG. 39, is removed as the error correction encoded signal 1194 made up of the error correction code words CVN1, CVN2, and BCH1. Specifically, the radio transmission frame analyzer 10 uses the radio transmission information sync to acquire the synchronization of the radio transmission encoded frame and the decoding clock and performs operations required for the radio transmission such as the diversity switching and the bi-directional switching within the guard time. The error correction encoded signal decoding circuit 18 performs corresponding types of error correcting/decoding operations on the error correction code words CNV1, CNV2, and BCH1 to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

An example of use of one convolutional code and one BCH code in a frame will be described below with reference to FIGS. 28, 29, and 40.

Figure 40:
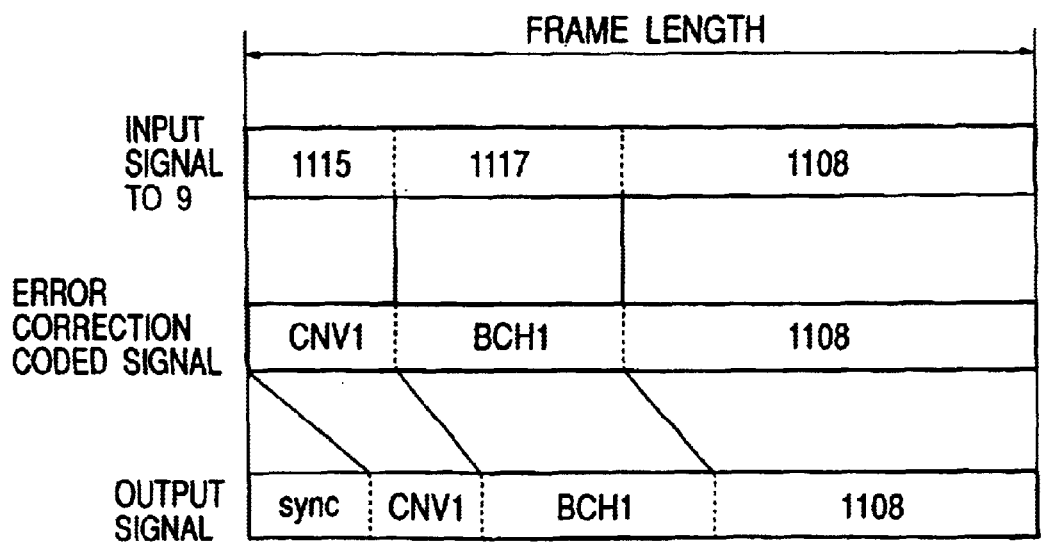
FIG. 40 shows frame structures of an input signal to an error correction encoding circuit, an output signal of the error correction encoding circuit, and an encoded output signal in the third modification of the seventh embodiment performing at least two different types of error correction encoding operations.

In the encoding operation in FIG. 28, the error correction encoding circuit 9 performs the error correction encoding on the group scale factor flag information 1115 and the updated group scale factor information 1117 in an input frame, as shown in FIG. 40, using the convolutional code and the BCH code to produce error correction code words CNV1 and BCH1, respectively, which are, in turn, outputted together with the re-quantized signal 1108 as the error correction encoded output signal 1195 to the radio transmission frame constructing circuit 8. In this example, the group scale factor flag information 1115 and the updated group scale factor information 1117 are subjected to the convolutional encoding operation and the BCH encoding operation, respectively, however, a combination of the two different error correction encoding operations is not limited to the one as described above, but it may be changed if a given protocol is established between the encoding system and the decoding system.

The group scale factor flag information 1115 is stronger in error correcting capability than the updated group scale factor information 1117. This is for establishing the dependence on production of the bit allocation information which is greater in the order of the group scale factor flag information 1115, the updated group scale factor information 1117, and the re-quantized signal 1108.

The time-sequential order of the error correction code words CNV1 and BCH1 in the error correction encoded output signal 1195 and the encoded output signal 1199 are not limited to the one as described above, but it may be changed if a given protocol is established between the encoding system and the decoding system.

The radio transmission frame constructing circuit 8 adds the radio transmission information sync to the error correction encoded output signal 1195, as shown in FIG. 40, and outputs it as the encoded output signal 1199. The encoded output signal 1199 is modulated and then transmitted on a carrier wave.

In the decoding operation in FIG. 29, the radio transmission frame analyzer 10 analyzes the radio transmission information sync padded in the encoded input signal 1106 and produces the information from which the radio transmission information sync, as shown in FIG. 40, is removed as the error correction encoded signal 1194 made up of the error correction code words CVN1 and BCH1 and the re-quantized signal 1108. Specifically, the radio transmission frame analyzer 10 uses the radio transmission information sync to acquire the synchronization of the radio transmission encoded frame and the decoding clock and performs operations required for the radio transmission such as the diversity switching and the bi-directional switching within the guard time. The error correction encoded signal decoding circuit 18 performs corresponding types of error correcting/decoding operations on the error correction code words CVN1 and BCH1 to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

An example of performing the error correction encoding operation on the part of at least one of the group scale factor flag information 1115, the updated group scale factor information 1117, and the re-quantized signal 1108 will be described below with reference to FIGS. 41, 42, and 43.

The encoding operation performing the error correction encoding operation of this example to produce the encoded output signal 1199 and the decoding operation to decode the encoded output signal 1199 will be described with reference to FIGS. 28 and 29.

In the encoding operation, the error correction encoding circuit 9 performs the error correction encoding on a pre-selected one or ones of the group scale factor flag information 1115 and the updated group scale factor information 1117 to produce the error correction encoded output signal 1195. Specifically, the error correction encoded output signal 1195 has a portion not subjected to the error correction encoding. The error correction encoding operations in this example use one or more than two different error correcting codes such as a BHC code and a convolutional code. The error correcting capabilities of the error correction encoding operations in the error correction encoding circuit 9 may be changed if a given protocol is established between the encoding system and the decoding system.

In the example as discussed below, two error correction encoding operations different in type or error correcting capability are performed. Usually, the updated group scale factor information 1117 inputted to the error correction encoding circuit 9 changes every frame, as can be seen in input signals to the error correction encoding circuit 9 in FIGS. 41 to 43. "1108$a$" and "1108$b$" in FIGS. 42 and 43 each indicate an information signal made of a portion of the re-quantized signal 1108 and meet the condition below.

(the amount of information of 1108)=(the amount of information of 1108$a$)+(the amount of information of 1108$b$)

Figure 41:
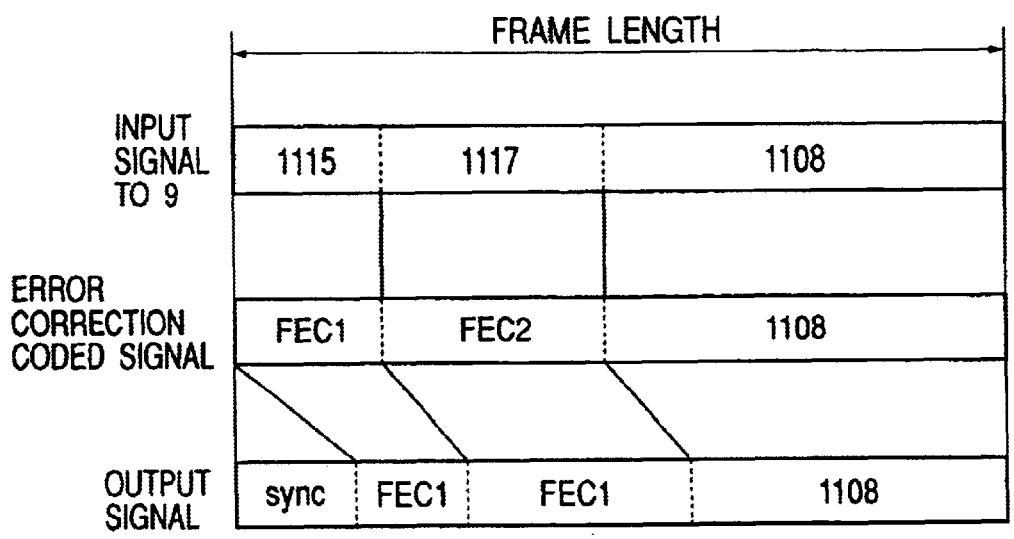
FIG. 41 shows frame structures of an input signal to an error correction encoding circuit, an output signal of the error correction encoding circuit, and an encoded output signal in the first example of the input signal in a modification of the seventh embodiment designed to perform an error correction encoding operation partially on a given data signal contained in the input signal.
Figure 42:
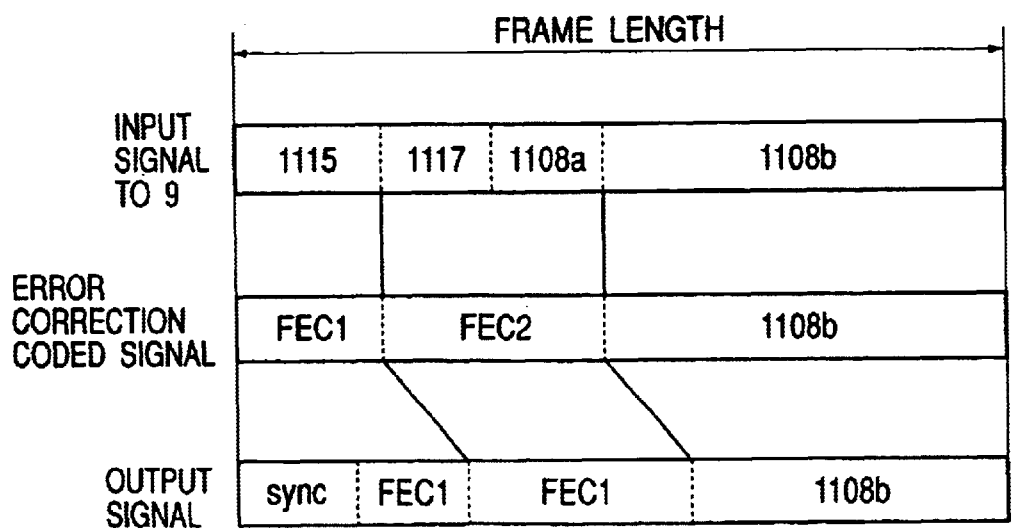
FIG. 42 shows frame structures of an input signal to an error correction encoding circuit, an output signal of the error correction encoding circuit, and an encoded output signal in the second example of the input signal in a modification of the seventh embodiment designed to perform an error correction encoding operation partially on a given data signal contained in the input signal.
Figure 43:
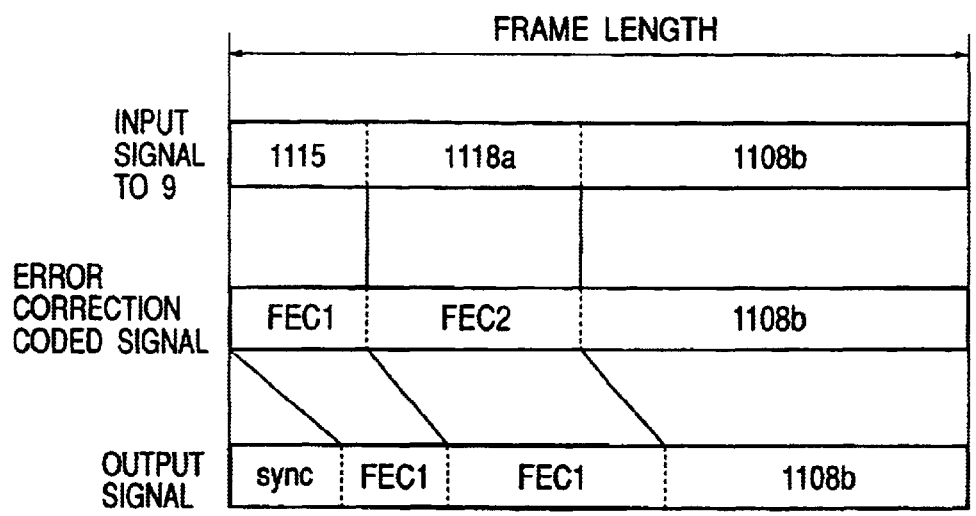
FIG. 43 shows frame structures of an input signal to an error correction encoding circuit, an output signal of the error correction encoding circuit, and an encoded output signal in the third example of the input signal in a modification of the seventh embodiment designed to perform an error correction encoding operation partially on a given data signal contained in the input signal.

Note that 1108$a$ in FIG. 42 is different in amount of information from that in FIG. 43, and FEC1, FEC2, and 1108$b$ in FIGS. 41, 42, and 43 are identical in amount of information. In the case shown in FIG. 41, all the group scale factor information 1113 is changed to produce the updated group scale factor information 1117. In this case, the error correction encoding operations are performed on the group scale factor flag information 1115 and the updated group scale factor information 1117 to produce the error correction code words FEC1 and FEC2, while no error correction encoding operation is performed on the re-quantized signal 1108.

In the case shown in FIG. 42, the group scale factor information 1113 is partly changed to produce the updated group scale factor information 1117. In this case, the error correction encoding operations are performed on the group scale factor flag information 1115 and the information made of the updated group scale factor information 1117 and the information 1108$a$ that is, as described above, a portion of the re-quantized signal 1108 to produce the error correction code words FEC1 and FEC2, while no error correction encoding operation is performed on the information 1108$b$.

In the case shown in FIG. 43, the group scale factor information 1113 is not changed to produce no updated group scale factor information 1117. In this case, the error correction encoding operations are performed on the group scale factor flag information 1115 and the information 1108$a$ to produce the error correction code words FEC1 and FEC2, while no error correction encoding operation is performed on the information 1108$b$.

In the cases shown in FIGS. 41 to 43, the group scale factor flag information 1115 is stronger in error correcting capability than the updated group scale factor information 1117. This is for establishing the dependence on production of the bit allocation information which is greater in the order of the group scale factor flag information 1115, the updated group scale factor information 1117, and the re-quantized signal 1108.

The time-sequential order of the error correction code words FEC1 and FEC2 in the error correction encoded output signal 1195 and the encoded output signal 1199 in FIG. 41 are not limited to the one as shown, but it may be changed if a given protocol is established between the encoding system and the decoding system.

The radio transmission frame constructing circuit 8 adds the radio transmission information sync to the error correction encoded output signal 1195, as shown in FIG. 41, and outputs it as the encoded output signal 1199 in the form of a radio transmission frame. The radio transmission information sync contains information required for the radio transmission such as the frame synchronization signal, the synchronization acquisition signal such as a clock synchronization signal, and a guard time needed for the diversity switching or the bi-directional switching. The frame synchronization signal and the clock synchronization signal are expressed by a series of v fixed patterns each made of u bits called a synchronization word. The encoded output signal 1199 in FIG. 28 is modulated and then transmitted on a carrier wave.

In the decoding operation, the radio transmission frame analyzer 10 in FIG. 29 analyzes the radio transmission information sync padded in the encoded input signal 1106 and produces the information from which the radio transmission information sync is removed as the error correction encoded signal 1194 made up of the error correction code words FEC1 and FEC2 and the re-quantized signal 1108. Specifically, the radio transmission frame analyzer 10 uses the radio transmission information sync, as shown in FIG. 41, to acquire the synchronization of the radio transmission encoded frame and the decoding clock and performs operations required for the radio transmission such as the diversity switching and the bi-directional switching within the guard time. The error correction encoded signal decoding circuit 18 performs corresponding types of error correcting/decoding operations on the error correction code words FEC1 and FEC2 to extract the group scale factor flag information 1115, the updated group scale factor information 1117, and the re-quantized signal 1108 and outputs them to the scale factor determining circuit 12 and the subband signal producing circuit 14. The other decoding operations are the same as those in the fifth embodiment, and explanation thereof in detail will be omitted here.

A subband encoding system according to the eighth embodiment will be described below which is designed to rearrange re-quantized signals for minimizing adverse effects of code errors on a decoding operation.

The encoding operation of this embodiment will first be discussed with reference to FIGS. 28, 41, 42, and 43.

The error correction encoding circuit 9 rearranges the re-quantized signals 1108 inputted thereto and weights code errors. Specifically, the error correction encoding circuit 9 extracts MSBs, in sequence, from the re-quantized signal 1108 in the first subband to the re-quantized signal 1108 in the nth subband and arranges them in that order. This is repeated up to LSBs of the re-quantized signals 1108. If there is a portion of each of the re-quantized signals 1108 to which no bit is allocated, this portion is skipped. The bit rearrangement enables code errors to be corrected by the error correction encoded signal decoding circuit 18 in FIG. 29 according to the weights given to the errors both in the case of FIG. 42 where the group scale factor information 1113 is partly changed to produce the updated group scale factor information 1117 and in the case of FIG. 43 where the group scale factor information 1113 is not changed to produce no updated group scale factor information 1117.

The error correction encoded signal decoding circuit 18 produces the re-quanatized signals 1108 in light of the bit rearrangement in the subband encoding system of FIG. 28.

Figure 44:
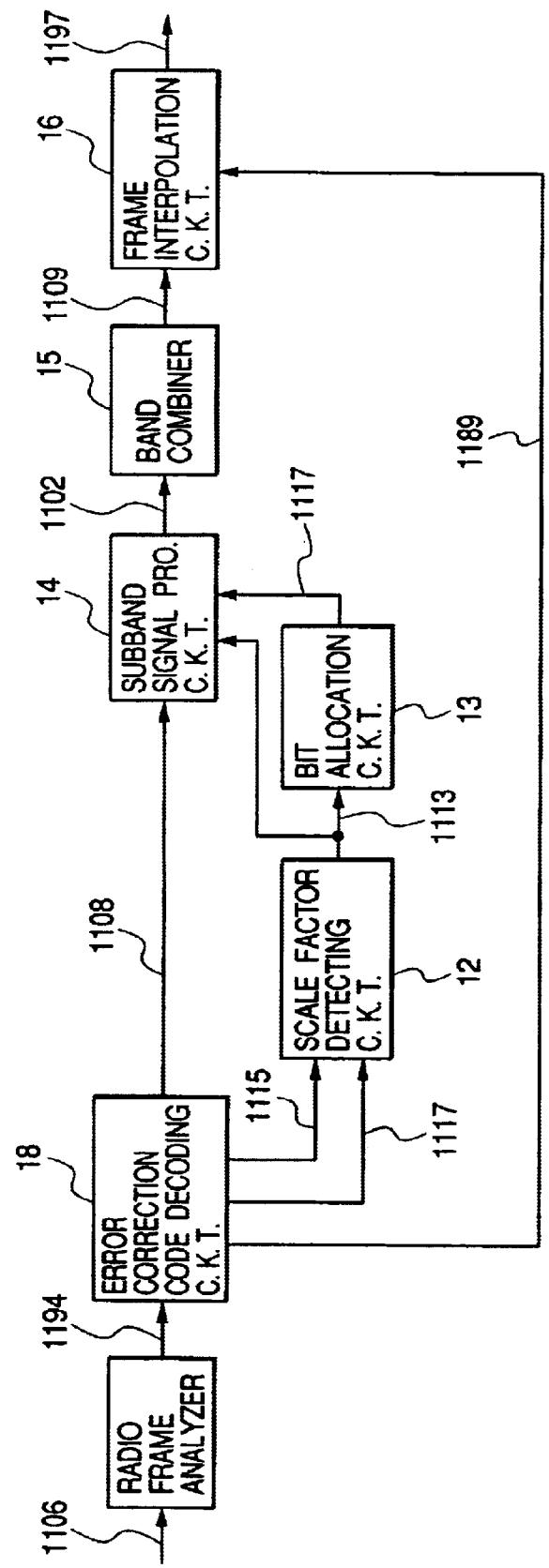
FIG. 44 is a block shows a subband decoding system according to the ninth embodiment of the invention designed to perform frame interpolation when the number of bits of code errors is greater than a given threshold value.

FIG. 44 shows a subband decoding system according to the ninth embodiment of the invention which is designed to perform the frame interpolation when the number of bits of code errors is greater than a given threshold value.

The subband decoding system of this embodiment is different from the one shown in FIG. 29 in that the frame interpolation circuit 16 perform the frame interpolation of the decoded output signal 1109. Other arrangements are identical with those in FIG. 29, and explanation thereof in detail will be omitted here.

In operation, the encoded input signal 1106 having the same frame structure as that of the radio transmission encoded output signal 1199 shown in FIG. 30 is inputted to the radio transmission frame analyzer 10. The radio transmission frame analyzer 10 detects the radio transmission information sync padded in the encoded input signal 1106 to acquire the synchronization of the radio transmission encoded frame and the decoding clock and performs operations required for the radio transmission such as the diversity switching and the bi-directional switching within the guard time. The radio transmission frame analyzer 10 outputs the information FEC from which the radio transmission information sync is removed as the error correction encoded signal 1194 to the error correction encoded signal decoding circuit 18. The error correction encoded signal decoding circuit 18 performs a corresponding type of error correcting/decoding operation on the information FEC to extract the group scale factor flag information 1115, the updated group scale factor information 1117, and the re-quantized signal 1108 and outputs them to the scale factor determining circuit 12 and the subband signal producing circuit 14.

The encoded input signal 1106 may be a signal subjected to the error correction encoding using one or more than two of error correcting codes such as the convolutional code and the BCH code, as described in the above embodiments. The error correcting capabilities of the error correction encoding operations may also be changed if a given protocol is established between the encoding system and the decoding system.

The error correction encoded signal decoding circuit 18 counts the number of bits of code errors contained in one frame and determines whether the number of the bits is greater than a preselected threshold value or not to provide the error signal 1189 to the frame interpolation circuit 16. If the number of the bits is greater than the preselected threshold value, the error signal 1189 has a frame interpolation command. If not, the error signal 1189 has an output command to output the encoded output signal 1109 as it is. The error signal 1189 is produced in the form of a binary signal. The amount of information on one command is not limited.

The frame interpolation circuit 16 is responsive to the error signal 89 having the frame interpolation command to perform the frame interpolation of the encoded output signal 1109 from the band combining circuit 15, while it is responsive to the error signal 89 having the output command to output the encoded output signal 1109 as it is. The frame interpolation performed in the frame interpolation circuit 16 is a typical audio interpolation of digital signals. The other decoding operations are the same as those in FIG. 29, and explanation thereof in detail will be omitted here.

Figure 45:
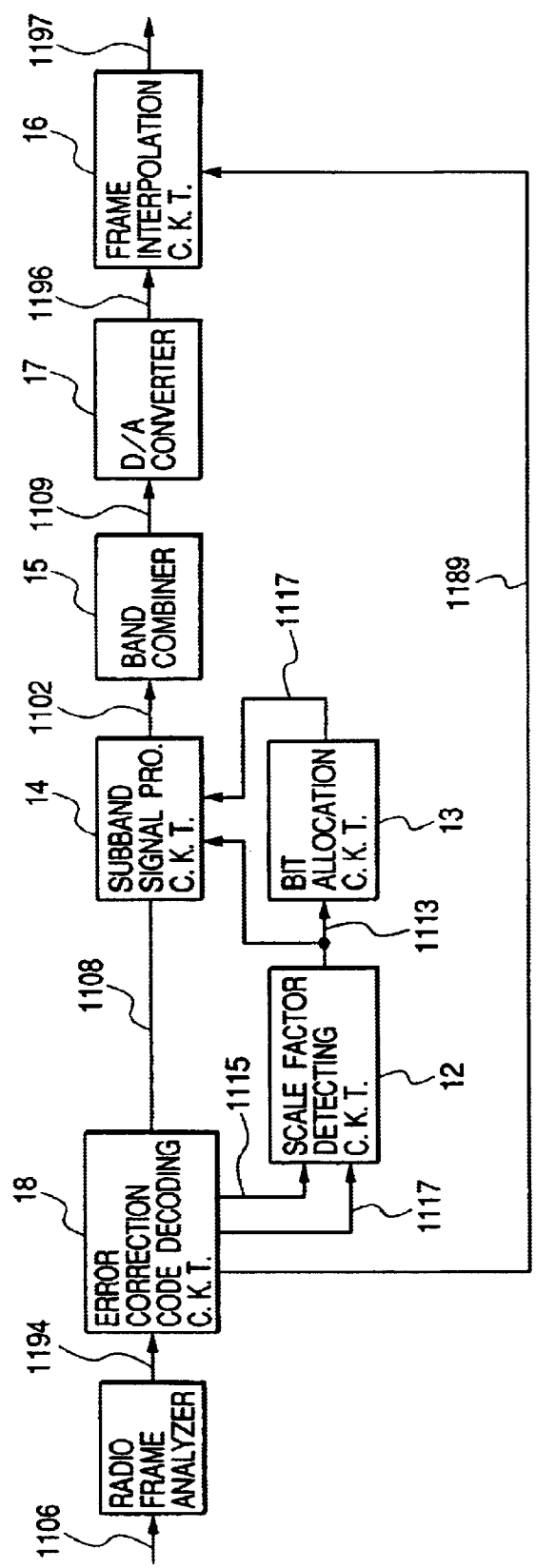
FIG. 45 is a block diagram which shows a subband decoding system according to the tenth embodiment designed to covert a decoded output signal into an analog signal and perform frame interpolation thereof.
Figure 46:
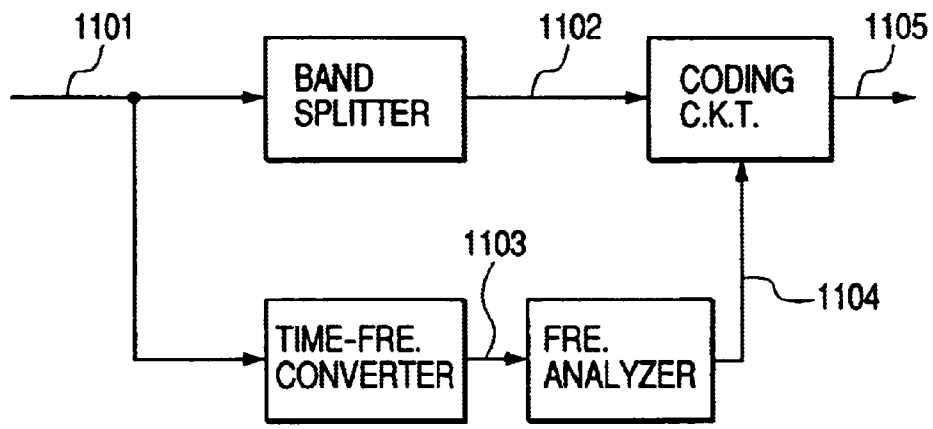
FIG. 46 is a block diagram which shows a conventional subband encoding system.
Figure 47:
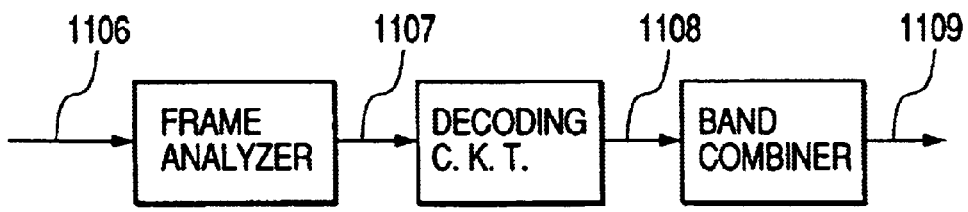
FIG. 47 is a block diagram which shows a conventional decoding system.

FIG. 45 shows a subband decoding system according to the tenth embodiment which is designed to convert a decoded output signal into an analog signal and perform the frame interpolation thereof. Other arrangements are identical with those in FIG. 44.

In operation, the encoded input signal 1106 having the same frame structure as that of the radio transmission encoded output signal 1199 shown in FIG. 30 is inputted to the radio transmission frame analyzer 10. The radio transmission frame analyzer 10 detects the radio transmission information sync padded in the encoded input signal 1106 to acquire the synchronization of the radio transmission encoded frame and the decoding clock and performs operations required for the radio transmission such as the diversity switching and the bi-directional switching within the guard time. The radio transmission frame analyzer 10 outputs the information FEC from which the radio transmission information sync is removed as the error correction encoded signal 1194 to the error correction encoded signal decoding circuit 18. The error correction encoded signal decoding circuit 18 performs a corresponding type of error correcting/decoding operation on the information FEC to extract the group scale factor flag information 1115, the updated group scale factor information 1117, and the re-quantized signal 1108 and outputs them to the scale factor determining circuit 12 and the subband signal producing circuit 14.

The encoded input signal 1106 may be a signal subjected to the error correction encoding using one or more than two of error correcting codes such as the convolutional code and the BCH code, as described in the above embodiments. The error correcting capabilities of the error correction encoding operations may be changed if a given protocol is established between the encoding system and the decoding system.

The error correction encoded signal decoding circuit 18 counts the number of bits of code errors contained in one frame and determines whether the number of the bits is greater than a preselected threshold value or not to provide the error signal 1189 to the frame interpolation circuit 16. If the number of the bits is greater than the preselected threshold value, the error signal 1189 has a frame interpolation command. If not, the error signal 1189 has an output command to output the encoded output signal 1109 as it is. The error signal 1189 is produced in the form of a binary signal. The amount of information on one command is not limited.

The D/A converter 17 converts the encoded digital output signal 1109 from the band combining circuit 15 into the analog signal 1196 and outputs it to the frame interpolation circuit 16.

The frame interpolation circuit 16 is responsive to the error signal 89 having the frame interpolation command to perform the frame interpolation of the analog signal 1196 from the D/A converter 17, while it is responsive to the error signal 89 having the output command to output the analog signal 1196 as it is. The frame interpolation performed in the frame interpolation circuit 16 is a typical audio interpolation such as filtering.

The eleventh embodiment will be described below which performs an interleaving and a deinterleaving operation in an encoding and a subband decoding system for minimizing burst errors.

The following discussion will refer to, as examples, the subband encoding system shown in FIG. 28, 32, 35, or 44 and the subband decoding system shown in FIG. 29, 33, 36, or 45.

In the encoding operation, the radio transmission frame constructing circuit 8 interleaves the error correction encoded output signal 1195 from the error correction encoding circuit 9 and pads the radio transmission information sync in it to provide the radio transmission encoded output signal 1199. The interleaving performed here may be typical straight interleaving or cross interleaving using a means made up of a memory and a buffer.

In the decoding operation, the radio transmission frame analyzer 10 detects and analyzes the radio transmission information sync contained in the encoded input signal 1106 and then deinterleaves the encoded input signal 1106 to provide it as the error correction encoded signal 1194 to the error correction encoded signal decoding circuit 18.

The type of interleaving and the numbers of row bits and column bits are common to the encoding and decoding system. The numbers of row bits and column bits are determined so as to meet the relation below.

(the number of row bits×the number of column bits)≦(the amount of information of the output signal 1199–the amount of the radio transmission information sync)

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For instance, the above embodiments for use in radio transmission may be used with the first to fourth embodiments.

What is claimed is:

1. A subband encoding apparatus comprising:
   a subband splitter dividing an input signal in a frequency band into subband signals;
   a first scale factor information producing circuit measuring signal levels of the subband signals to determine scale factors and producing scale factor information indicative thereof;
   a bit allocation information producing circuit producing bit allocation information based on the scale factor information;
   a second scale factor information producing circuit producing scale factor flag information indicating the fact that the scale factor information has changed from that one frame earlier and updated scale factor information indicating the scale factor information which has changed from that one frame earlier;
   a re-quantizing circuit re-quantizing the subband signals using the scale factor information and the bit allocation information to provide re-quantized output signals;
   a frame constructing circuit constructing a frame made up of the re-quantized signal, the updated scale factor information, and the scale factor flag information and outputs the frame as an encoded output signal; and
   a subband-limiting circuit limiting the number of subbands of the subband signals to be re-quantized by said re-quantizing circuit based on an upper limit frequency of an audible band.

2. A subband encoding apparatus as set forth in claim 1, wherein said subband-limiting circuit determines a minimum value of an upper limit subband number meeting a relation of ((input signal sampling frequency/2)/(the number of subbands)×(upper limit subband number))≧(the upper limit frequency in a given application) and determines an upper limit frequency of the subbands of the subband signals to be re-quantized by said re-quantizing circuit.

3. A subband encoding apparatus as set forth in claim 1, wherein the encoded output signal is outputted in the form of a frame whose length is determined by a relation of (the number of subbands)/(sampling frequency of the input signal).

4. A subband encoding apparatus as set forth in claim 1, wherein the encoded output signal is outputted in the form of a frame whose length is determined by a relation of (the number of subbands)×2/(sampling frequency of the input signal).

5. A subband encoding apparatus as set forth in claim 1, wherein said bit allocation information producing circuit produces the bit allocation information using weighting coefficients in a frequency domain.

6. A subband encoding apparatus as set forth in claim 1, wherein said bit allocation information producing circuit produces the bit allocation information using weighting coefficients each provided for the scale factor information in one of the subbands.

7. A subband encoding apparatus as set forth in claim 1, wherein said frame constructing circuit sets a length of the frame to that of a radio transmission frame and pads a synchronization word required for radio transmission in the frame.

8. A subband encoding apparatus as set forth in claim 1, wherein said frame constructing circuit transmits frame s each made up only of synchronization words for synchronization acquisition at regular intervals.

9. A subband encoding apparatus as set forth in claim 1, wherein said frame constructing circuit transmits frames each made up only of the group scale factor information at regular intervals.

10. A subband encoding apparatus as set forth in claim 1, wherein said frame constructing circuit transmits frames each made up of the group scale factor information and synchronization words for synchronization acquisition at regular intervals.

11. A subband encoding apparatus as set forth in claim 1, further comprising an error correction encoding circuit which performs an error correction encoding operation on the encoded output signal.

12. A subband encoding apparatus as set forth in claim 11, wherein said error correction encoding circuit performs error correction encoding operations having different error correcting capabilities on data in a frame of the encoded output signal according to error resistances of the data.

13. A subband encoding apparatus as set forth in claim 11, wherein said error correction encoding circuit uses a BCH code.

14. A subband encoding apparatus as set forth in claim 11, wherein said error correction encoding circuit uses a convolutional code.

15. A subband encoding apparatus as set forth in claim 11, wherein said error correction encoding circuit uses different error correcting codes according to the error resistances of the data.

16. A subband encoding apparatus as set forth in claim 15, wherein said error correction encoding circuit uses a BCH code and a convolutional code.

17. A subband encoding apparatus as set forth in claim 11, wherein said error correction encoding circuit provides a bit in a frame of the encoded output signal which undergoes no error correction encoding operation according to weights of data contained in the frame.

18. A subband encoding apparatus as set forth in claims 11, wherein said error correction encoding circuit performs a fixed-length error correction encoding operation on the encoded output signal regardless of a bit length of the updated scale factor information which changes every frame.

19. A subband encoding system as set forth in claim 18, further comprising a rearranging circuit which rearranges output signals produced by re-quantizing the subband signals for minimizing adverse effects of code errors on a decoding operation.

20. A subband encoding apparatus as set forth in claim 1, wherein said frame constructing circuit performs an interleaving operation on the encoded output signal.

21. A subband decoding apparatus comprising:

a frame analyzer establishing synchronization of frames of an inputted subband encoded signal to extract therefrom re-quantized signals, scale factor flag information indicating the fact that scale factor information has changed from that one frame earlier in a subband encoding operation of the inputted subband encoded signal, and updated scale factor information indicating the scale factor information which has changed from that one frame earlier in the subband encoding operation;

a scale factor information producing circuit producing the scale factor information in all subbands of the inputted subband encoded signal using the updated scale factor information and the scale factor flag information;

a bit allocation information producing circuit producing bit allocation information based on the scale factor information produced by said scale factor information producing circuit;

a subband signal producing circuit receiving the re-quantized signals to produce subband signals using the scale factor information and the bit allocation information; and a band combining circuit combining the subband signals to produce a decoded output signal.

22. A subband decoding apparatus as set forth in claim 21, further comprising a muting circuit which mutes frames contained at regular intervals in the inputted subband encoded signal when each of the frames is made up of either or both of the scale factor information and synchronization words for synchronization acquisition and a data interpolation circuit which performs data interpolation of digital signals undergoing a decoding operation.

23. A subband decoding apparatus as set forth in claim 21, further comprising a muting circuit which mutes frames contained at regular intervals in the inputted subband encoded signal when each of the frames is made up of either or both of the scale factor information and synchronization words for synchronization acquisition and a data interpolation circuit which performs data interpolation of analog signals undergoing a decoding operation.

24. A subband decoding apparatus as set forth in claim 21, further comprising a muting circuit which mutes frames contained at regular intervals in the inputted subband encoded signal as a function of the number of bits in each of the frames and a data interpolation circuit which performs data interpolation of digital signals undergoing a decoding operation.

25. A subband decoding apparatus as set forth in claim 21, further comprising a muting circuit which mutes frames contained at regular intervals in the inputted subband encoded signal as a function of the number of bits in each of the frames and a data interpolation circuit which performs data interpolation of analog signals undergoing a decoding operation.

26. A subband decoding apparatus as set forth in claim 21, wherein the decoded output signal is subjected to a deinterleaving operation during analysis of a frame of the input signal.

27. A subband encoding apparatus comprising:
- a subband splitter dividing an input signal in a frequency band into a preselected number of subbands to produce subband signals;
- a first scale factor information producing circuit measuring signal levels of the subband signals to determine scale factors and producing scale factor information indicative thereof;
- a subband grouping circuit breaking down the subbands into a preselected number of subband groups and determining scale factors in the subband groups using the scale factor information to provide group scale factor information indicative thereof;
- a bit allocation information producing circuit producing bit allocation information based on the group scale factor information;
- a second scale factor information producing circuit producing group scale factor flag information indicating the fact that the group scale factor information has changed from that in a last frame and updated group scale factor information indicating the group scale factor information which has changed from that in the last frame;
- a re-quantizing circuit re-quantizing the subband signals using the group scale factor information and the bit allocation information to provide re-quantized output signals;
- a frame constructing circuit constructing a frame made up of the re-quantized signal, the updated group scale factor information, and the group scale factor flag information and outputs the frame as an encoded output signal; and
- a subband-limiting circuit limiting the number of subbands of the subband signals to be re-quantized by said re-quantizing circuit based on an upper limit frequency of an audible band.

28. A subband encoding apparatus as set forth in claim 27, wherein said subband-limiting circuit determines a minimum value of an upper limit subband number meeting a relation of ((input signal sampling frequency/2)/(the number of subbands)×(upper limit subband number))≧(the upper limit frequency in a given application) and determines an upper limit frequency of the subbands of the subband signals to be re-quantized by said re-quantizing circuit.

29. A subband encoding apparatus as set forth in claim 27, wherein said subband splitter divides a frequency band of (sampling frequency of the input signal)/2 into 32 subbands, and wherein said subband grouping circuit breaks down 32 subbands into 6 to 20 subband groups.

30. A subband encoding apparatus as set forth in claim 27, wherein the encoded output signal is outputted in the form of a frame whose length is determined by a relation of (the number of subbands)/(sampling frequency of the input signal).

31. A subband encoding apparatus as set forth in claim 27, wherein the encoded output signal is outputted in the form of a frame whose length is determined by a relation of (the number of subbands)×2/(sampling frequency of the input signal).

32. A subband encoding apparatus as set forth in claim 27, wherein said bit allocation information producing circuit determines a ratio of the value of the group scale factor information in each of the subband groups to the smallest value of a known minimum audible level curve in each of the subbands within the subband group, said bit allocation information producing circuit determining energy rates in all the subbands based on said ratios to obtain the bit allocation information.

33. A subband encoding apparatus as set forth in claim 27, wherein said bit allocation information producing circuit determines a ratio of the value of the group scale factor information in each of the subband groups to an average value of a known minimum audible level curve in each of the subbands within the subband group, said bit allocation information producing circuit determining energy rates in all the subbands based on said ratios to obtain the bit allocation information.

34. A subband encoding apparatus as set forth in claim 27, wherein said bit allocation information producing circuit determines a product of an energy rate in each of the subbands and the possible number of bits to be allocated to one frame, ranks all the subbands in the order of magnitude of decimals of the products, determines the remaining number of bits to be allocated, and allocates the remaining bits, in sequence, to the ranked subbands.

35. A subband encoding apparatus as set forth in claim 27, wherein said bit allocation information producing circuit produces the bit allocation information using weighting coefficients in a frequency domain.

36. A subband encoding apparatus as set forth in claim 27, wherein said bit allocation information producing circuit produces the bit allocation information using weighting coefficients each provided for the scale factor information in one of the subbands.

37. A subband encoding apparatus as set forth in claim 27, wherein said frame constructing circuit sets a length of the frame to that of a radio transmission frame and pads a synchronization word required for radio transmission in the frame.

38. A subband encoding apparatus as set forth in claim 27, wherein said frame constructing circuit transmits frames each made up only of synchronization words for synchronization acquisition at regular intervals.

39. A subband encoding apparatus as set forth in claim 27, wherein said frame constructing circuit transmits frames each made up only of the group scale factor information.

40. A subband encoding apparatus as set forth in claim 27, wherein said frame constructing circuit transmits frames each made up of the group scale factor information and synchronization words for synchronization acquisition.

41. A subband encoding apparatus as set forth in claim 27, further comprising an error correction encoding circuit which performs an error correction encoding operation on the encoded output signal.

42. A subband encoding apparatus as set forth in claim 41, wherein said error correction encoding circuit performs error correction encoding operations having different error correcting capabilities on data in a frame of the encoded output signal according to erorr resistances of the data.

43. A subband encoding apparatus as set forth in claim 41, wherein said error correction encoding circuit uses a BCH code.

44. A subband encoding apparatus as set forth in claim 41, wherein said error correction encoding circuit uses a convolutional code.

45. A subband encoding apparatus as set forth in claim 41, wherein said error correction encoding circuit uses different error correcting codes according to the error resistances of the data.

46. A subband encoding apparatus as set forth in claim 45, wherein said error correction encoding circuit uses a BCH code and a convolutional code.

47. A subband encoding apparatus as set forth in claim 41, wherein said error correction encoding circuit provides a bit in a frame of the encoded output signal which undergoes no error correction encoding operation according to weights of data contained in the frame.

48. A subband encoding apparatus as set forth in claim 41, wherein said error correction encoding circuit performs a fixed-length error correction encoding operation on the encoded output signal regardless of a bit length of the updated group scale factor information which changes every frame.

49. A subband encoding system as set forth in claim 48, further comprising a rearranging circuit which rearranges output signals produced by re-quantizing the subband signals for minimizing adverse effects of code errors on a decoding operation.

50. A subband encoding apparatus as set forth in claim 27, wherein said frame constructing circuit performs an interleaving operation on the encoded output signal.

51. A subband decoding apparatus comprising:
 a frame analyzer establishing synchronization of frames of an inputted subband encoded signal to extract therefrom re-quantized signals, group scale factor flag information indicating the fact that group scale factor information on scale factors in subband groups into which subbands are broken down in a subband encoding operation of the inputted suband encoded signal has changed from that in a last frame, and updated group scale factor information indicating the group scale factor information which has changed from that in a last frame in the subband encoding operation;
 a group scale factor information producing circuit producing the group scale factor information in the subband groups of the inputted subband encoded signal using the updated scale factor information and the scale factor flag information;
 a bit allocation information producing circuit producing bit allocation information based on the group scale factor information produced by said group scale factor information producing circuit;
 a subband signal producing circuit receiving the re-quantized signals to produce subband signals using the group scale factor information and the bit allocation information; and
 a band combining circuit combining the subband signals to produce a decoded output signal.

52. A subband decoding apparatus as set forth in claim 51, further comprising a muting circuit which mutes frames contained at regular intervals in the inputted subband encoded signal when each of the frames is made up of either or both of the group scale factor information and synchronization words for synchronization acquisition and a data interpolation circuit which performs data interpolation of digital signals undergoing a decoding operation.

53. A subband decoding apparatus as set forth in claim 51, further comprising a muting circuit which mutes frames contained at regular intervals in the inputted subband encoded signal when each of the frames is made up of either or both of the group scale factor information and synchronization words for synchronization acquisition and a data interpolation circuit which performs data interpolation of analog signals undergoing a decoding operation.

54. A subband decoding apparatus as set forth in claim 51, further comprising a muting circuit which mutes frames contained at regular intervals in the inputted subband encoded signal as a function of the number of bits in each of the frames and a data interpolation circuit which performs data interpolation of digital signals undergoing a decoding operation.

55. A subband decoding apparatus as set forth in claim 51, further comprising a muting circuit which mutes frames contained at regular intervals in the inputted subband encoded signal as a function of the number of bits in each of the frames and a data interpolation circuit which performs data interpolation of analog signals undergoing a decoding operation.

56. A subband decoding apparatus as set forth in claim 51, wherein the decoded output signal is subjected to a deinterleaving operation during analysis of a radio transmitted frame of the input signal.

* * * * *